United States Patent [19]
Shimada et al.

[11] Patent Number: 5,898,654
[45] Date of Patent: Apr. 27, 1999

[54] OPTICAL DISK AND OPTICAL DISK APPARATUS HAVING A PREDETERMINED PATTERN OF MARKS ON TRACKS SUCH THAT A REPRODUCED SIGNAL IS CAUSED TO JITTER

[75] Inventors: Toshiyuki Shimada, Kadoma; Mamoru Shoji, Takatsuki; Takashi Ishida, Yawata; Shunji Ohara, Higashiosaka, all of Japan

[73] Assignee: Matsushita Electric Industrial Co., Ltd., Osaka-fu, Japan

[21] Appl. No.: 08/931,943

[22] Filed: Sep. 17, 1997

Related U.S. Application Data

[63] Continuation of application No. 08/501,988, Jul. 13, 1995, abandoned.

[30] Foreign Application Priority Data

| Jul. 14, 1994 | [JP] | Japan | 6-162008 |
| Jul. 28, 1994 | [JP] | Japan | 6-176846 |
| Aug. 12, 1994 | [JP] | Japan | 6-190469 |

[51] Int. Cl.$^6$ .................................................. G11B 7/095
[52] U.S. Cl. ............................ 369/44.32; 369/50; 369/54
[58] Field of Search ........................... 369/44.26, 44.29, 369/44.32, 44.34, 54, 58, 47, 48, 50

[56] References Cited

U.S. PATENT DOCUMENTS

| 4,755,980 | 7/1988 | Yoshimaru et al. . |
| 4,907,212 | 3/1990 | Pharris et al. . |
| 5,473,480 | 12/1995 | Ishida ................................ 369/44.26 X |
| 5,502,698 | 3/1996 | Mochizuki .......................... 369/44.32 |

FOREIGN PATENT DOCUMENTS

| 0397354 | 11/1990 | European Pat. Off. . |
| 0443822 | 8/1991 | European Pat. Off. . |
| 0478329 | 4/1992 | European Pat. Off. . |
| 0559493 | 9/1993 | European Pat. Off. . |
| 0587111 | 3/1994 | European Pat. Off. . |
| 0662685 | 7/1995 | European Pat. Off. . |
| 4411855 | 10/1994 | Germany . |
| 92/04712 | 3/1992 | WIPO . |

*Primary Examiner*—W. R. Young
*Attorney, Agent, or Firm*—Wenderoth, Lind & Ponack, L.L.P.

[57] ABSTRACT

An optical disk and optical disk apparatus used for accurately reproducing and recording information regardless of the physical distortions of disks and the electrical distortions of a tracking system. This is achieved in the present invention by providing an optical disk apparatus which takes into account the physical fluctuations, such as radial tilt and tangential tilt, and the electrical fluctuations, such as focus errors and tracking errors, and makes appropriate adjustments in the optical disk apparatus accordingly. These adjustments are made based upon relationships existing between a jittering amount of the reproduced signals and the above-mentioned fluctuations. Specifically, the present invention generates a predetermined pattern of marks which, when recorded, are arranged such that a signal reproduced from the predetermined pattern of marks is caused to jitter. Depending on the specific pattern of marks generated, the reproduced signal experiences an amount of jittering that is optimal so as to allow the present invention to make appropriate adjustments.

3 Claims, 69 Drawing Sheets

67 RADIAL TILT ADJUSTER

82 TANGENTINAL TILT ADJUSTER

019f
OPTICAL DISK AND OPTICAL DISK APPARATUS HAVING A PREDETERMINED PATTERN OF MARKS ON TRACKS SUCH THAT A REPRODUCED SIGNAL IS CAUSED TO JITTER

This application is a Continuation of now abandoned application, Ser. No. 08/501,988, filed on Jul. 13, 1995.

BACKGROUND OF THE INVENTION

1. Field of the Invention

The present invention relates to an optical disk apparatus for recording and reproducing information to and from an optical disk and, more particularly, to an optical disk apparatus which can correctly access recording tracks formed on the optical disk regardless of physical distortion of the disk and regardless of an electrical distortion of a tracking system.

2. Description of the Prior Art

In recent years, an optical disk apparatus has been developed for recording and reproducing a large quantity of data. For this purpose, many approaches for a higher recording density are made. For achieving such a high recording density, it is necessary to reduce the inter-recording pit interference, improve the S/N ratio, and compensate the signal quality for the degradation caused by the fluctuations of the optical disk medium and/or the optical disk apparatus. Specifically, such fluctuations mainly relate to the physical distortion of the optical disk and the propensities of the electrical circuit used in the optical disk apparatus.

With reference to FIG. 75, a first case, relating to the physical distortion of the optical disk, is described. Principally, an optical disk D should be kept in a flat disk shape when it is set in a disk motor Md, so that an optical pickup Os can keep its optical axis perpendicular to the recording surface of the disk D during recording and reproducing operations. For scanning the recording tracks, the optical pickup Os moves in a radial direction indicated by an arrow Dr on a line LR in alignment with the radius of the optical disk D.

However, the optical disk D set in the disk motor Md will hang down from its outer circumference due to its weight. In other words, the optical disk D inclines downward in a conical shape instead of the flat plate disk shape. Strictly speaking, the optical disk D also curves both in the radial and circumferential directions. Therefore, as a result of such an inclination of the disk D, the optical pickup Os can not scan the recording tracks with its optical axis Ax across the recording surface of the disk D at a right angle. Furthermore, the crossing angle varies according to the position of the optical pick Os with respect to the optical disk D (the line LR).

Under such conditions, an angle θr formed between the optical axis Ax and the recording surface of the disk D is defined as a "radial tilt angle." An angle θt formed between the optical axis Ax and a line LD tangential to the recording track (or perpendicular to the radius) of the optical disk D is referred to as a "tangential tilt." Generally, the amount of radial tilt θr of the optical disk, such as for a compact disk, is within the range from −0.5° to 0.5°.

The second case, relating to the propensities of electric circuits, appears such that the laser beam can not be correctly focused and tracked on the target recording track even when the focus or tracking signal indicates that the laser spot is correctly focused and tracked. These kinds of focus errors or tracking errors occur regardless of whether the physical distortions such as the radial tilt or the tangential tilt, are compensated.

As a result of the above described fluctuations, the optical pickup Os can not make the laser spot focus on the aimed recording track or trace thereof. Specifically, the laser spot thus focused bridges two neighboring tracks, scans the recording tracks with varying angles, and scans a little or partial portion of the aimed recording track. Furthermore, the laser spot can not trace the recording track, and may loose the track of the aimed recording track. Therefore, the signal reproduction faces the problems of crosstalk, insufficient amplitude, noise, wave form interference, and jittering (asynchronization with the original signal), thereby causing the reproduced recording signal to jitter. When the jittering becomes greater, the quality of reproduced recording signal is considerably degraded. Furthermore the reading error of the optical pickup increases.

In FIG. 76, the relationship between the jittering amount (%) and the radial tilt (θr), obtained by experimentation, is shown. The jittering amount shows its minimum value within a range from +0.1 to −0.1 of a degree with respect to the zero-radial tilting position. It is also apparent that the jittering increases at a greater rate as the radial tilt θr becomes greater.

Therefore, in order to reproduce the original signal from the recording track under such fluctuating factors, it is necessary to adjust the optical disk apparatus with respect to the physical fluctuations such as radial tilt and tangential tilt, and the electrical fluctuation such as the focus errors and tracking errors.

With reference to FIG. 74, a conventional optical disk apparatus which compensates for the radial tilt is described. The conventional radial optical disk apparatus includes an optical disk 8101, an optical head 8102, a tilt sensor 8103, a preamplifier 8104, a radial tilt controller 8105, and a radial tilt adjuster 8106.

In operation of thus constructed conventional optical disk apparatus, the tilt sensor 8103 outputs a tilting signal Sr having a voltage corresponding to the tilting amount of the optical disk 8101 with respect to the optical head 8102. The preamplifier 8104 amplifies the tilting signal Sr. The radial tilt controller 8105 drives the radial tilt adjuster 8106 such that thus amplified tilting signal Sr becomes zero. Thus, the optical head 8102 can be kept in a position parallel to the optical disk 8101 so that a signal with a good quality can be recorded thereto or reproduced therefrom.

However, with the configuration mentioned above, the tilt sensor (8103) is an essential component, thus causing an expensive manufacturing cost, and the sensor should be arranged beside the optical head (8103), thereby preventing the miniaturization of the optical disk apparatus. Furthermore, the tilt sensor should be correctly located such that it is parallel to the optical head, otherwise the parallel nature of the optical head with respect to the optical disk can not be adjusted correctly.

SUMMARY OF THE INVENTION

The object of the present invention is to provide an optical disk apparatus which solves these problems.

The present invention has been developed so as to substantially solve the above described disadvantages and, as its essential object, so as to provide an improved optical disk apparatus.

In order to achieve the aforementioned objectives, the present invention provides an optical disk apparatus for reproducing a signal from a recording track formed in an optical disk by focusing a light spot on the recording track. The apparatus comprises a first pattern generator means for generating a first pattern for causing the reproduced signal to jitter and a writing means for writing the first pattern to a first recording track of the optical disk.

BRIEF DESCRIPTION OF THE DRAWINGS

These and other objects and features of the present invention will become clear from the following description taken in conjunction with the preferred embodiments thereof with reference to the accompanying drawings throughout in which like parts are designated by like reference numerals, and in which.

DESCRIPTION OF PREFERRED EMBODIMENTS

Figure 1A:
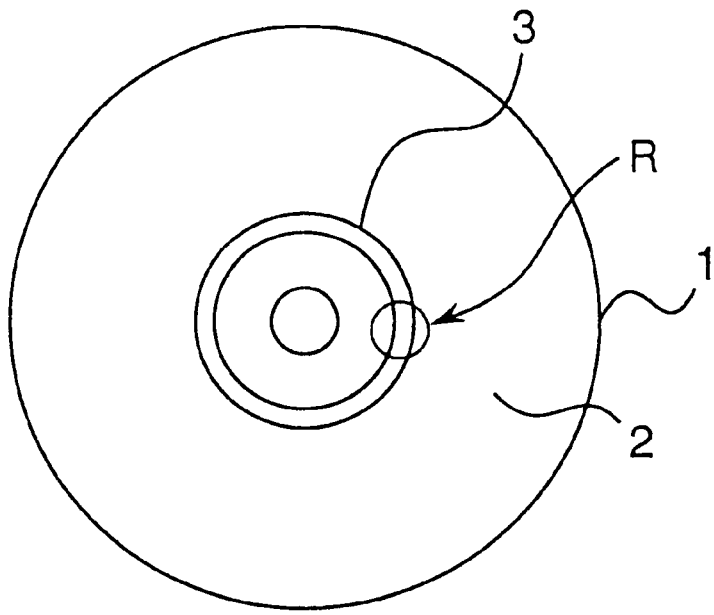
FIG. 1A is a plan view schematically showing an optical disk having a calibration data area formed therein according to the present invention.

Referring to FIG. 1A, one example of an optical disk used in an optical disk apparatus according to the present invention is shown. The optical disk 1 has a data recording area 2 and a calibration data area 3 formed in a lead-in area thereof. In the calibration data area 3, a predetermined calibration data is recorded.

Figure 2:
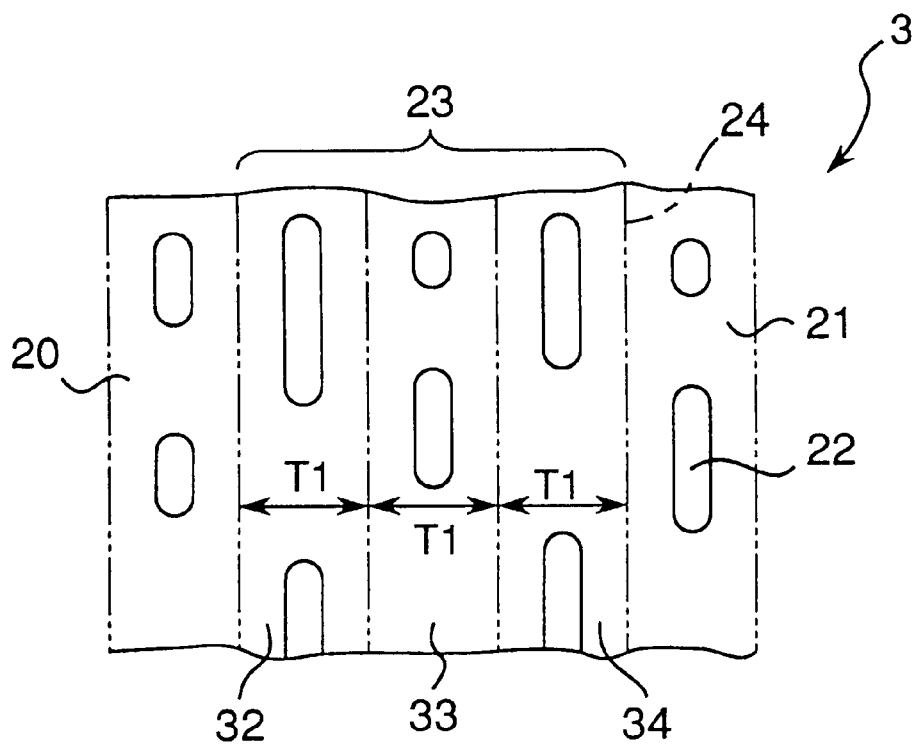
FIG. 2 is an enlarged view of a portion the calibration data area of FIG. 1A which is enclosed by an circle R.

Referring to FIG. 2, an example of calibration date area 3 of FIG. 1A enclosed by a circle R is shown on an enlarged scale. The data area 3 has at least one calibration data track area 23 wherein the calibration data is recorded. Each calibration data track area comprises three tracks 32, 33, and 34. In this embodiment, the first 32, second 33, and third 34 tracks are arranged in order from the inside toward the outside of the optical disk 1. On both sides of the calibration data track area 23, tracks 20 and 21 are provided, respectively. Each track has a plurality of pits 22 formed therein for recording information, and each track is independent from the neighboring tracks.

The boundaries of these neighboring tracks are indicated by imaginary lines 24 so as to provide better recognition. Such boundary lines may be actually defined by any suitable indicating means such as grooves or images. Hereinafter, a pit and a distance between the neighboring two pits in a single track are referred to as a "pit mark" and a "pit space", respectively. Furthermore, the distance between the neighboring two tracks, corresponding to a distance between the neighboring two boundary lines 24, is referred to as a "track width". Note that, all tracks 32, 33, and 34 have the same track width T1 as that of recording tracks formed in the recording area 2 of the optical disk 1, as shown in FIG. 2.

Figure 26:
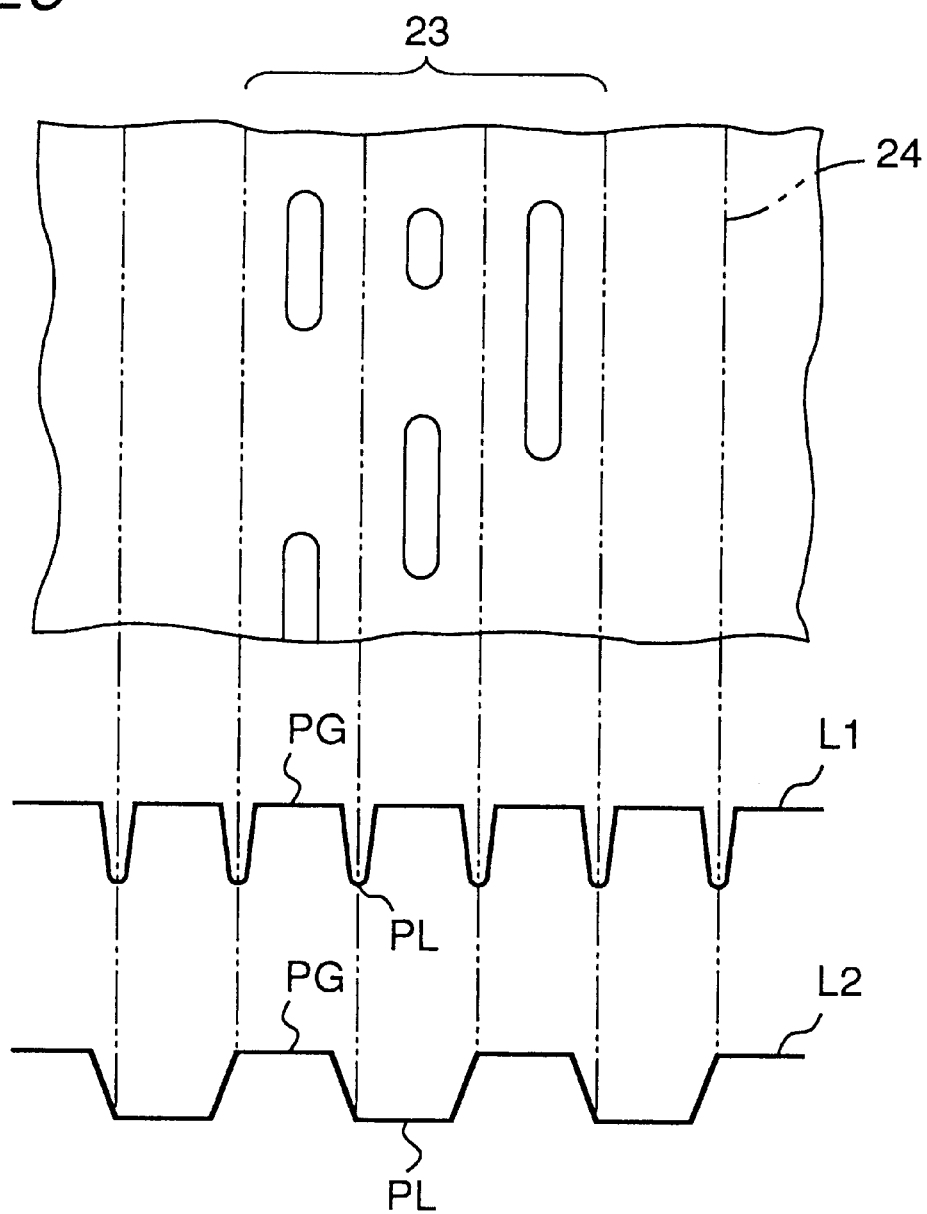
FIG. 26 is graph schematically showing an erasable (rewritable) type of optical disk.

Referring to FIG. 26, an example of the calibration data track area 23 (3), formed in an erasable or re-writable type of optical disk, is shown. Each of recording tracks is defined by a land portion PL and a groove portion PG. An upper line L1 shows a surface outline of the optical disk wherein the information is recorded only in the groove portions PG. In this case, the groove portions PG are defined as the boundary lines 24. When the information is recorded in the groove portions PG only (not shown in FIG. 26), the land portions PL are defined as the boundary lines 24.

A lower line L2 also shows a surface outline of the optical disk wherein the information is recorded both in the land and groove portions. In this case, each area between neighboring leading and trailing edges corresponds to each recording area which is a groove portion PG or a land portion PL.

Figure 3:
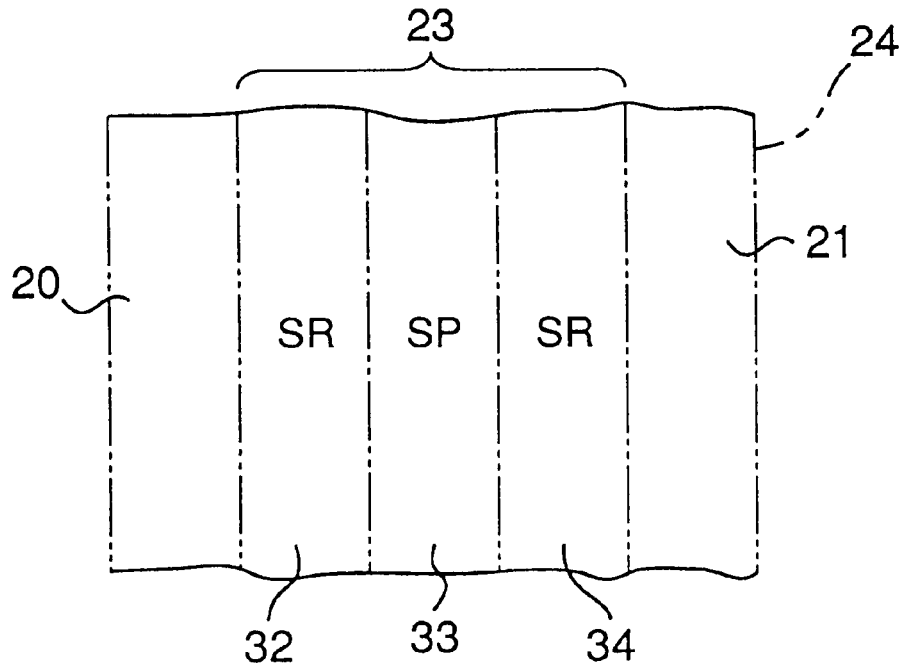
FIG. 3 is a graph schematically showing a first example of signals recorded in the calibration data area of FIGS. 1A and 1B.

Referring to FIG. 3, a first example of the calibration data track area 23 (3) of FIG. 2 is shown. Note that no pit is indicated in this figure for the sake of brevity. The first track 32 is recorded with a random signal SR. The second track 33 is recorded with a specific pattern signal SP. The third track 34 is recorded with the random signal SR.

The random signals SR are produced by distributing the Eight to Fourteen Modulated signals including 3T signal S3T to 11T signal S11T. Note that "T" represents a reversed number of the basic frequency, and is also the window width.

The afore-mentioned situation is next described with reference to the pit mark and pit space on the optical disk 1. The random signal SR is a combination of a plurality of pit marks and pit spaces. The pit marks have a predetermined number, nine for example, of different lengths each corresponding to that of 3T signal S3T to 11T signal S11T. The pit spaces have predetermined, nine for example, different lengths each corresponding to that of signals S3T to signal S11T. The first specific pit pattern recorded in the second track 33 will be described later with reference to FIG. 25.

An apparatus for recording these signals SR and SP to the calibration data track area 23 will be described later with reference to FIG. 79. By utilizing such a calibration data recording apparatus (FIG. 79), the vender or user can prepare the optical disk, recorded with the calibration data, before or after the shipment of the optical disk.

Note that the data recording area 2 of the optical disk 1 is recorded with a signal which is produced by applying an Eight to Fourteen Modulation, hereinafter referred to as an "EFM", to a digital signal in this embodiment, and any other modulation process is applicable according to the present invention. For example, a 3T signal S3T according to the EFM process corresponds to a 2T signal according to a (1,7) Run Length Limited Code, hereinafter referred to as "1–7 modulation". A 11T signal S11T according to the EFM process corresponds to an 8T signal S8T according to the 1–7 modulation. The 3T signal S3T and 11T signal S11T shall correspond to the minimum run length and the maximum run length, respectively, according to other modulation processes.

Figure 25:
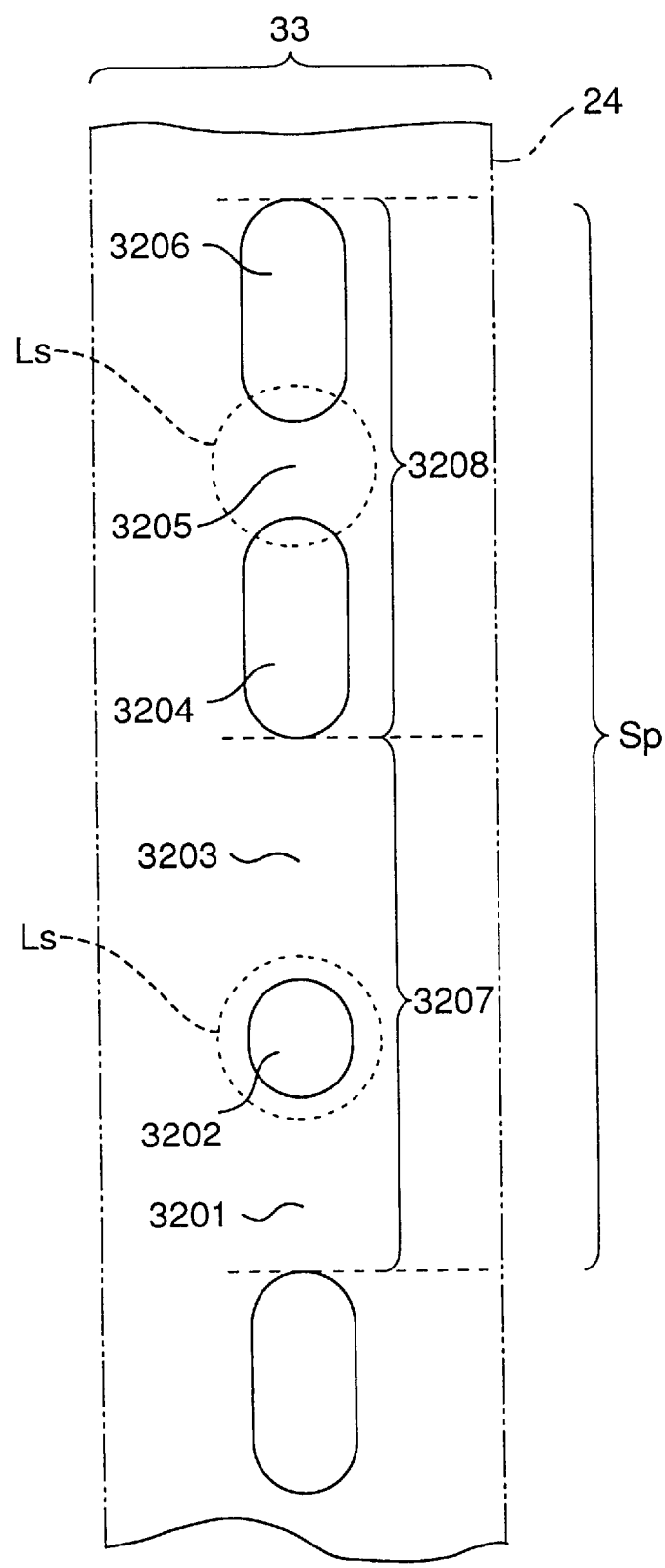
FIG. 25 is a graph schematically showing the pit arrangement of the specific pattern signal of FIG. 3.

Referring to FIG. 25, an example of the pit pattern of the specific pattern signal SP is schematically shown. The specific pattern signal SP is formed by repeating a combination of first and second pit patterns 3207 and 3208. The first pattern 3207 includes a minor pit mark 3202 and two major pit spaces 3201 and 3203 each arranged before and after the minor pit mark 3202 with respect to the recording order. The minor pit mark 3202 is smaller than a laser spot Ls, indicated by a dot line in FIG. 25, and may correspond to the minimum run length. The major spaces 3201 and 3203 are greater than the laser spot Ls, and may correspond to the maximum run length.

The second pit pattern 3208 includes a minor pit space 3205 and two major pit marks 3204 and 3206 respectively arranged before and after the minor pit space 3205. The minor pit space 3205 is smaller than the laser spot Ls, and may correspond to the minimum run length. The major pit marks 3204 and 3206 are both greater than the laser spot Ls, and may correspond to the maximum run length.

Figure 28:
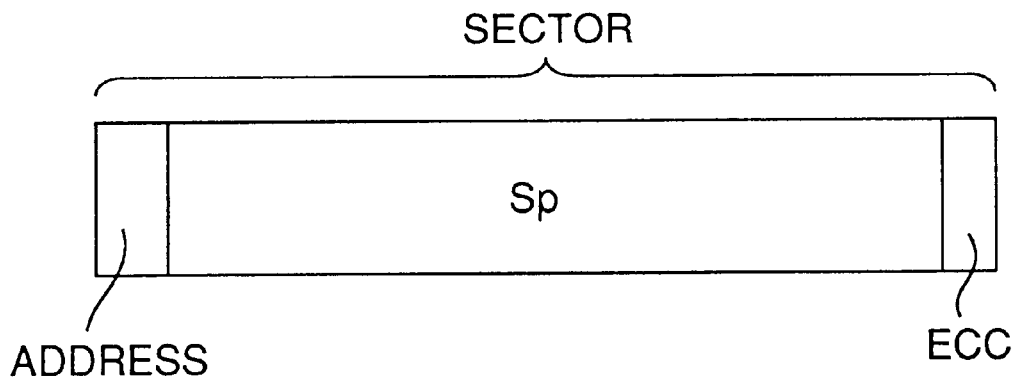
FIG. 28 is a graph showing a sector construction of the specific pattern signal of FIG.3.

Note that the diameter of laser spot Ls is determined so that the laser spot Ls has a light strength as $1/e^2$ times of a central strength, wherein "e" represents the base of a natural logarithm. It is also possible to add address and Error Correction Codes (hereinafter referred to as "ECC") to the specific pattern signal SP within a single sector thereof, as shown in FIG. 28.

First Embodiment

Figure 4:
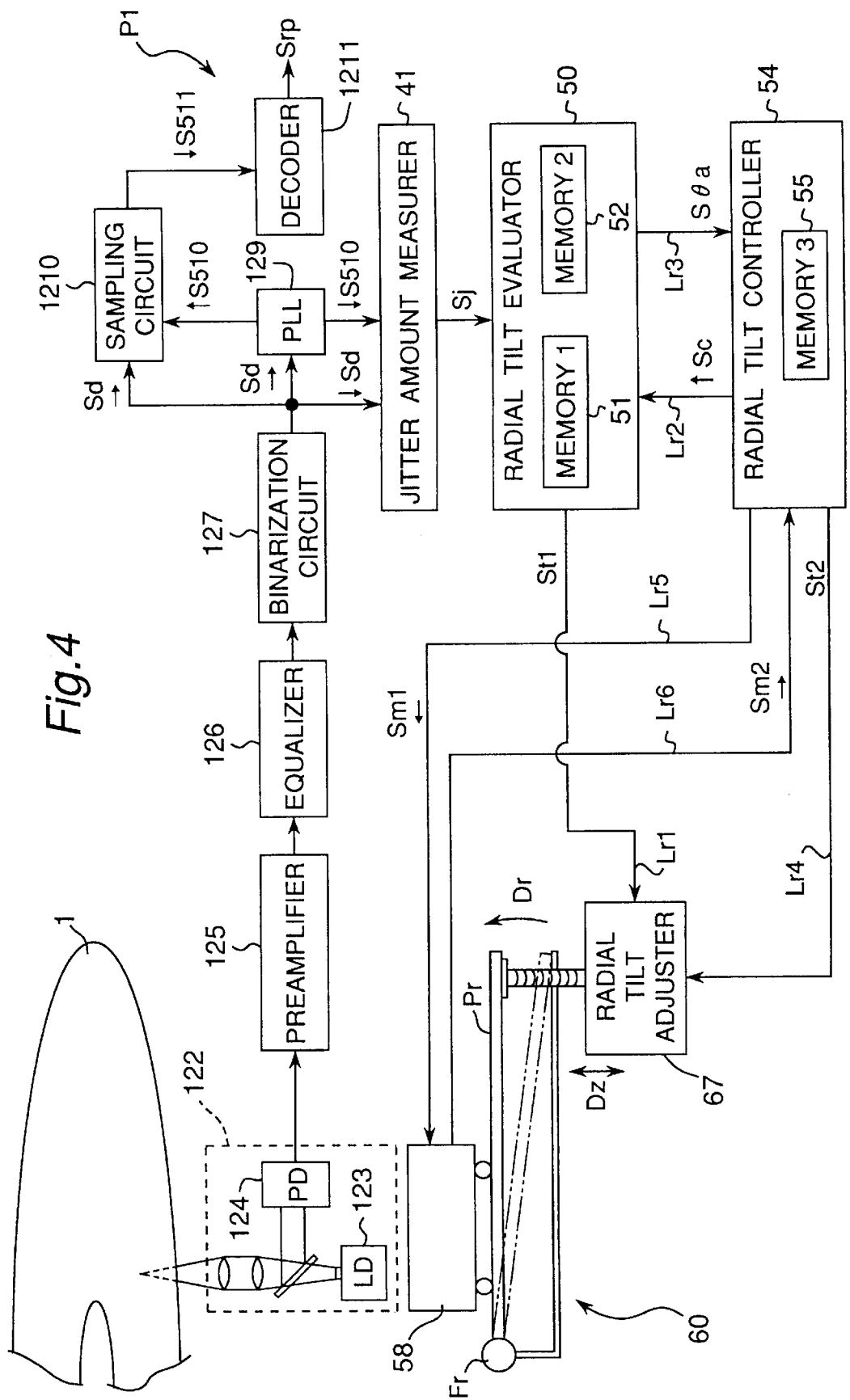
FIG. 4 is a block diagram showing an optical disk apparatus according to a first embodiment of the present invention.

Referring to FIG. 4, an optical disk apparatus according to the first embodiment of the present invention is shown. The optical disk apparatus P1 includes an optical pickup unit 122 for impinging a laser beam onto an optical disk 1 for recording the information thereto and reproducing the information therefrom. For this purpose, the optical pickup unit 122 includes a laser diode 123 for impinging the laser beam, optical instruments for focusing the laser beam on a recording track of the optical disk 1 and for obtaining a desirable position of the reflected laser beam from the optical disk 1, and a pin photo diode 124 for receiving the reflected laser beam so as to produce an electric signal indicative of the condition of thus laser impinged recording track.

A transporter 58 is provided for moving the optical pickup unit 122 in the radial direction of the optical disk 1 so as to scan the recording tracks formed thereon by impinging the laser beam thereto. Thus, the optical pickup unit 122 and the transporter 58 construct an optical pickup system Os. The transporter 58 is placed on a tilting unit 60 which can tilt or incline in the radial direction with respect to the optical disk 1.

Figure 6:
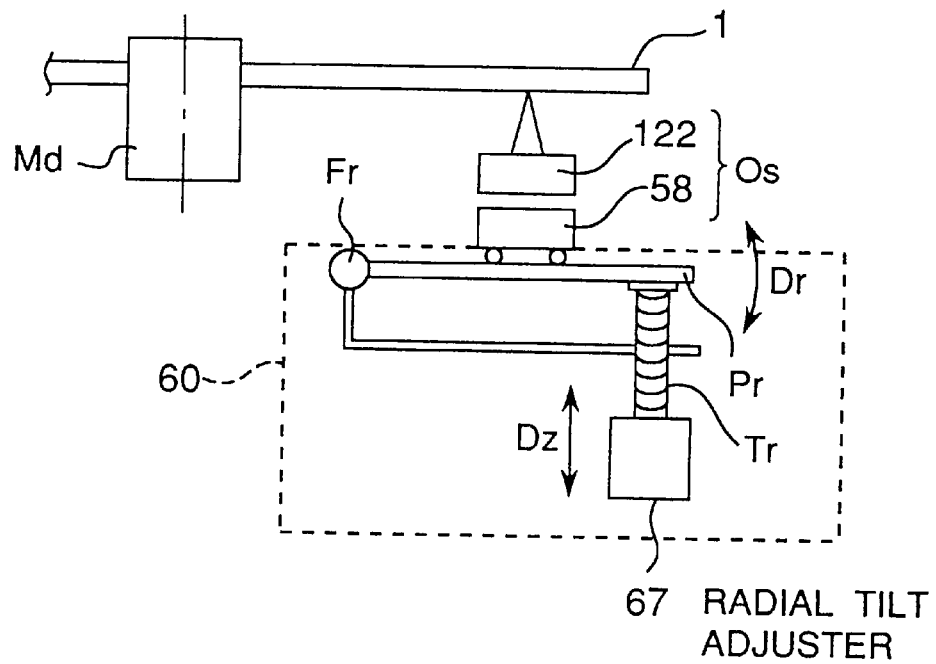
FIG. 6 is a graph schematically showing a construction of a radial tilt adjuster of FIG. 4.

Referring to FIG. 6, the tilting unit 60 is shown. The tilting unit 60 has a base plate Pr for supporting the transporter 58 thereon and a fulcrum member Fr. One end of base plate Pr is rotatably connected the fulcrum member Fr, as in a manner of cantilever, and another end thereof is placed on one end of a vertical reciprocating member Tr. The other end of the vertical reciprocating member Tr is slidably connected to a radial tilt adjuster 67. In this example, the vertical reciprocating member Tr is made by a screw which can be turned by the radial tilt adjuster 67, and is reciprocated in the vertical direction indicated by an arrow Dz.

Every time the base plate Pr is tilted by a turn of the reciprocating member Tr, the jittering amount of the signal reproduced from the calibration data track area 23 by the optical pickup unit 122 is measured. In response to a change in the tilting angle of the base plate Pr, the angle of the optical axis Ax of the pickup unit 122, with respect to the recording surface of the disk 1, also changes. As a result, the crosstalk, from the first and third tracks 32 and 34 neighboring the second track 33 varies, and the jittering of the signal reproduced from these calibration data track 33 also varies. Note that the position at which the jittering amount of the reproduced signal shows its smallest value is the optimum position for the radial tilt.

Referring back to FIG. 4, a preamplifier 125 is connected to the optical pickup unit 122 for increasing an amplitude of the signal from the pin photo diode 124, and for producing a reproduction signal. This reproduction signal varies according to the lengths of the pits formed in the recording track of the optical disk 1.

An equalizer 126 is connected to the preamplifier 125 for receiving the reproduction signal and for reducing the wave interference of the reproduction signal. A binarization circuit 127 is connected to the equalizer 126 for converting the reproduction signal into a digitalized reproduction signal Sd. It is to be noted that the digitalized reproduction signal Sd is subject to the crosstalk, insufficient amplitude, noise, wave from interference, and jittering, as described earlier.

A phase locked loop unit (PLL) 129 is connected to the binarization circuit 127 for receiving the digitized reproduction signal Sd therefrom, and for producing a synchronization signal S510. The generation of the synchronization signal S510 will be described later with reference to FIG. 5.

A sampling circuit 1210 is connected to the binarization circuit 127 and the phase looked loop unit 129 for receiving the digitized reproduction signal Sd and the synchronization signal S510, respectively, therefrom. The sampling circuit 1210 samples the digitized reproduction signal Sd with respect to the synchronization signal S510 so as to produce a channel data S511.

A decoder 1211 is connected to the sampling circuit 1210 for receiving the channel data S511 therefrom, and for decoding it by applying the error correction to reproduce an original signal Srp. The decoded signal Srp is further transferred to the next stage of operation.

A jittering amount measurer 41 is connected to the binarization circuit 127 and the phase locked loop unit 129 for receiving the signals Sd and S510 therefrom, respectively. Based on these two signals Sd and S510, the jittering amount measurer 41 measures the jittering amount of the signal reproduced from the calibration data track area 23, and produces a jittering signal Sj.

Figure 5:
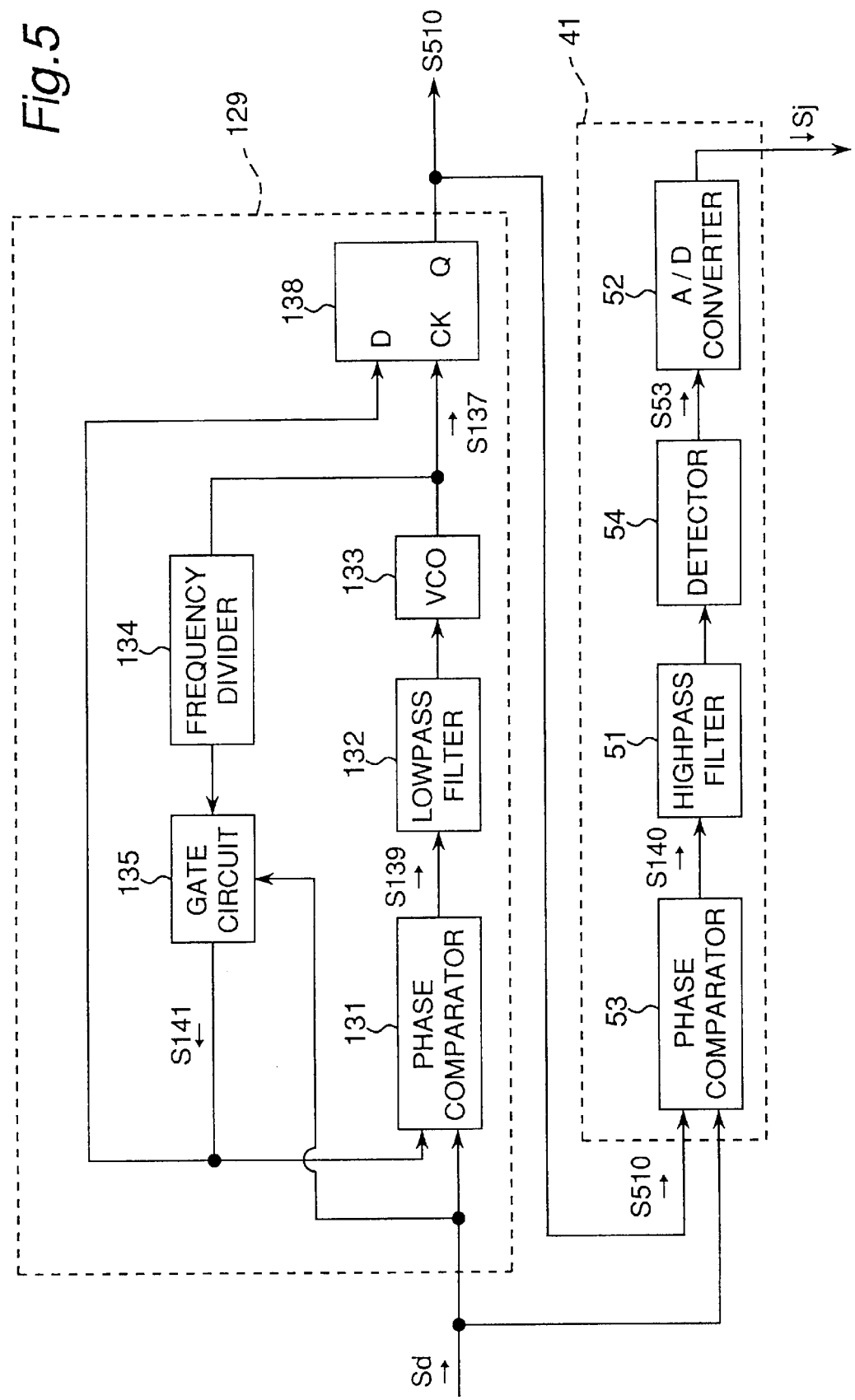
FIG. 5 is a block diagram showing a jitter amount measurer and a phase locked loop unit (PLL) of FIG. 4.

Referring to FIG. 5, the details of the phase locked loop unit 129 and the jittering amount measurer 41 are described. The phase loop lock unit 129 includes a first phase comparator 131, a low-pass filter 132, a voltage controlled oscillator (VCO) 133, a frequency divider 134, a gate circuit 135, and a D-type flip-flop circuit 138 which are connected as shown in FIG. 5. The jittering amount measurer 41 includes a second phase comparator 53, a high-pass filter 51, a detector 54, and an A/D converter 52 which are connected as shown in FIG. 5. The first phase comparator 131 is connected to the binarization circuit 127 for receiving the digital reproduction signal Sd therefrom, and is further connected to the gate circuit 135 for receiving a signal therefrom. The second phase comparator 53 is connected to the binarization circuit 127 and the D-type flip-flop circuit 138 for receiving the signals Sd and S510, respectively, therefrom.

In operation, the first phase comparator 131 detects a phase difference between the reproduction signal Sd and a signal S141 outputted from the gate circuit 135, to thereby produce a first phase difference signal S139 indicative of the phase difference and the frequency difference between those signals. The low-pass filter 139 extracts only the low frequency components from the difference signal S141 to produce a VCO control signal having a voltage for controlling the VCO 133. Based on this VCO control signal, the VCO 133 produces a clock signal S137. The frequency divider 134 divides the clock signal S137 into a predetermined frequency. The gate circuit 135 passes the signal, which is outputted from the frequency divider 134, based on the reproduction signal Sd input thereto.

In other words, the frequency divided signal S141 is transferred to the phase comparator 131 and the D-type flip-flop circuit 138 as the signal S139 only when the reproduction signal Sd is present. At this time, the VCO 133 operates such that two input signals Sd and S141 (S139) have the same phase. As a result, the synchronization signal S510, synchronized with the basic period of the digitized reproduction signal Sd, is obtained.

The second phase comparator 53 detects the phase difference between signals Sd and S510, and then produces a second phase difference signal S140 indicative of the thus detected phase difference.

The high-pass filter 51 extracts the high frequency components from the second phase difference signals S140 and transfers them to the detector 54.

The detector 54 detects the high frequency components and produces a signal S53. The greater the jitter of the reproduction signal Sd becomes, the greater the signal S53 becomes. The A/D convertor 52 digitizes this signal S53 to produce the jitter signal Sj indicative of, and corresponding to, the current amount of radial tilt θr.

Referring back to FIG. 4, a radial tilt evaluator 50, including a first and second memory 1 and 2 is connected to the jittering amount measurer 41 for receiving the jittering signal Sj so as to detect the amount of radial tilt θr. The radial tilt evaluator 50 produces a radial tilt adjuster control signal St1 for controlling the radial tilt adjuster 67 so as to tilt the tilting unit 60 by a predetermined tilting pitch. The evaluator 50 is connected to the radial tilt adjuster 67 by a line Lr1 for transferring the signal St1 therethrough.

A radial tilt controller 54, having a third memory 55, is connected to the radial tilt evaluator 50 by lines Lr2 and Lr3. The controller 54 is further connected to the radial tilt adjuster 67 by a line Lr4, and is connected to the transporter 58 by lines Lr5 and Lr6.

When the radial tilt calibration operation starts, the radial tilt controller 54 produces and transfers a start command signal Sc to the radial tilt evaluator 50 through the line Lr2. Upon receipt of the signal Sc, the radial tilt evaluator 50 produces the radial tilt adjuster control signal St1. The radial tilt evaluator 50 detects the current jitter amount at the current titling angle based on the signals Sj and St1. Thus, the detected address and the jitter amount are stored in the memories 51 and 52, respectively, and are renewed every time the tilting unit 60 changes the tilting angle by the current signals Sj and St1.

Based on the renewed data, the radial tilt evaluator 50 determines an optimum tilting angle at which the radial tilt is the smallest, and produces an optimum tilting angle signal Sθa. This signal Sθa is transferred to the radial tilt controller 54 through the line Lr3, and is stored in the memory 55.

The radial tilt controller 54 produces a radial tilt compensation signal St2 based on the signal Sθa indicative of the difference between the current tilting angle and the determined optimum angle. This radial tilt compensation signal St2 will be transferred to the radial tilt adjuster 67 through the line Lr4, so that the radial tilt adjuster 67 drives the tilting unit 60 so as to set the optical pickup system Os at the optimum radial tilt position.

The controller 54 further produces a transporter driving signal Sm1 for driving the transporter 58 which moves the optical pickup system Os so as to scan the optical disk for recording or reproducing the signal. The transporter 58 produces an address signal Sm2 indicative of the current position of the system Os, with respect to the optical disk 1, and feeds the signal back to the controller 54 through the line Lr6.

Figure 27A:
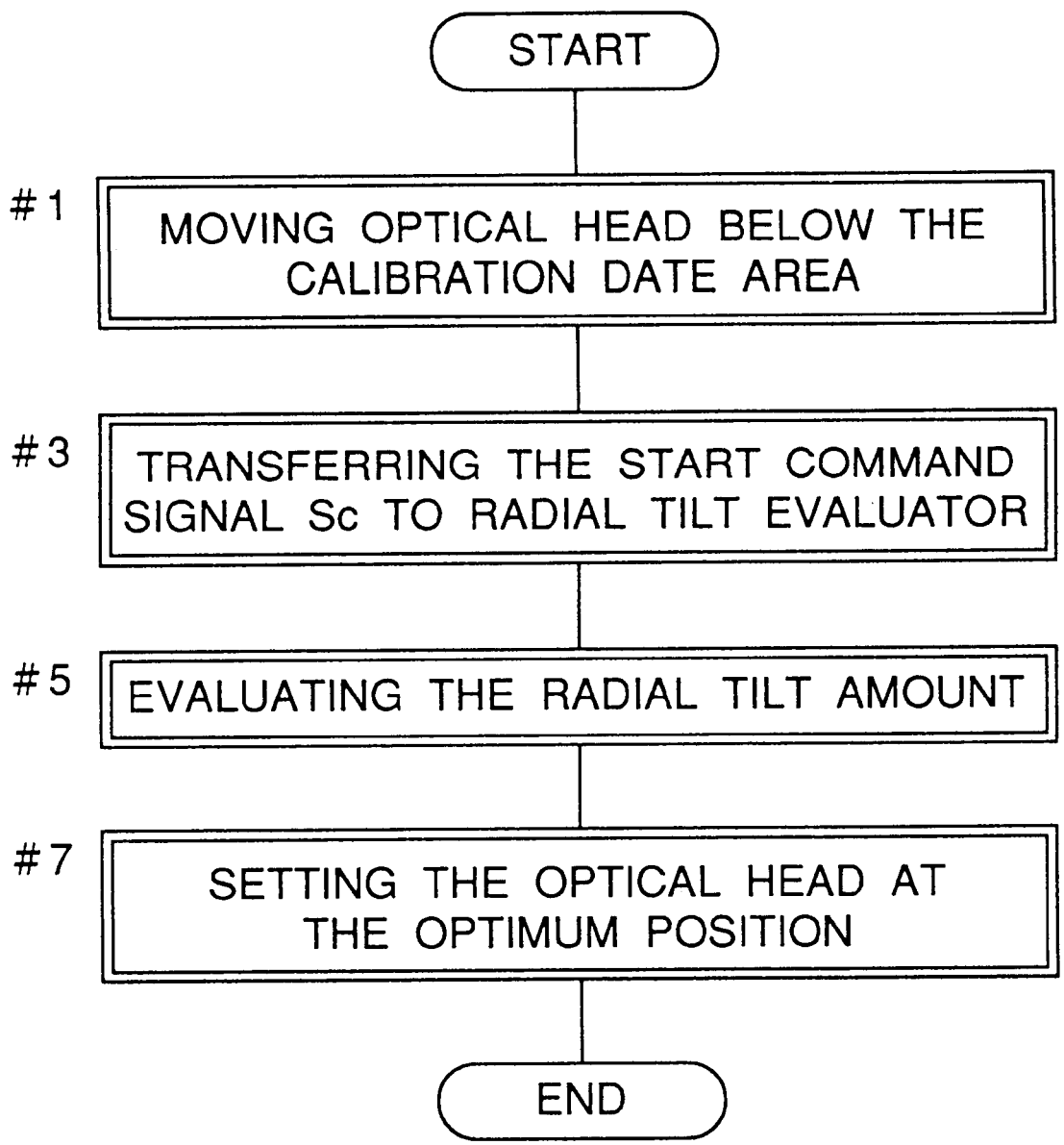
FIG. 27A is a flow chart showing a main routine of an operation performed by the optical disk apparatus of FIG. 4 with the optical disk of FIG. 1A.

With reference to FIG. 27A, the radial tilt adjusting operation of the optical disk apparatus of FIG. 4 using the optical disk 1 of FIG. 1A is described below. Each of blocks in the flow chart shows the routine block.

At block #1, when the operation starts, the controller 54 controls the transporter 58 so as to move an optical head of the optical pickup unit 122 towards the lead-in area of the disk 1. The optical pickup 122 reads the lead-in area first to obtain the address of the calibration data track area 23. Based on this address data, the radial tilt controller 54 further controls the transporter 58 so as to move the optical head (optical pickup unit 122) to the position below the calibration data track area 23 of the disk 1. The optical pickup unit 122 reproduces the calibration data from the data track area 23. In this example, the calibration data track area 23 is provided at an inner circumference, but is not limited in this regard. Any suitable position on the disk 1 can be used for the calibration data track area 23. Then, the procedure advances to the next block #3.

At block #3, the radial tilt controller 54 produces and transfers the start command signal Sc to the radial tilt evaluator 50 so as to start the radial tilt evaluating operation. Then, the procedure advances to the next block #5.

At block #5, the radial tilt evaluating operation, performed by the radial tilt evaluator 50, occurs, and such operation described later with reference to FIG. 81. Next, the procedure advances to the block #7.

Figure 77:
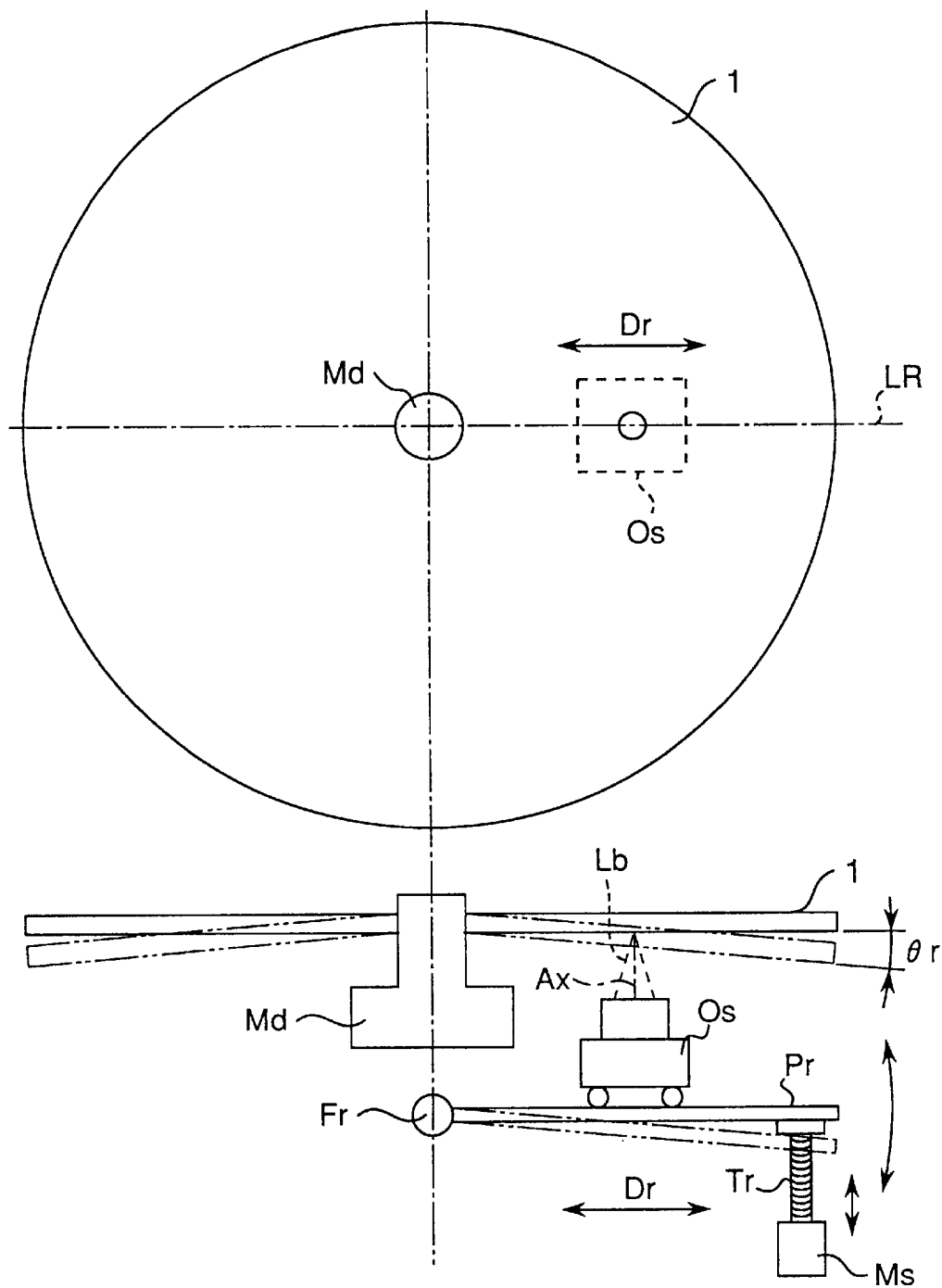
FIG. 77 is a graph explaining the radial tilt adjustment according to the present invention.

At block #7, the radial tilt controller 54 stores the optimum tilting angle signal Sθa obtained at the block #5 in the third memory 3. Then, the radial tilt controller 54 further drives the radial tilt adjuster 67 to set the base 60 at an optimum position based on the optimum tilting angle signal Sθ. Next, the optical head of optical pickup unit 122 moves on the base 60 with the optimum radial tilt θr in the radial direction Dr for recording and reproducing operations, as shown in FIG. 77.

Figure 81:
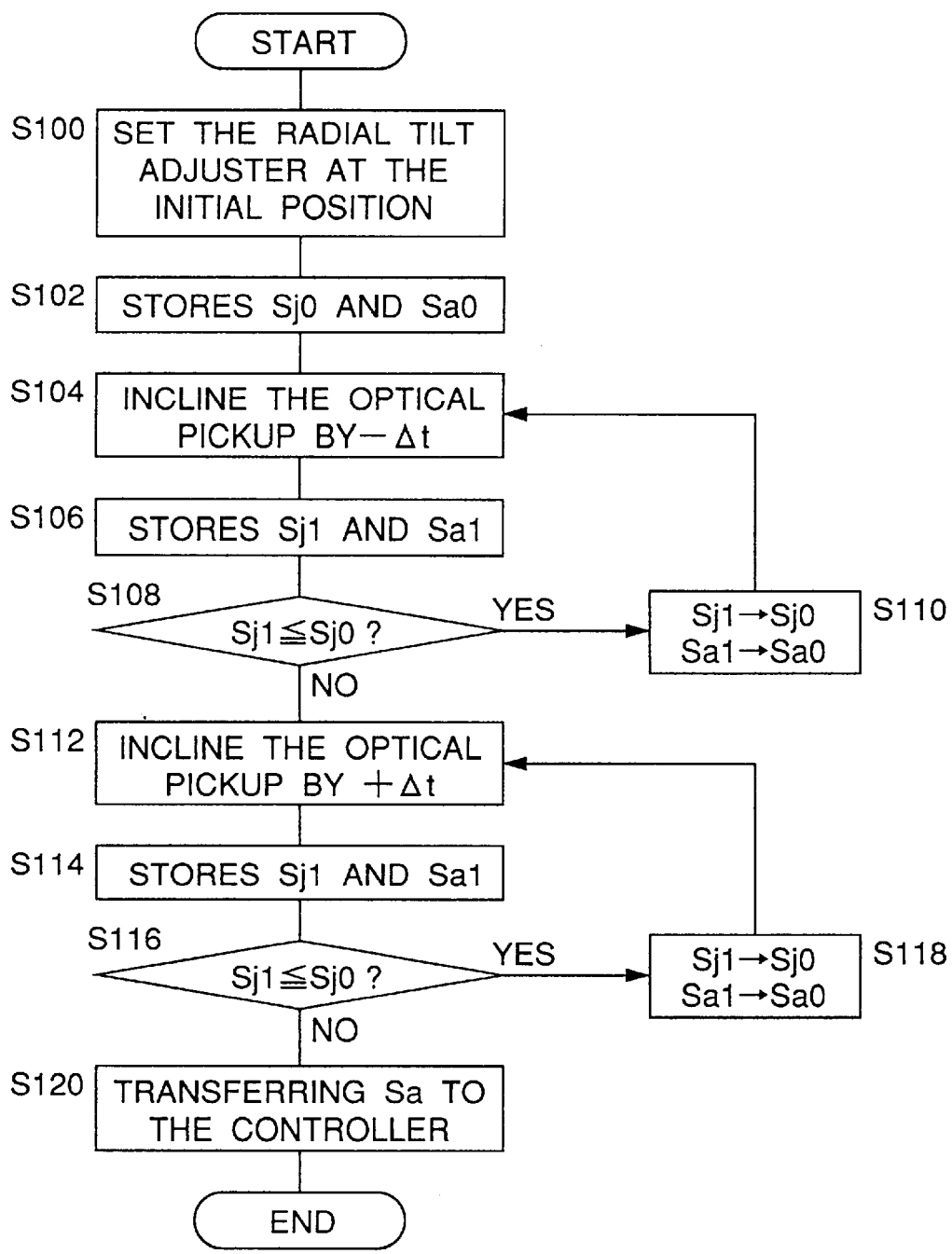
FIG. 81 is a flow chart showing the radial tilt evaluating routine block #5 of FIG. 27A and blocks #15 and #23 of FIG. 27B.

Referring to FIG. 81, the radial tilt calibrating block #5 of FIG. 27A is shown.

Figure 76:
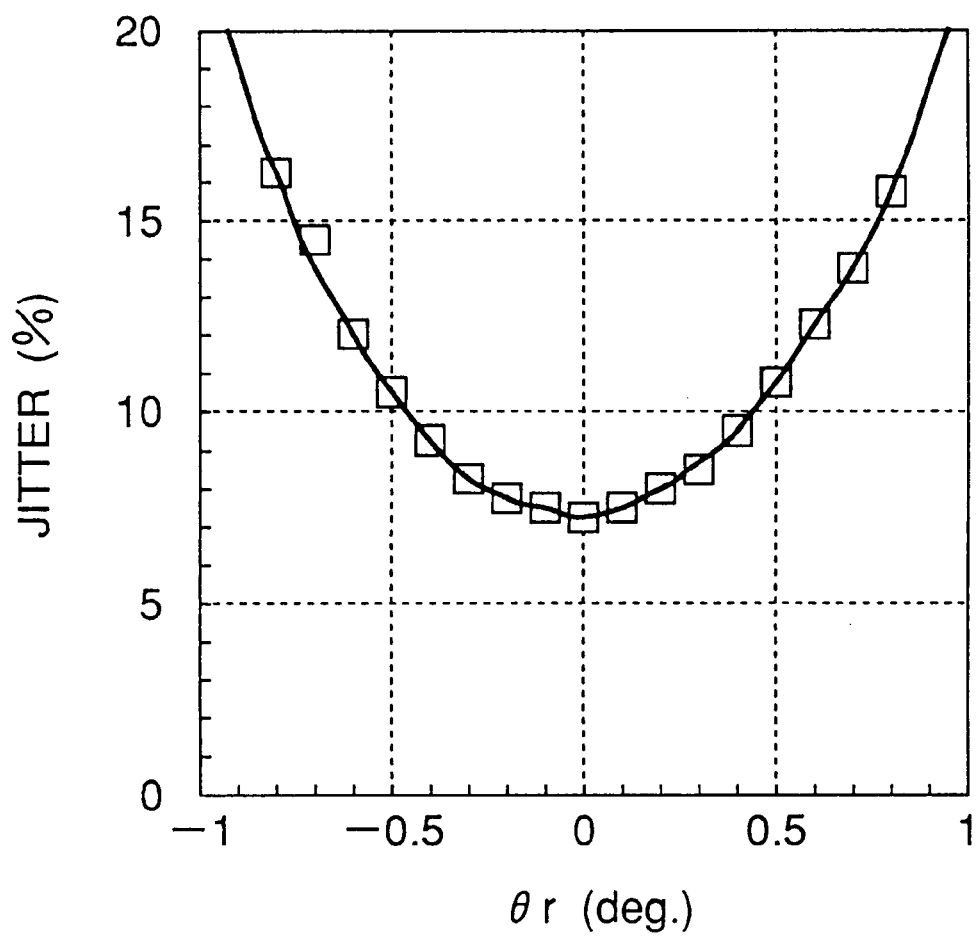
FIG. 76 is a graph showing the relationship between the radial tilt and the jittering amount.

At step S100, upon receipt of the start command signal Sc from the radial tilt controller 54, the radial tilt evaluator 50 drives the radial tilt adjuster 67 so as to set it to an initial position. The initial position is a position at which the base 60 crosses the rotating axis of the disk motor Md substantially at a right angle. In other words, the free of the base 60 is preferably set at a center position between top and bottom dead positions thereof. The top and bottom dead positions are determined, taking FIG. 76 into consideration, so that the base 60 is inclined within the maximum radial tilting angle range (preferably, +0.5° to −0.5°). Then, the procedure advances to the next step S102.

At step S102, the radial tilt evaluator 40 detects the jitter amount corresponding to the current tilting angle θa based on the jittering signal Sj. Then, the current values indicating the tilting angle θa and the jittering amount Sj are stored in the address "0" of the first memory and the second memory 2, respectively. Hereinafter, these tilting angle and jittering amount with respect to the address of each memory is expressed with the suffix of "address number" after each reference symbol, such as θa0 and Sj0, for recognition purposes. Then, the procedure advances to the next step S104.

Figure 75:
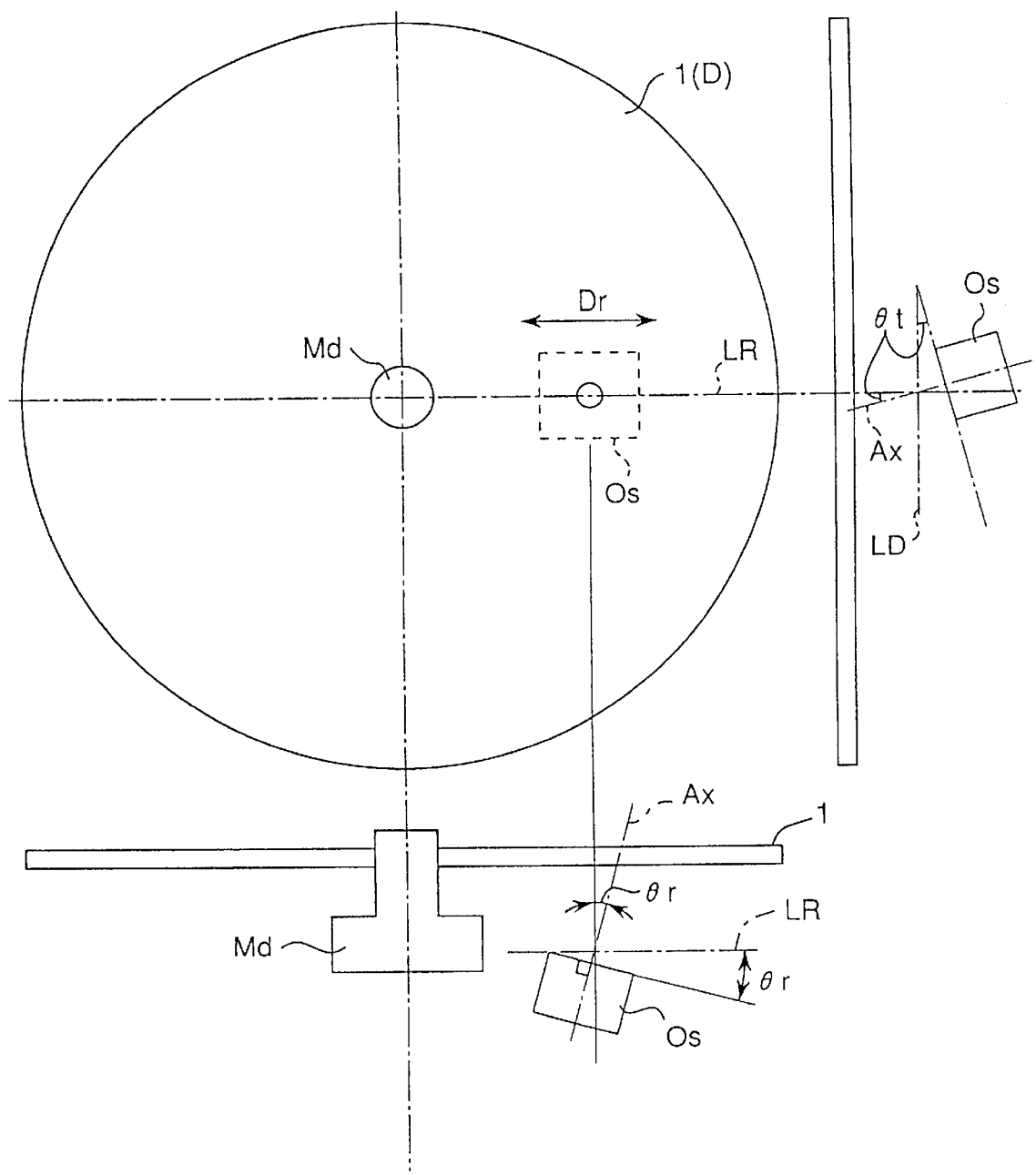
FIG. 75 is a graph explaining the radial tilt of the optical disk.

At step S104, the radial tilt evaluator 40 drives the radial tilt adjuster 67 to move downward (or clockwise) by a predetermined amount Δt so as to incline the base 60 downward by an angle θa corresponding to the resolution thereof. This radial tilt evaluating resolution is preferably 0.1 degree in consideration of FIG. 76. This is because the optical disk 1 tends to hang down from its circumference when it is set in the disk motor Mb, as previously described with reference to FIG. 75. Therefore, the radial tilt θr will be improved by turning down the base 60. Hereinafter, the downward direction is expressed with a prefix of "−" before the moving amount, such as −Δt, and the upward (or anticlockwise) direction with a prefix of "+", such as +Δt. Then, the procedure advances to the next step S106.

At step S106, the radial tilt evaluator 50 detects the current jitter amount corresponding to the current radial tilt when the base 60 is rotated clockwise (FIG. 75) by the resolution angle −Δt. Then, the detected current jittering amount Sj1 and the tilting θa1 are stored in the address "1" of the first memory 51 and the second memory 52, respectively. It is to be noted that the jittering amount Sj will be detected every time the base 60 is moved up or down by the resolution angle Δt. Therefore, the interval between moving the base 60 by Δt is defined as a radial tilt evaluation cycle hereafter. Then, the procedure advances to the next step At step S108, it is judged whether the jittering amount Sj1 of the current evaluation cycle is equal to or smaller than Sj0 of the previous evaluation cycle. When the radial tilt is improved, the jittering amount Sj becomes smaller, and "YES" is judged. Then the procedure advances to step S110.

At step S110, the jittering amount sj0 and tilting angle θa0 stored in the memories 1 and 2, respectively, at the previous evaluation cycle, are replaced with the current jitter values Sj1 and tilting angle θa1, respectively. Then, the procedure returns to step S104. Note that the operations of steps S110, S104, S106, and S108 are repeated until "NO" is judged at step S108. Thus, the optimum position at which the jittering amount Sj is the smallest, meaning that the radial tilt is also the minimum, is searched for, with respect to the clockwise direction.

However, when "NO" is judged at step S108, this indicates that the radial tilt becomes worse than the previous cycle by tilting the base 60 downward. Therefore, the operation to tilt down the base 60 is halted, and then the procedure advances to the next step S112.

At step S112, the radial tilt evaluator 50 drives the radial tilt adjuster 67 to move upwards, by the minimum resolution amount +Δt, so as to detect the optimum position in this direction. Then, the procedure advances to the next step S114.

At step S114, the current jittering amount Sj1 and the tilting θa1 are stored in the address "1" of first memory 51 and second memory 52, respectively, in a manner similar to that of step S106. Then, the procedure advances to the next step S116.

At step S116, it is judged whether the jittering amount Sj1 of the current evaluation cycle is equal to or smaller than Sj0 of the previous evaluation cycle. When "YES" is judged, this indicates that the radial tilt is improved, and the procedure advances to step S118.

At step S118, the jittering amount Sj0 and tilting angle θa0 stored in the memories 51 and 52, respectively, are replaced with the current values Sj1 and tilting angle θa1, respectively, in a manner similar to that at step S110. Then, the procedure returns to step S112. Note that the operations of steps S118, S112, S114, and S116 are repeated until "NO" is judged at step S116, similar to step S108. And, the optimum position for reducing the radial tilt is searched for, with respect to the anticlockwise direction.

When "NO" is judged at step S116, this indicates that the tilting angle at the previous evaluation cycle is the optimum position for reducing the radial tilt the greatest as a result of searching both in the clockwise and anticlockwise directions. Then the procedure advances to step S120.

At step S120, the tilting angle θa0 currently stored in the memory 2 is transferred to the radial tilt controller 54 as the optimum tilting angle signal Sθa. Then, the procedure terminates.

Figure 1B:
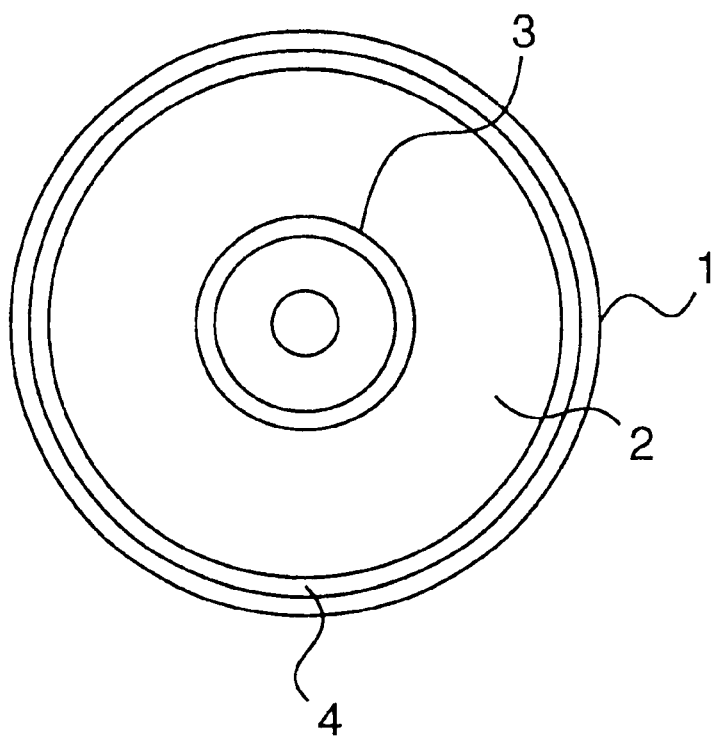
FIG. 1B is a plan view schematically showing an optical disk having two calibration data areas formed therein according to the present invention.

Referring to FIG. 1B, another example of the optical disk shown in FIG. 1A is shown. In this example, the optical disk 1 has another calibration data recording area 4 in addition to the calibration data area 3 of FIG. 1A. Although these two areas 3 and 4 are separately formed in the inner circumference and the outer circumference in FIG. 1B, respectively, these two areas 3 and 4 can be formed in other places in the disk 1, as described above.

Figure 27B:
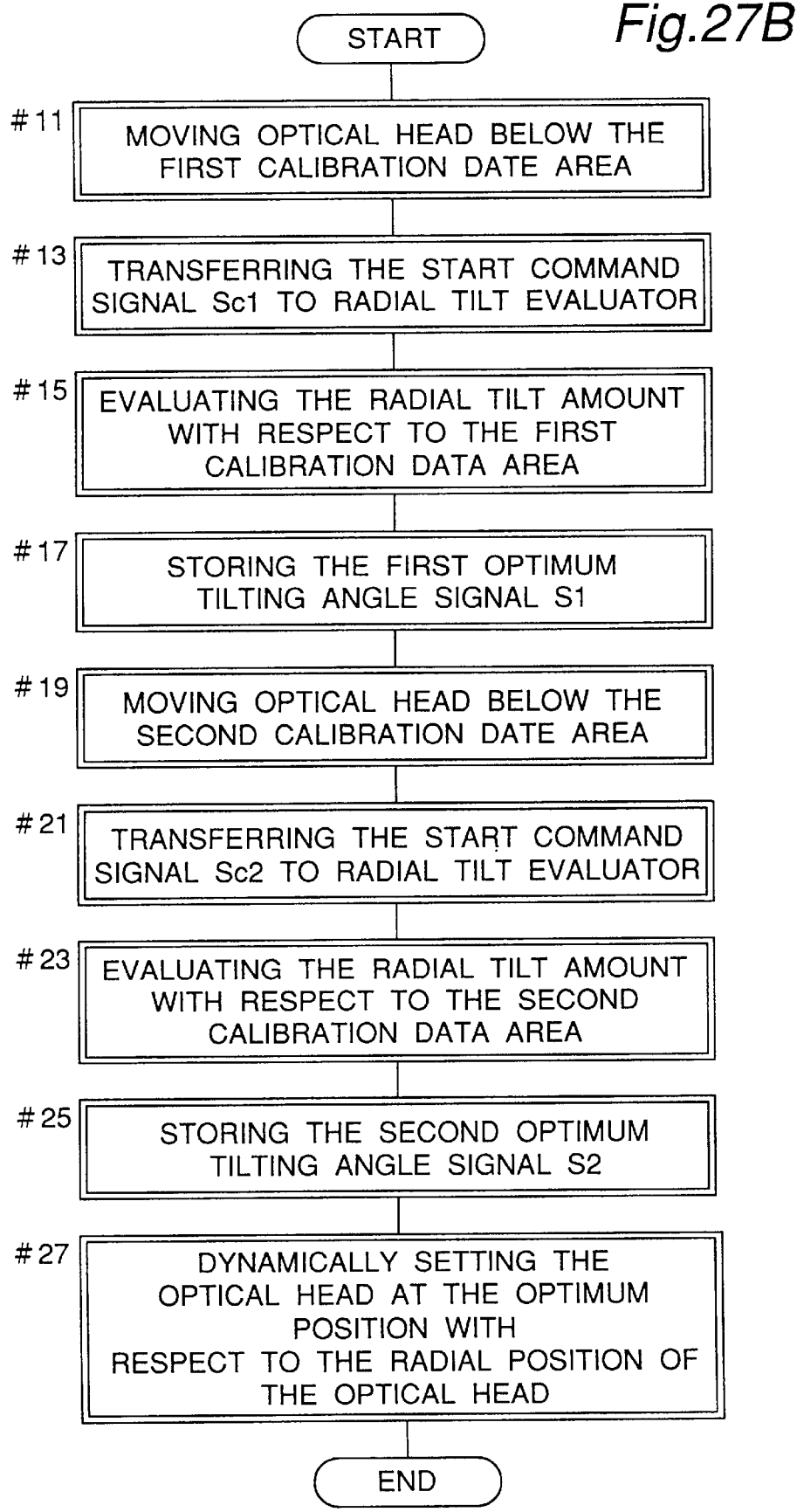
FIGS. 27B is a flow chart showing a main routine of an operation performed by the optical disk apparatus of FIG. 4 with the optical disk of FIG. 1B.

Referring to FIG. 27B, the radial tilt adjusting operation performed by the optical disk apparatus of FIG. 4 using the optical disk 1 of FIG. 1B is shown. Principally the operations of FIG. 27B are the same as those of FIG. 27A except for the operations relating to the second recording area 4.

For example, the blocks #11, #13, and #15 correspond to the blocks #1, #3, and #5, respectively.

However, at block #17, the radial tilt controller 54 stores the optimum tilting angle signal Sθa obtained at the block #5 as a first optimum tilting angle signal S1 in the memory 55.

The blocks #19, #21, #23, and #25 relate to the second radial tilt evaluation operations with respect to the second data area 4. Thus, the blocks #19, #21, and #23 correspond to the blocks #11, #13, and #15, respectively. Then, at block #25, the optimum tilting angle signal Sθa, obtained at the block #23, is stored as a second optimum tilting angle signal S2 in the memory 3 of the controller 54.

At block #27, the radial tilt controller 54 interpolates the optimum titling angles between the inner circumference area (3) and the outer circumference area (4). Then, the controller 54 controls the radial tilt adjuster 67 so as to set the optical pickup unit Os (122 and 58) at each of thus interpolated tilting angles according to the position of pickup 122 with respect to the radial direction.

Figure 66:
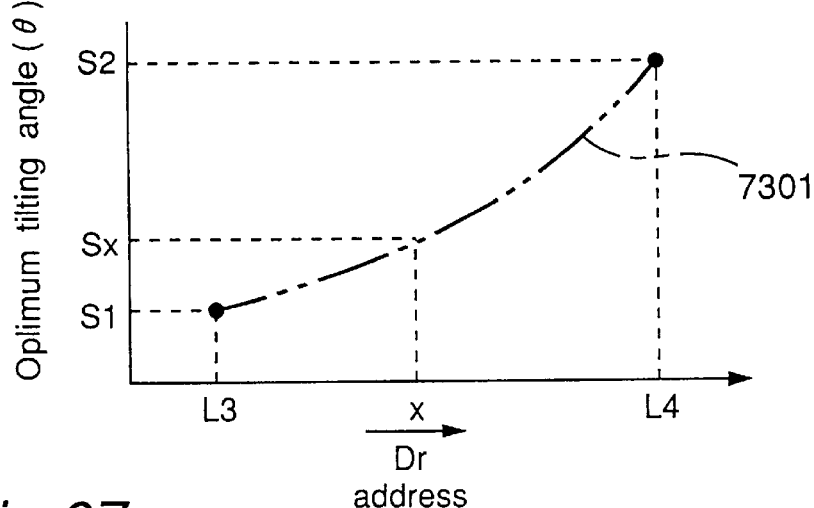
FIG. 66 is a graph showing a relationship between the address and the optimum radial tilt adjusting position.

Referring to FIG. 66, the concept of the tilting angle interpolation by the block #25 is schematically shown. In general, the optimum tilting angle Sθ (corresponding to the radial tilt) has a minimum (S1) at the inner circumference (L3), increases gradually outward, and has a maximum (S2) at the outer circumference (L4). Based on these facts, an optimum tilting angle (Sx) at any position (x) between the inner and outer circumferences of the disk 1 can be determined by using an arithmetical interpolating method.

In FIG. 66, the vertical axis represents the optimal tilting angle (θ) for minimizing the radial tilt, and the horizontal axis represents the address of optical pickup (head) with respect to the scanning direction Dr. Next, the first and second optimum angles S1 and S2 are detected with respect to the first and second calibration data areas 3 and 4, respectively, and are plotted at the address 3 and 4. These two plotted points can be connected by a line 7301 which can be defined as a function of the address and the tilting angle. By determining function factors of the line, it is possible to simulate the actual radial tilt at the recording area 2 between the first and second data area 3 and 4. The function factors of this simulation line 7301 can be theoretically or experimentally determined.

Furthermore, the thus determined function factors of the simulation line 7301 can be recorded in a suitable area of the optical disk 1. The optical disk apparatus according to the present invention can promptly, easily, and dynamically calibrate the radial tilt even when the optical disk set therein is replaced with another disk.

Referring to FIG. 25, an example of the specific pattern signal SP of FIG. 3 is schematically shown. The specific pattern signal SP is formed by repeating a combination of the first and second pit patterns 3207 and 3208. The first pattern 3207 includes a minor pit mark 3202 and two major pit spaces 3201 and 3203 respectively arranged before and after the minor pit mark 3202 with respect to the scanning direction. The minor pit mark 3202 is smaller than a laser spot Ls indicated by a dot line in FIG. 25, and may correspond to the minimum run length. Each of the major pit spaces 3201 and 3203 are greater than the laser spot Ls, and may correspond to the maximum run length.

The second pit pattern 3208 includes a minor pit space 3205 and two major pit marks 3204 and 3206 respectively arranged before and after the minor pit space 3205 with respect to the scanning direction. The minor pit space 3205 is smaller than the laser spot Ls, and may correspond to the minimum run length. Each of the major pit marks 3204 and 3206 are greater than the laser spot Ls, and may correspond to the maximum run length.

Note that the diameter of laser spot Ls is determined so that the laser spot Ls has a light strength $1/e^2$ times of a central strength, wherein "e" represents the base of a natural logarithm. Preferably, the laser spot Ls is the size of 1 μm in diameter. It is also possible to add address and Error Correction Codes (hereinafter referred to as "ECC") to the specific pattern signal SP within a single sector thereof, as schematically shown in FIG. 28. It is to be noted that the laser spot Ls has a diameter of approximately 1 μm when the laser diode 123 is set to emit a laser beam having 680 nm wave length at 0.6 NA (number of apertures).

As previously described, the specific pattern signal SP recorded in the second track 33 of the calibration data track area 23 includes the first pit pattern 3207 and the second pit pattern 3208. The first pit pattern 3207 combines the pit mark 3202 which is smaller than the laser spot Ls and neighboring pit spaces 3201 and 3203 which are greater than the laser spot Ls. The second pit pattern 3208 combines the space 3205 which is smaller than the laser spot Ls and neighboring pit marks 3204 and 3206 which are greater than the laser spot Ls.

As a result, according to the specific pattern signal SP, the reproduced signal experiences jitters that are greater, so that the amount of jittering can be detected correctly even when the jittering amount measurer 41 is subject to the noises caused by the electric circuits included therein. Furthermore, the laser spot Ls (having a diameter of 1 μm, for example) is greater than the pit mark 3207. Therefore, the laser spot Ls also partially scans the pit space areas 3201 and 3202 proximal to the pit mark 3207. Thus, the reproduction from the pit mark 3202 is essentially subject to the inter-symbol interference (due to such a too narrow spaced pit pattern), enhancing the jittering of the reproduced signal from the track 33. This is also the same as the reproduction from the pit space 3205 which is smaller than the laser spot Ls. Note that pit spaces and pit marks which are smaller than the laser spot Ls are provided in the track 33 for enhancing the jittering of the signal reproduced from the track 33. Therefore, the optimum position for the radial tilt can be determined accurately.

Figure 80:
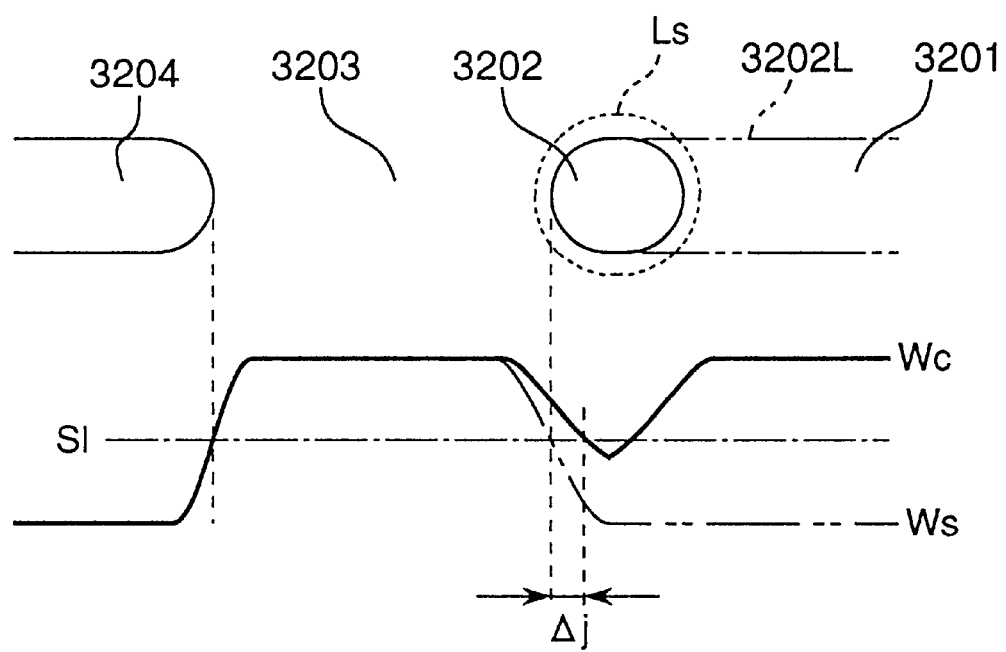
FIG. 80 is a graph showing the relationship between the pit pattern and the signal reproduced therefrom.

With reference to FIG. 80, the signals reproduced from the data track 33 having different pit patterns are shown. A solid line Wc represents a signal reproduced from the pit pattern 3207 of FIG. 25, wherein the pit mark 3202, which is smaller than the laser spot Ls, is sandwiched by pit spaces 3201 and 3203 which are each greater than the laser spot Ls. An imaginary line Ws represents a signal reproduced from a pit mark 3202L which is greater than the laser spot Ls. The pit mark 3202L is formed in a shape of the pit mark 3202 but is elongated toward the pit space 3201 accordingly.

A horizontal center line Sl is a slice line which divides the amplitude of the reproduced signal. Since the laser beam reflected from the track (33) changes according to the area of pit, the reproduction signal from the pit mark 3202L changes its amplitude greater than that from the pit mark 3020 does. In this case, the pit mark 3202L reduces the amplitude of the signal Wc reflected therefrom more significantly and rapidly than the pit mark 3202. As a result, the reproduction signal Ws crosses the slice line Sl earlier than that of the signal Wc by a jittering amount $\Delta j$, as shown in FIG. 80. A distance between these crossing points represents a jittering of the reproduced signal at which the present invention achieves.

Instead of the pattern shown in FIG. 25, it is possible to form the specific pattern signal SP so as to compare the reproduction amplifier of a pit mark or a pit space which is smaller than the laser spot with a pit mark or a pit space which is greater than the laser spot. Such a pattern is effective for optimization of the signal processing circuits such as the adjustment of the equalizer's coefficient.

Furthermore, by calculating the radial tilt of the optical disk 1 based on the calibration data track area 23 formed in the optical disk 1, the recorded signal is reproduced from the aimed recording tracks with reduced crosstalk from the neighboring tracks which are located adjacent to the aimed track. Therefore, the reliability of the reproduction operation is further improved.

Furthermore, since the optimum tilting angle $\theta a$ is stored in the third memory 55 of the radial tilt controller 54 as the optimum tilting angle signal $S\theta a$, it is possible to compare the radial tilt amount of the optical disk apparatus with respect to the optical disks previously set. This can be performed before delivery to the end user occurs for example, by enabling the function check of the optical disk apparatus itself.

The radial tilt calibration according to the present invention can be performed at any time when the radial tilt calibration is required. For example, the optical disk may change its pose or position with respect to the optical pickup or optical head when many vibrations are applied.

The equalizer 126 can be removed from the optical disk apparatus of FIG. 4 when the equalizer 126 reduces the jittering of the reproduced signal too drastically so as to frustrate the detection of the jittering amount. In this case the output from the preamplifier 125 is directly inputted to the binarization circuit 127.

It is noted that any other means, which can detect the jittering amount of the reproduced signal Sd, can be used as the jitter amount measurer 41. It is also possible that the radial tilt may show different values at the inner and outer circumferences of the optical disk when the optical disk is subject to the dimensional errors over the allowable range. Such error may be caused by unevenness of the reflection layer, deformation thereof, and an improper forming process, for example. In this case, it is preferable to compensate the radial tilt with respect to the entire recording area of the optical disk by adjusting the tilting angle of optical pickup Os (122 and 58). For this purpose, according to the present invention, the optical disk having two calibration data areas formed in the inner and outer circumferences, respectively, is provided. The details of the optical disk apparatus, according to the present invention, with this type of optical disk will be described later with reference to FIG. 1B.

Figure 11:
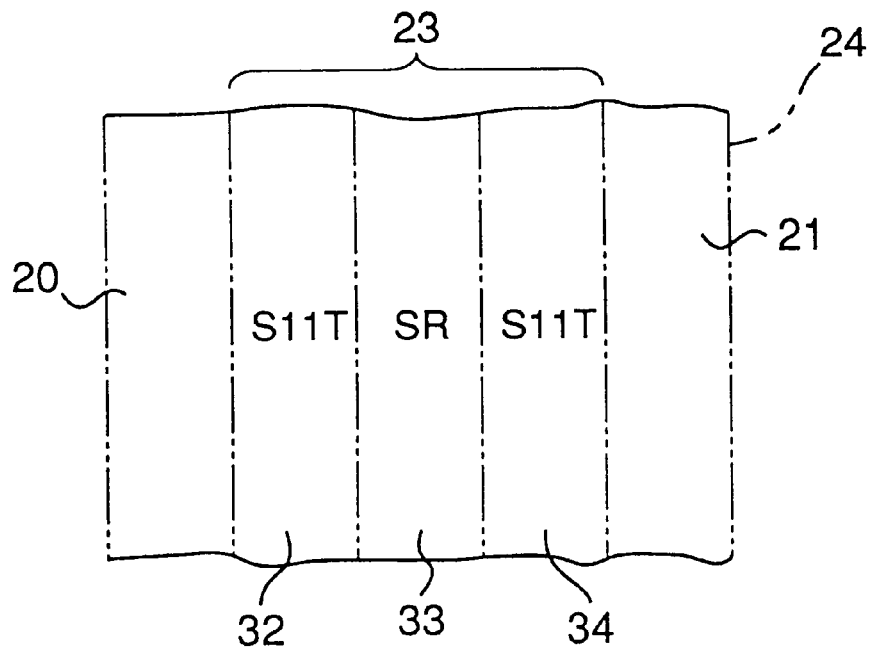
FIG. 11 is a graph schematically showing a second example of signals recorded in the calibration data area of FIGS. 1A and 1B.

Referring to FIG. 11, a second example of the calibration data track area 23 of FIG. 3 is shown. In this example, the first and second tracks are both recorded with the 11T signal S11T. The second track 33 is recorded with the random signal SR.

The random signal SR is produced by distributing the Eight to Fourteen Modulated signals including 3T signal S3T to 11T signal S11T. This situation can be described as follows with reference to the pit marks and pit spaces on the optical disk 1. The random signal SR is a combination of a plurality of pit marks and pit spaces. The pit marks have a predetermined number, nine for example of different lengths each corresponding to that of 3T signal S3T to 11T signal S11T. The pit spaces have predetermined, nine for example, different lengths each corresponding to that of signals S3T to signal S11T.

Figure 29:
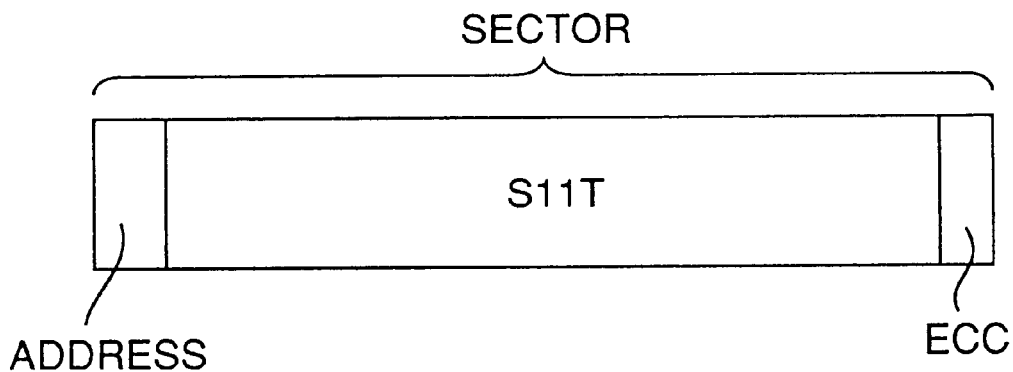
FIG. 29 is a graph showing a sector construction of the 11T signal of FIG. 11.

The first and third tracks 32 and 34 are recorded only with 11T signal S11T which is a consecutive pattern made by a combination of a pit mark having a length corresponding to the 11T signal S11T and a pit space having a length corresponding to the 11T signal S11T. It is also possible to add an address and ECC to the 11T signal within a single sector thereof, as shown in FIG. 29, provided that a sufficient amount of 11T signal components are included.

Figure 12:
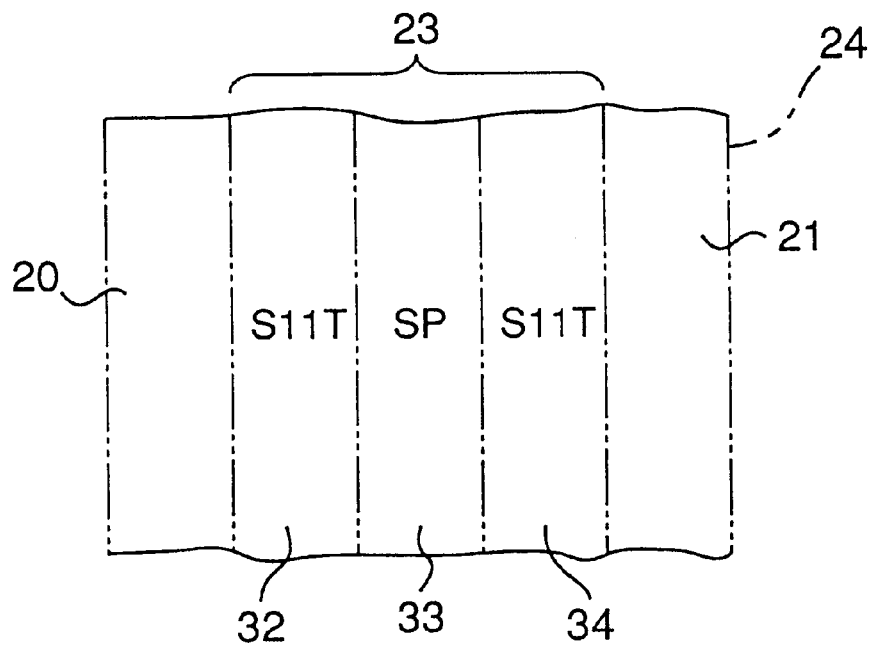
FIG. 12 is a graph schematically showing a third example of signals recorded in the calibration data area of FIGS. 1A and 1B.

Referring to FIG. 12, a third example of the calibration data track area 23, similar to that of FIG. 11, is shown. In this example, the second track 33 is recorded with the specific pattern signal SP. The specific pattern signal SP is constructed as previously described with reference to FIG. 25.

Figure 13:
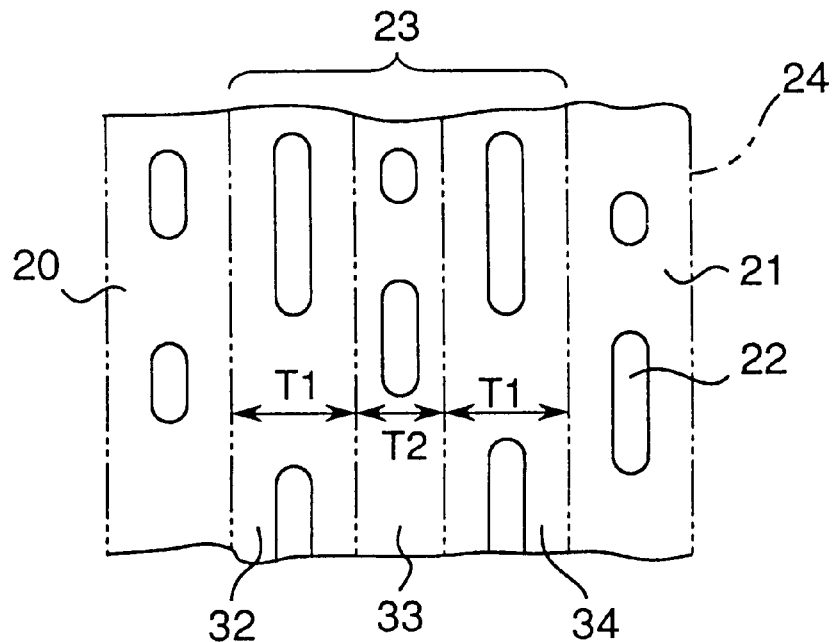
FIG. 13 is a graph showing an alternative of the calibration data area of FIG. 2.

Referring to FIG. 13, an alternative of the calibration data track area 23 of FIG. 2 is shown. Although tracks 32, 33, and 34 all have the same track width T1 in the data area of FIG. 2, the second track 33 has a track width T2 narrower than the width T1 of the other tracks 32 and 34 in this example.

Figure 14:
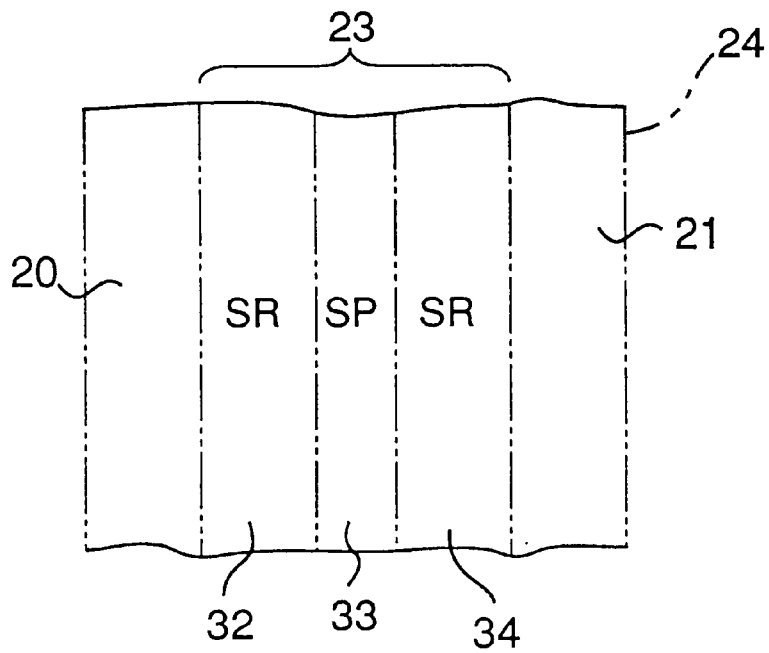
FIG. 14 is a graph schematically showing a first example of signals recorded in the calibration data area of FIG. 13.

Referring to FIG. 14, a first example of the calibration data track area 23 of FIG. 13 is shown. The first and third tracks 32 and 34 are recorded with the random signal SR. The second track 33 is recorded with the specific pattern signal SP.

In this example, since the second track 33 has a narrower track width than the other tracks 32 and 34, the crosstalk to the second track 33 from the neighboring tracks 32 and 34 is greater than the case of FIG. 3. Therefore, the jittering amount caused by the radial tilt is also greater, thereby enabling a further accurate detection of radial tilt. In addition to this, since the calibration data track area 23 occupies a narrower space, more space can be used for recording information.

Figure 15:
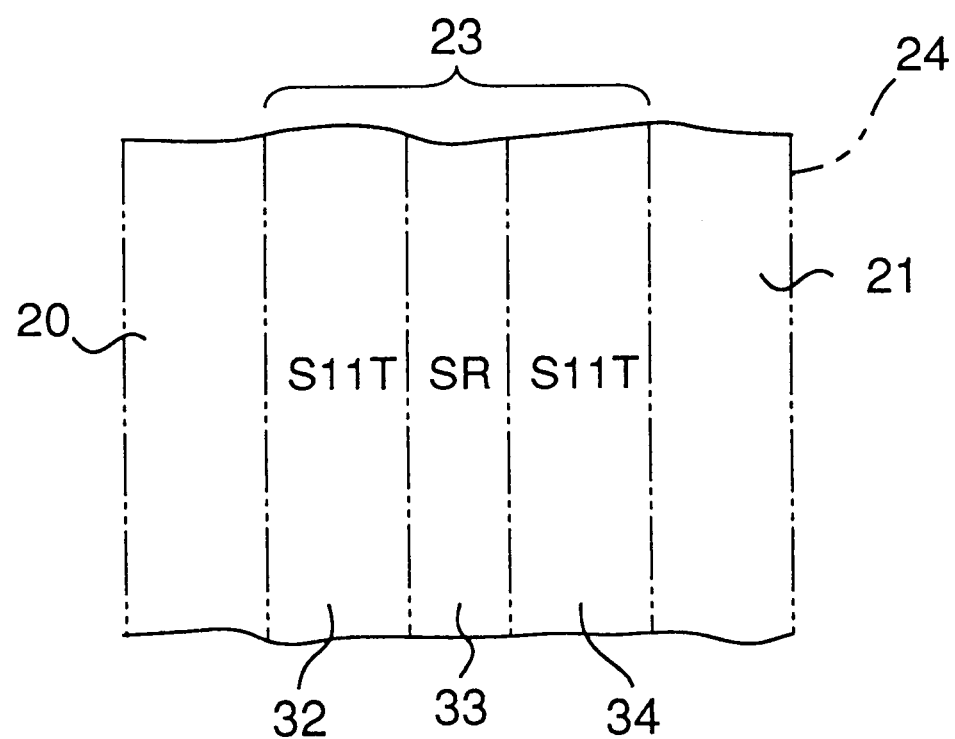
FIG. 15 is a graph schematically showing a second example of signals recorded in the calibration data area of FIG. 13.

Referring to FIG. 15, a second example of the calibration data track area 23 of FIG. 13, similar to that of FIG. 11, is shown. In this example, the first and third tracks 32 and 34 are recorded with the 11T signal S11T, and the second track 33 is recorded with the random signal SR.

Figure 16:
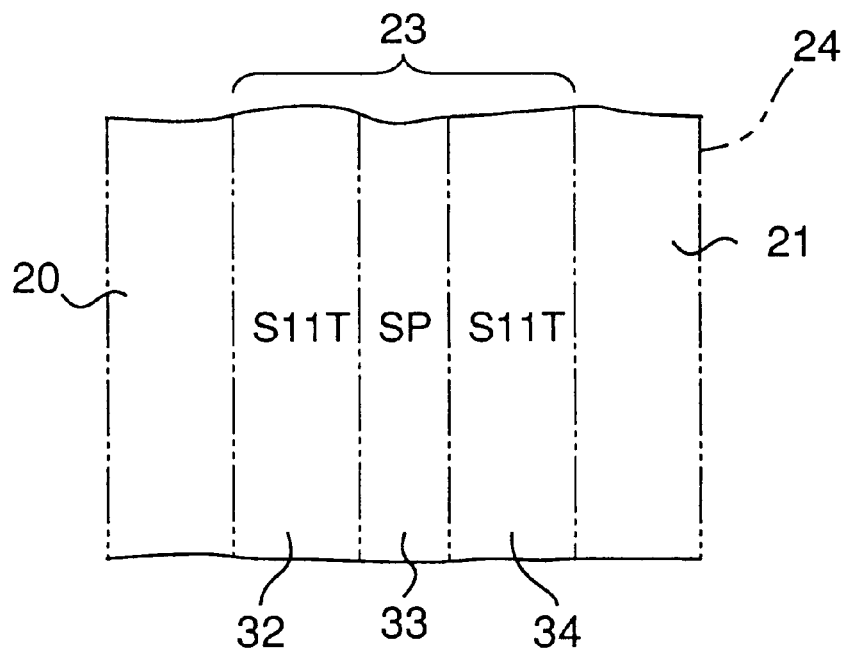
FIG. 16 is a graph schematically showing a third example of signals recorded in the calibration data area of FIG. 13.

Referring to FIG. 16, a third example of the calibration data area of FIG. 13, similar to that of FIG. 12, is shown. In this example, the first and third tracks 32 and 34 are recorded with the 11T signals S11T, and the second track 33 is recorded with the specific pattern signal SP.

Figure 17:
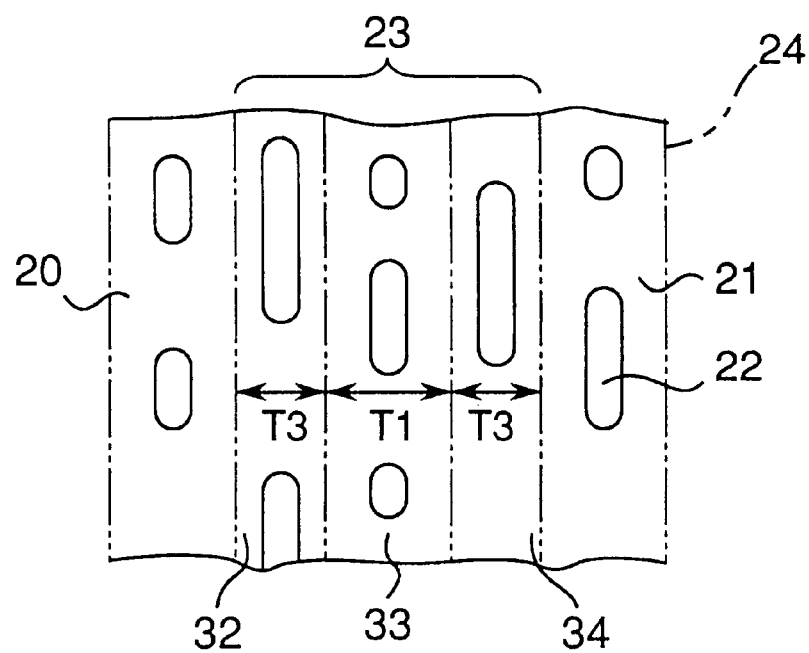
FIG. 17 is a graph showing another alternative of the calibration data area of FIG. 2.

Referring to FIG. 17, another alternative of the calibration data track area 23 of FIG. 2, similar to that of FIG. 13, is shown. Although the second track 33 has a track width T2 narrower than the width T1 of the other tracks 32 and 34 in FIG. 13, the first and third tracks 32 and 34 have the same width T3 which is narrower than the width T1 of the second track 33 in this example.

Figure 18:
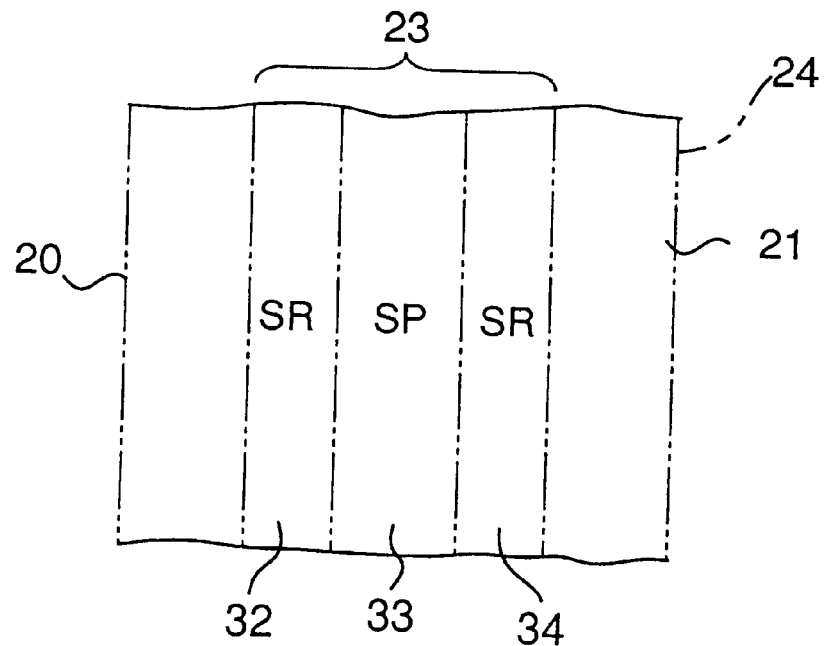
FIG. 18 is a graph schematically showing a first example of signals recorded in the calibration data area of FIG. 17.

Referring to FIG. 18, a first example of the data track area 23 of FIG. 17, similar to that of FIG. 14, is shown. The first and third tracks 32 and 34 are recorded with the random signal SR, and the second track 33 is recorded with the specific pattern signal SP.

In this example, since the first and third tracks 32 and 34 have narrower track widths T3 than the second track 33, the crosstalk to the second track 33 from the neighboring tracks 32 and 34 is greater than the case of FIG. 3. Therefore, the jittering amount caused by the radial tilt is also greater, thereby enabling a further accurate detection of radial tilt. In addition to this, since the calibration data track area 23 occupies a narrower space, more space can be used for recording information.

Figure 19:
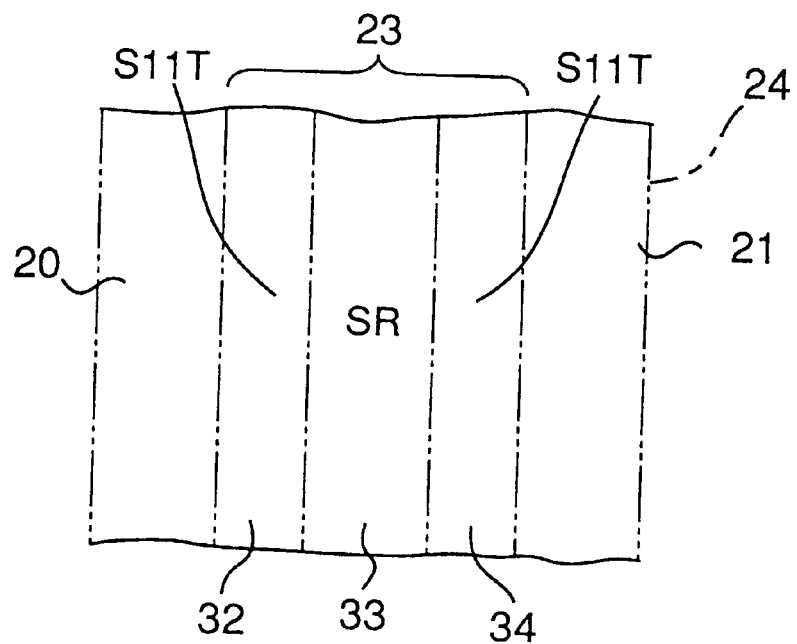
FIG. 19 is a graph schematically showing a second example of signals recorded in the calibration data area of FIG. 17.

Referring to FIG. 19, a second example of the data track area 23 of FIG. 17, similar to that of FIG. 15, is shown. The first and third tracks 32 and 34 are recorded with the 11T signal S11T, and the second track 33 is recorded with the random signal SR.

Figure 20:
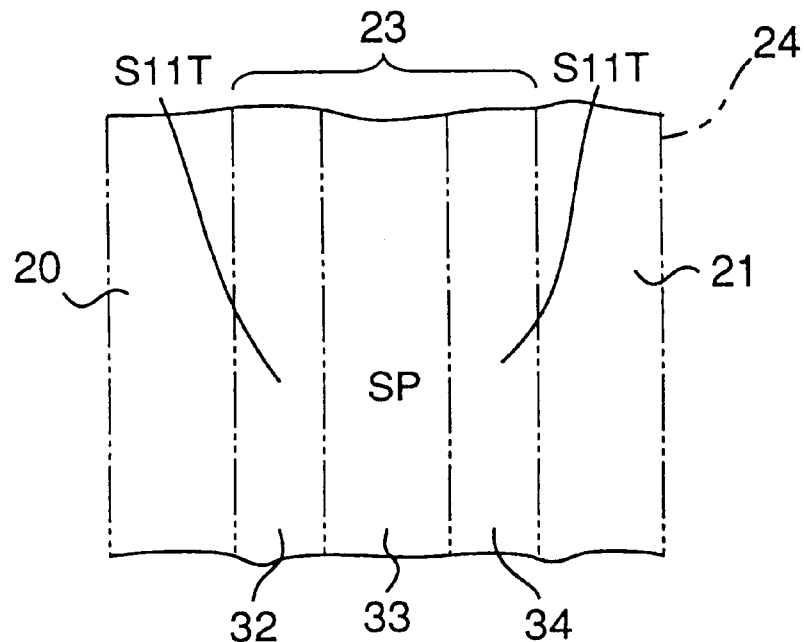
FIG. 20 is a graph schematically showing a third example of signals recorded in the calibration data area of FIG. 17.

Referring to FIG. 20, a third example of the data track area 23 of FIG. 17, similar to that of FIG. 16, is shown. The first and third tracks 32 and 34 are recorded with the 11T signal S11T, and the second track 33 is recorded with the specific pattern signal SP.

Figure 21:
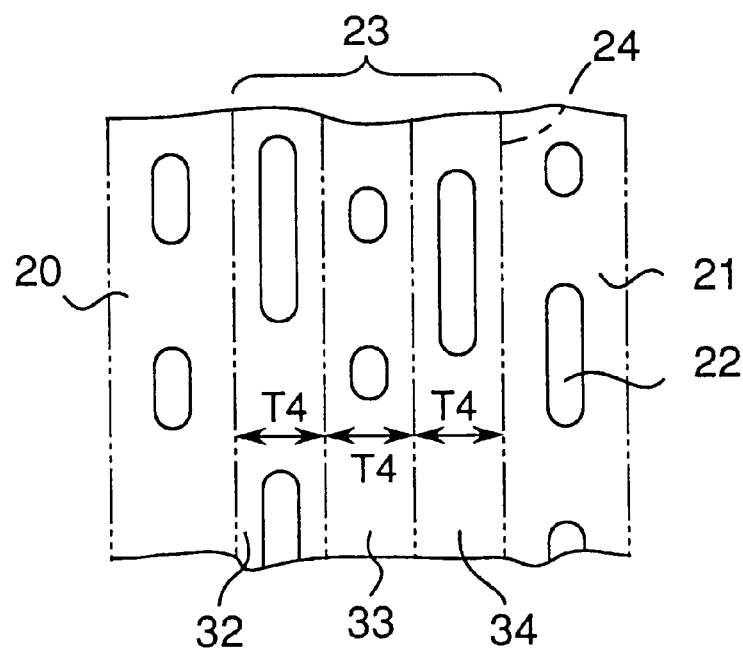
FIG. 21 is a graph showing a further alternative of the calibration data area of FIG. 2.

Referring to FIG. 21, still another alternative of the calibration data track area 23 of FIG. 2, similar to that of FIG. 2, is shown. All the tracks 32, 33, and 34 have the same track width T4 which is narrower than the track width T1 in the recording area 2 of the optical disk 1.

Figure 22:
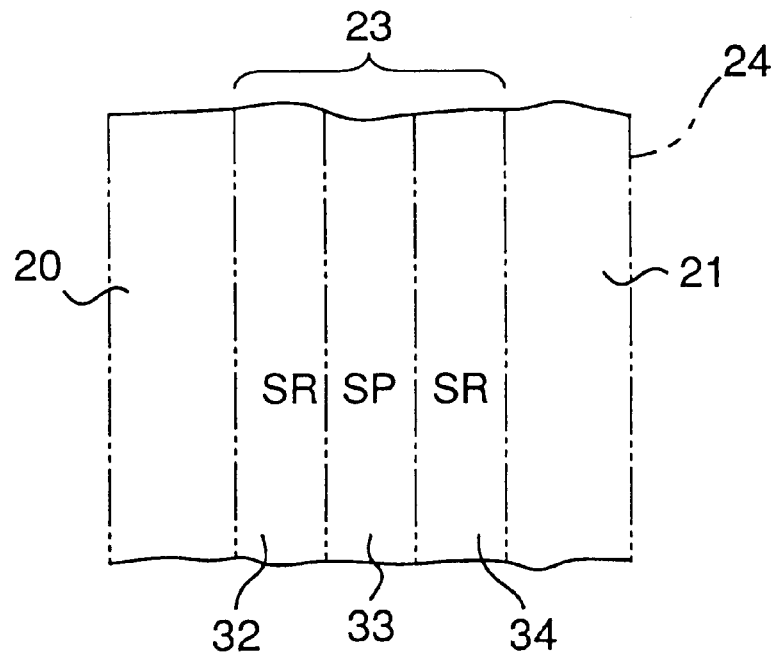
FIG. 22 is a graph schematically showing a first example of signals recorded in the calibration data area of FIG. 21.

Referring to FIG. 22, a first example of the data track area 23 of FIG. 21, similar to that of FIG. 14, is shown. The first and third tracks 32 and 34 are recorded with the random signal SR, and the second track 33 is recorded with the specific pattern signal SP.

In this example, all of the calibration data tracks 32, 33, and 34 have a track width T4 which is narrower than that of recording tracks formed in the recording area 2 of the optical disk 1. Therefore, the crosstalk to the second track 33 from the neighboring tracks 32 and 34 is greater than that of the case of FIG. 3. Therefore, the jittering amount caused by the radial tilt is also greater, thereby enabling a further accurate detection of radial tilt. In addition to this, since the calibration data track area 23 occupies a narrower space, more space can be used for recording information.

Figure 23:
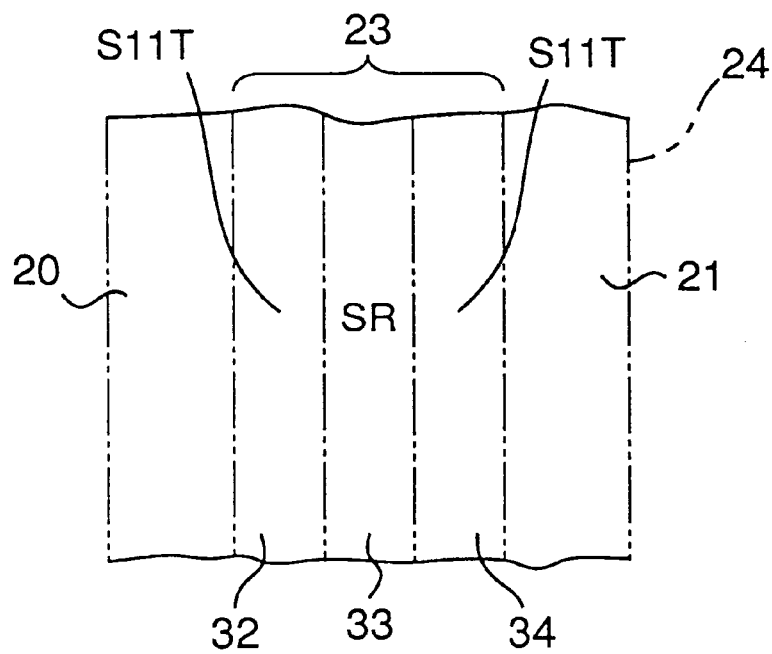
FIG. 23 is a graph schematically showing a second example of signals recorded in the calibration data area of FIG. 21.

Referring to FIG. 23, a second example of the data track area 23 of FIG. 21, similar to that of FIG. 15, is shown. The first and third tracks 32 and 34 are recorded with the 11T signal S11T, and the second track 33 is recorded with the random signal SR.

Figure 24:
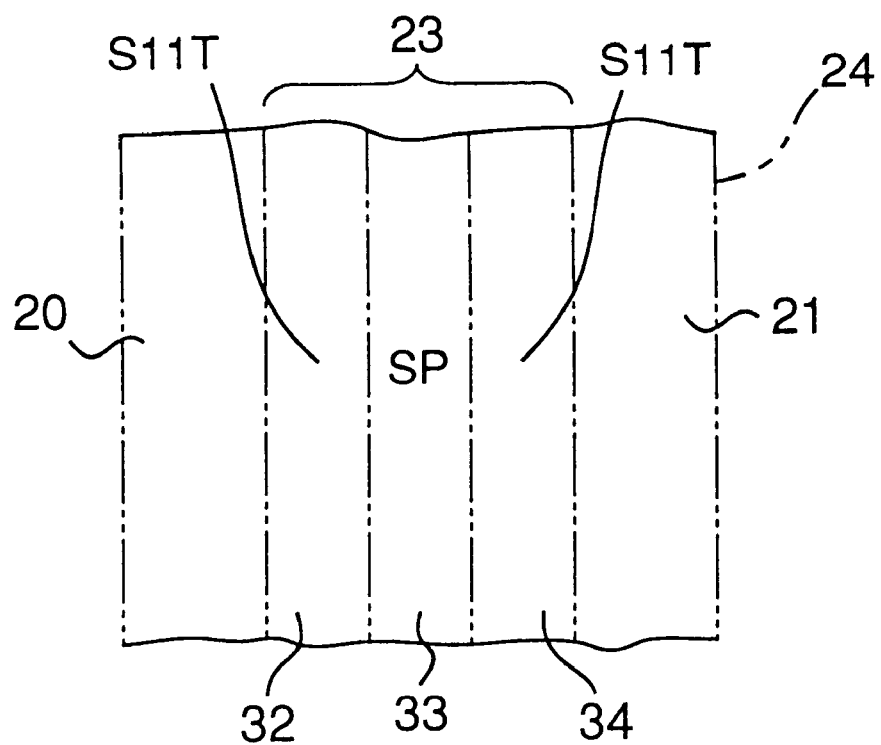
FIG. 24 is a graph schematically showing a third example of signals recorded in the calibration data area of FIG. 21.

Referring to FIG. 24, a third example of the data track area 23 of FIG. 21, similar to that of FIG. 16 is shown. The first and third tracks 32 and 34 are recorded with the 11T signal S11T, and the second track 33 is recorded with the specific pattern signal SP.

Second Embodiment

Figure 7:
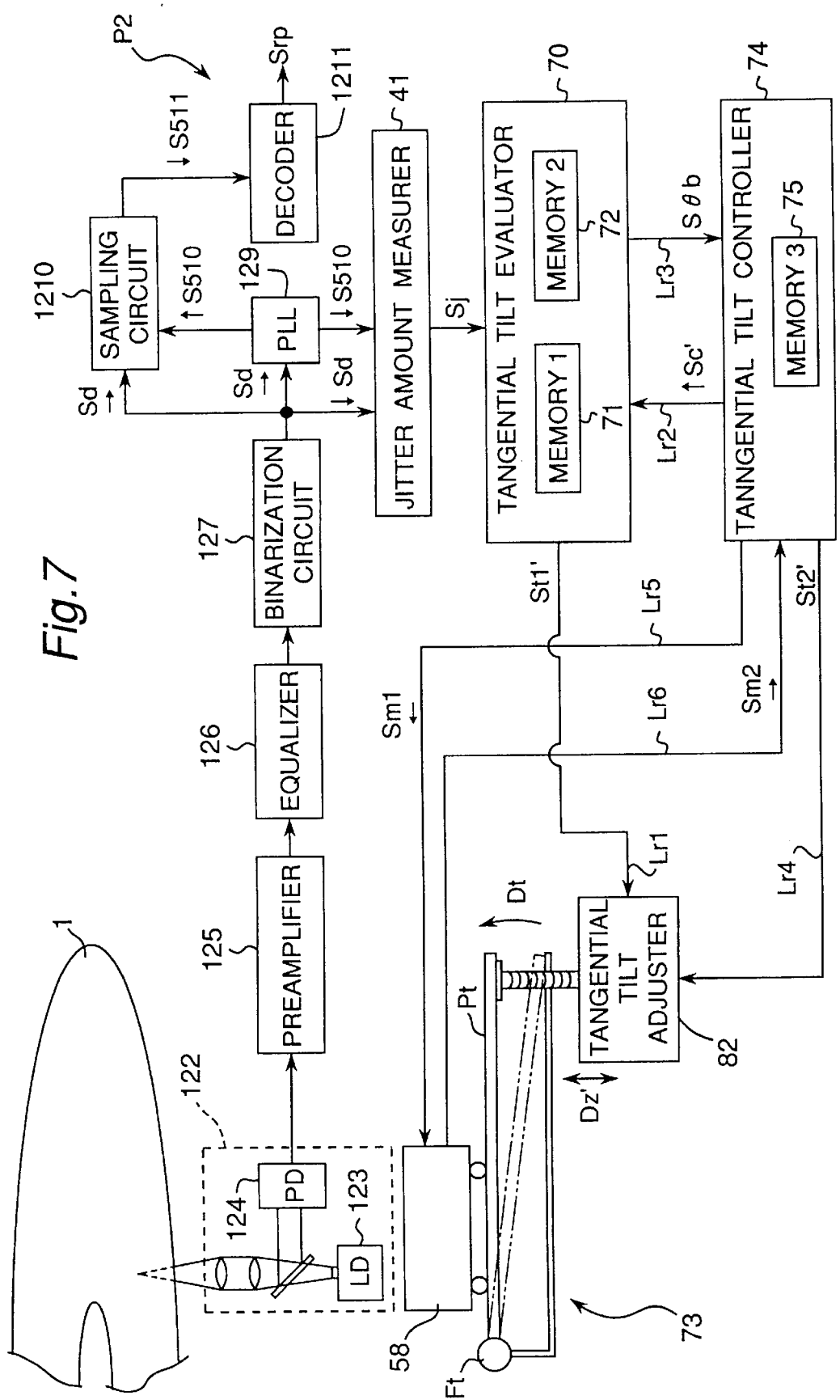
FIG. 7 is a block diagram showing an optical disk apparatus according to a second embodiment of the present invention.

Referring to FIG. 7, an optical disk apparatus according to the second embodiment of the present invention is shown. The optical disk apparatus P2 has a construction very similar to that of FIG. 4, wherein the radial tilt evaluator 50, radial tilt controller 54, and radial tilt adjuster 67 are replaced by a tangential tilt evaluator 70, a tangential tilt controller 74, and a tangential tilt adjuster 82, respectively.

The tangential tilt evaluator 70 and tangential tilt controller 74 are constructed in substantially the same manner as the radial tilt evaluator 50 and radial tilt controller 54, respectively, as shown in FIG. 7. The tangential tilt adjuster 73 is also constructed similar to that of the radial tilting adjuster 60 of FIG. 6 except for the tilting unit 73.

Figure 8:
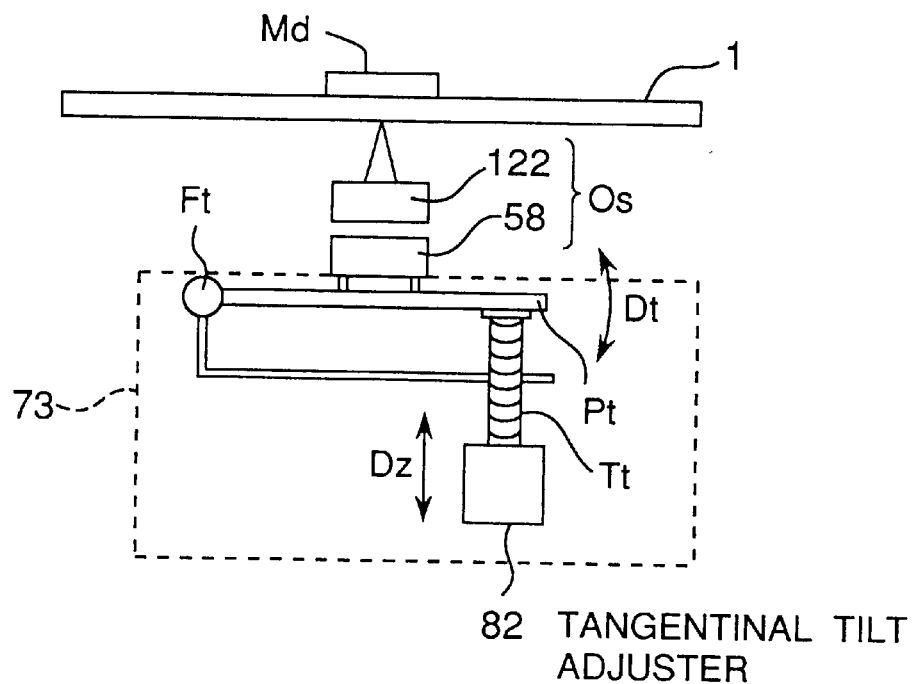
FIG. 8 is a graph schematically showing a construction of a tangential tilt adjuster of FIG. 7.

Referring to FIG. 8, the tilting unit 73 is shown. The tilting unit 73 has a base plate Pt for supporting the transporter 58 thereon and a fulcrum member Ft. One end of base plate Pt is rotatably connected the fulcrum member Fr, as in a manner of cantilever, and another end is placed on one end of a vertical reciprocating member Tt. The other end of the vertical reciprocating member Tt is slidably connected to a radial tilt adjuster 82. In this example, the vertical reciprocating member Tt is made by a screw which can be turned by the radial tilt adjuster 82, and is reciprocated in the vertical direction as indicated by an arrow Dz.

According to the reciprocation of the screw member Tt, the base plate Pt, including the transporter 58 and the optical pickup 122, pivotally rotates in an arrow direction Dr with respect to the fulcrum member Ft. In other words, the radial tilt of the optical pickup system Os can be determined by the tangential tilt adjuster 82. It is to be noted that the base plates Pr and Pr of radial and tangential tilting units 60 and 73 can be formed in a single unit having two fulcrums Fr and Ft.

Figure 78:
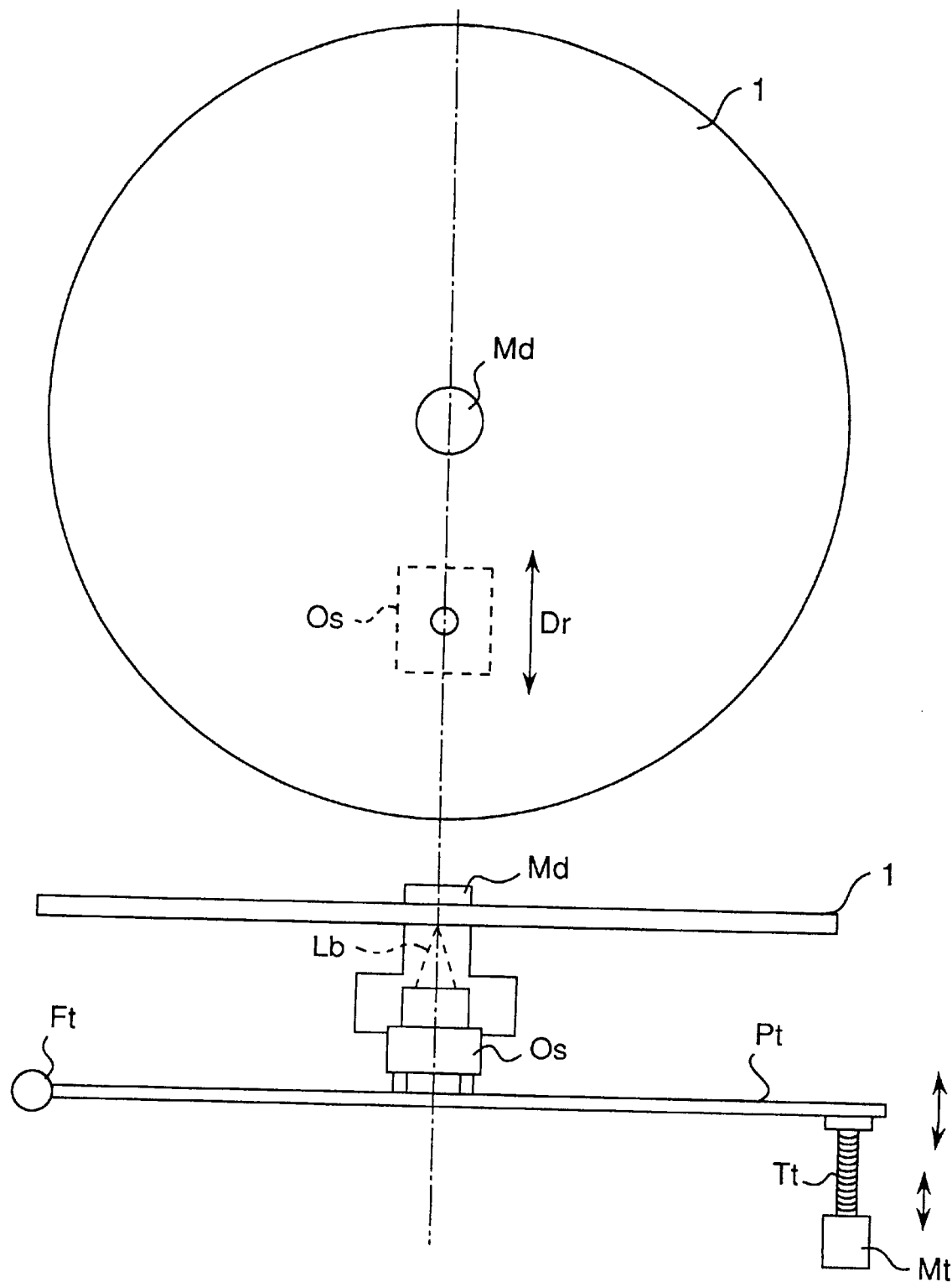
FIG. 78 is a graph explaining the tangential tilt adjustment according to the present invention.

According to this embodiment, the position where the jittering amount is the smallest corresponds to the optimum tilting angle at which the tangential tilt is the smallest. Based on these conditions, the tangential tilt can be compensated by adjusting the titling angle of the optical pickup unit Os, as shown in FIG. 78. Since the operations of this embodiment are basically similar to those described with reference to FIGS. 27A, 27B, and 82, with respect to the optical disks 1 of FIGS. 1A and 1B, further description is omitted for the sake of brevity.

Third Embodiment

Figure 9:
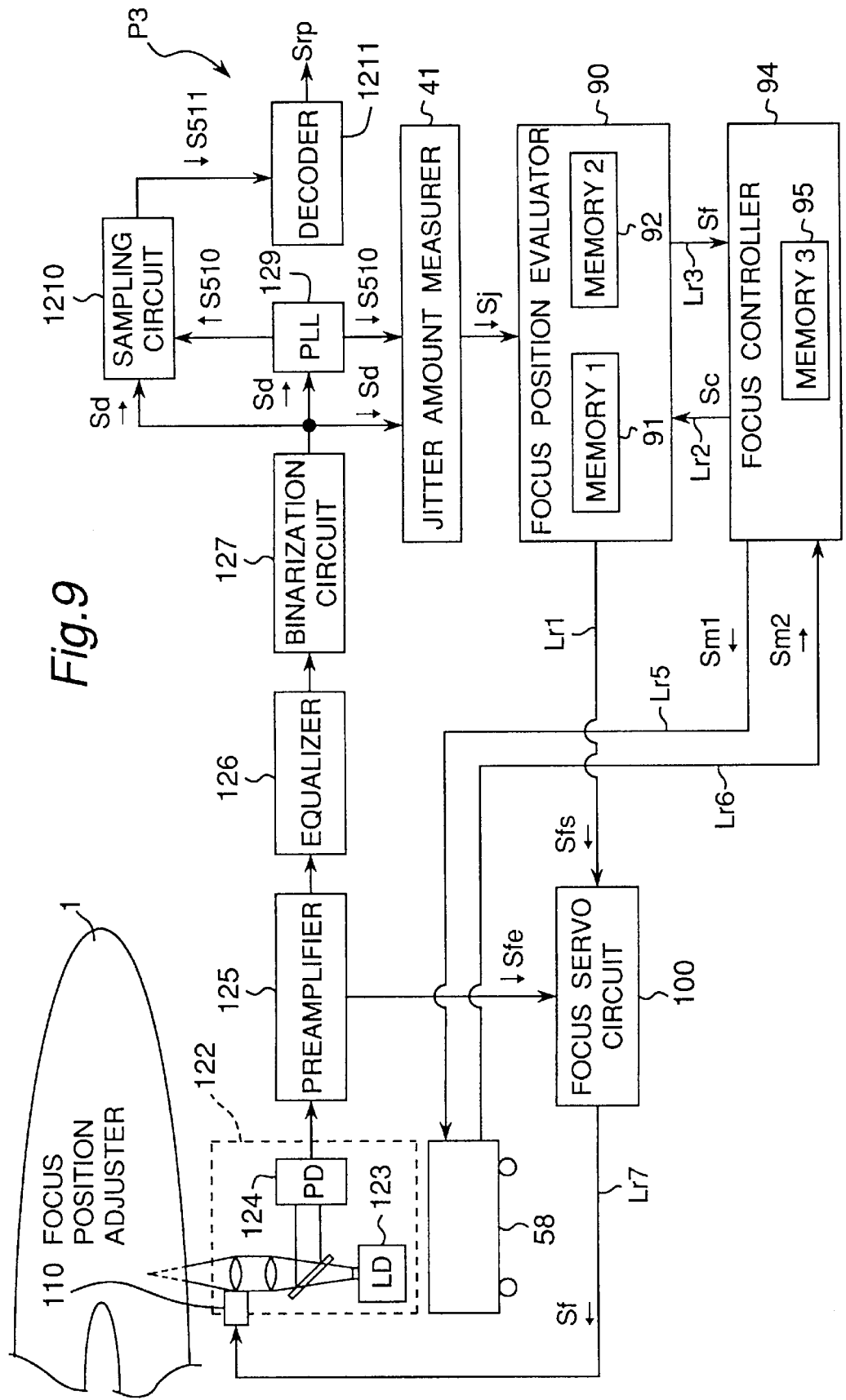
FIG. 9 is a block diagram showing an optical disk apparatus according to a third embodiment of the present invention.

Referring to FIG. 9, an optical disk apparatus according to the third embodiment of the present invention is shown. The optical disk apparatus P3 has a construction very similar to that of FIG. 4, wherein the radial tilt evaluator 50, radial tilt controller 54, and radial tilt adjuster 67 including the tilting unit 60 are replaced by a focus position evaluator 90, a focus controller 94, a focus servo circuit 100, and a focus position adjuster 110 connected to the focus servo circuit 100 by a line Lr7, respectively. Note that tilt adjuster 67, including the tilting unit 60, and the tangential adjuster 82, including the tilting unit 73, can be used together in this embodiment, but are omitted for the sake of brevity.

The focus position evaluator 90 and focus controller 94 are constructed in substantially the same manner as the radial tilt evaluator 50 and radial tilt controller 54, respectively, as shown in FIG. 9. The focus position evaluator 90 produces a focus servo circuit control signal Sfs, instead of the radial tilt adjuster control signal St1 (by the radial tilt evaluator 50), for controlling the focus servo circuit 100.

According to this embodiment, the position where the jittering amount is the smallest corresponds to the optimum focus position at which the focus error signal should be the smallest. Based on these conditions, the focus servo circuit 100 produces a focus compensation signal Sf indicative of the fact that the current position is the optimum position whereby the focus error signal should be zero or the smallest. This focus compensation signal Sf is transferred to the focus position adjuster 110 through the line Lr7, so that the focus position adjuster 97 adjusts the optical pickup so as to compensate the focus error signal, detected at the current position, such that it is zero or at a minimum. Thus, the focus error, depending on the electrical propensities of the circuit, can be compensated.

Since the focus position can be compensated by adjusting the titling angle of the optical pickup unit Os, as described above, the operations of this embodiment are basically similar to those described with reference to FIGS. 27A, 27B, and 82.

Fourth Embodiment

Figure 10:
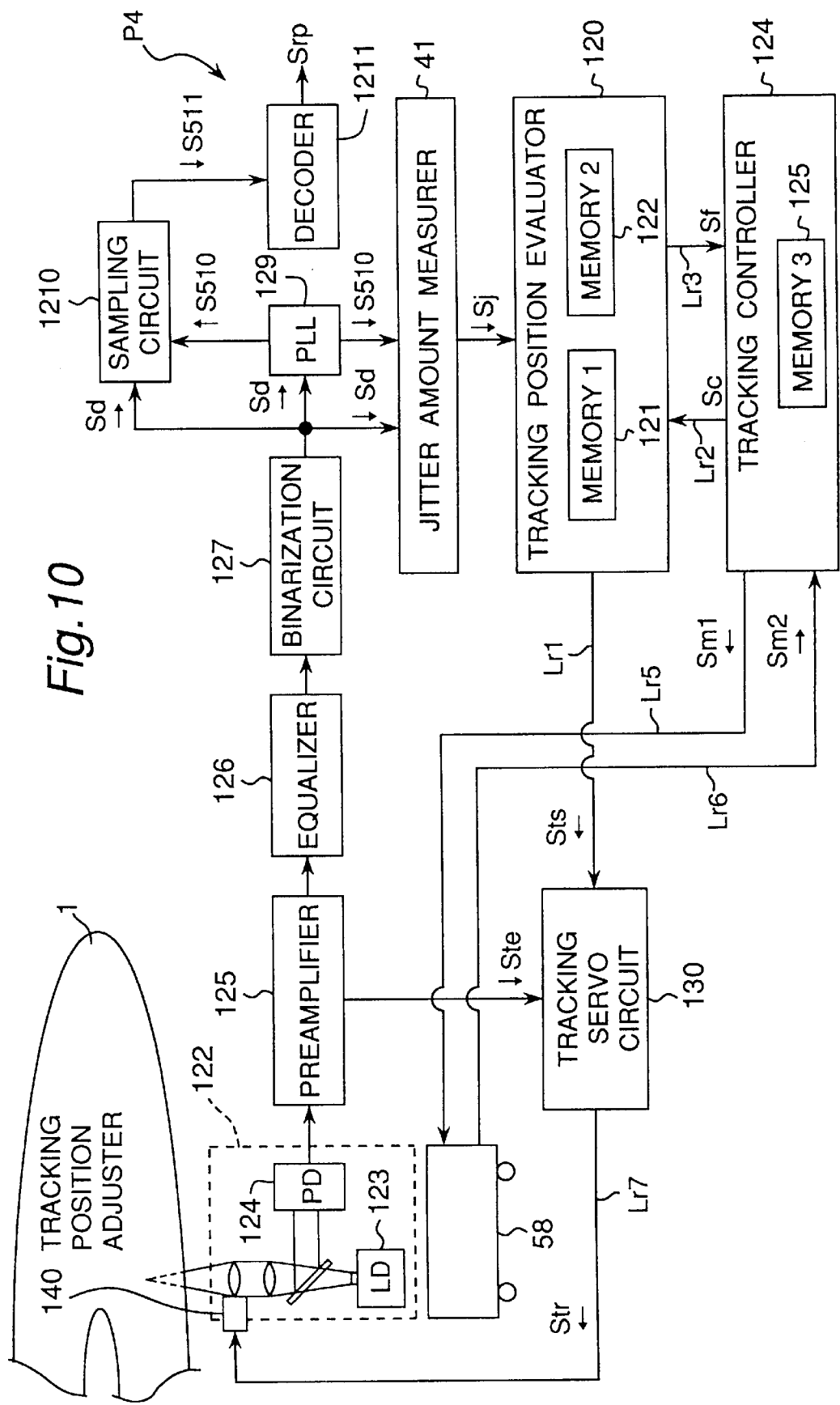
FIG. 10 is a block diagram showing an optical disk apparatus according to a fourth embodiment of the present invention.

Referring to FIG. 10, an optical disk apparatus according to the fourth embodiment of the present invention is shown. The optical disk apparatus P4 has a construction very similar to that of FIG. 9, wherein the focus position evaluator 90, focus controller 94, focus servo circuit 100, and focus position adjuster 110 are replaced by a tracking position evaluator 120, a tracking controller 124, a tracking servo circuit 120, and a tracking position adjuster 140, respectively.

The tracking position evaluator 120, tracking controller 124, tracking servo circuit 130, and the tracking position adjuster 140 are constructed in a manner very similar to that of the focus position evaluator 90, focus controller 94, focus servo circuit 100, and focus position adjuster 110, respectively. The tracking position evaluator 120 produces a tracking servo circuit control signal Sts, instead of the radial tilt adjuster control signal St1, for controlling the tracking servo circuit 130.

According to this embodiment, the position where the jittering amount is the smallest corresponds to the optimum tracking position at which the tracking error signal should be zero or the smallest. Based on these conditions, the tracking servo circuit 130 produces a tracking compensation signal Str indicative of the fact that the current position is the optimum position for tracking. This tracking compensation signal Sts is transferred to the tracking position adjuster 140 through the line Lr7, so that the tracking position adjuster 140 adjusts the optical pickup Os (122 and 58) so as to compensate the tracking error signal, detected at the current position, such that it is zero or at a minimum. Thus, the tracking error, depending on the electrical propensities of the circuit, can be compensated.

Since the tracking position can be compensated by adjusting the titling angle of the optical pickup unit Os, as described above, the operations of this embodiment are similar to those described with reference to FIGS. 27A, 27B, and 82.

Fifth Embodiment

Figure 30:
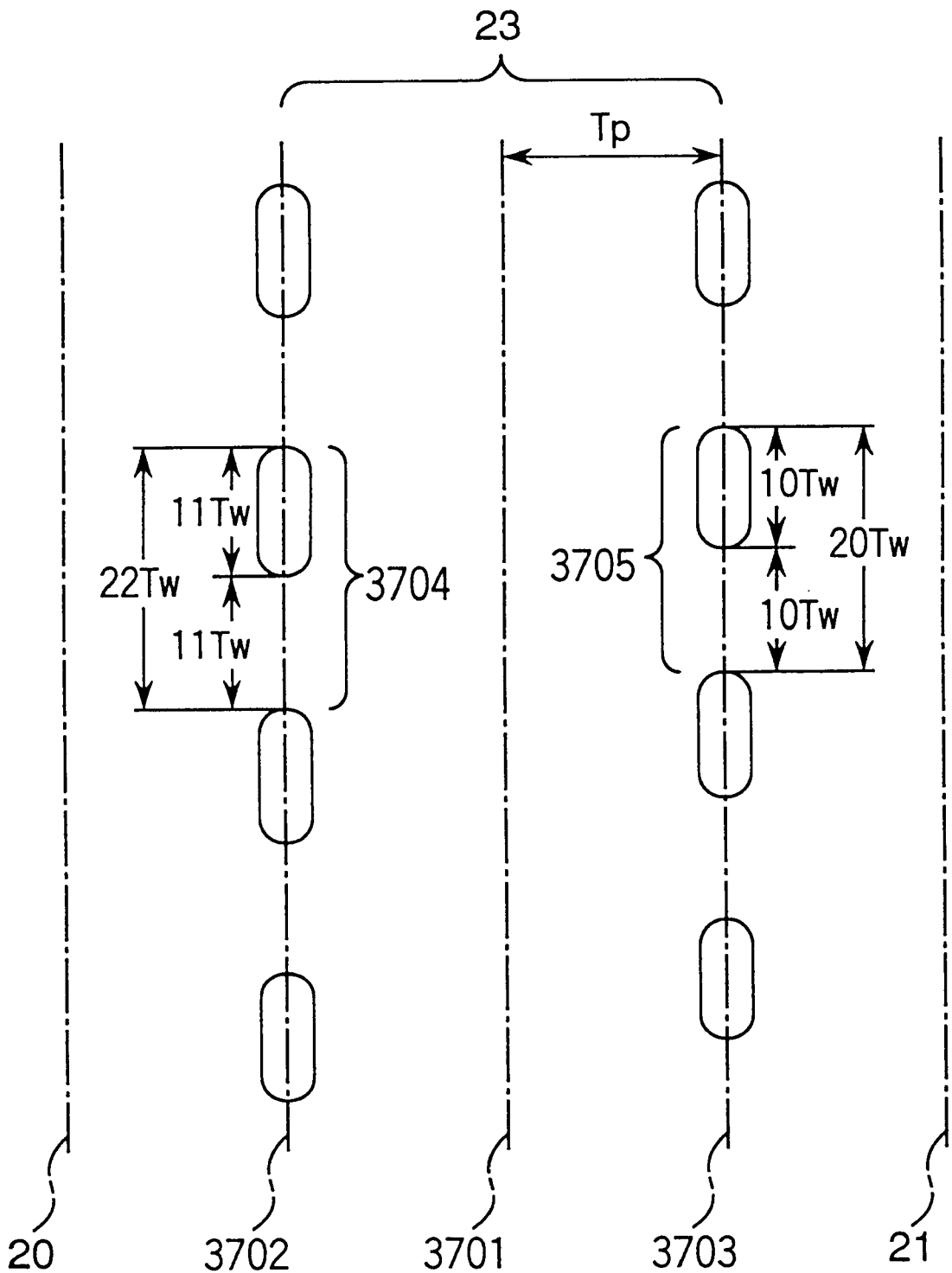
FIG. 30 is a graph showing a first example of the calibration data area of an optical disk used for the optical disk apparatus of FIG. 31.

Referring to FIG. 30, another alternative of calibration data track area 23 of FIG. 2, similar to that of FIG. 2, is shown. Note that the first, second, and third calibration data tracks 32, 33, and 34 in FIG. 2 correspond to the tracks 3702, 3701, and 3703 in FIG. 30, respectively. Furthermore, a track pitch Tp, instead of the track width T1 in FIG. 2, is defined as a distance between the centers of the neighboring two tracks. The center of each track is indicated by an alternating long and short dash line. Also in this embodiment, the first, second, and third tracks 3702, 3701, and 3703 are arranged in order from the inside toward the outside of the optical disk 1.

In this example, a pit mark is not recorded on the second track 3701. The first track 3702 is recorded with a first periodical signal represented by a third pit pattern 3704. The third pit pattern 3704 is recorded to the track 3702 by repeatedly forming a pair of pit marks and pit spaces therein at a 22 Tw period, wherein "Tw" is a window width. The third track 3703 is recorded with a second periodical signal represented by a fourth pit pattern 3705. The fourth pit pattern 3705 is recorded to the track 3703 by repeatedly forming a pair of pit marks and pit spaces therein at a 20 Tw period.

In other words, the first calibration data track 3702 is recorded with a pit pattern having a pair of pit marks and pit spaces repeated at a period of $t1=1/22$ Tw. The third calibration data track 3703 is recorded with a pit pattern having a pair of pit marks and pit spaces repeated at a period of $t2=1/20$ Tw. Note that $t2 \neq t1$, $t2 \neq n \cdot t1$, and $t2 \neq t1/m$, wherein "n" and "m" are positive integers.

For forming these pit marks any marking means distinguishable from the matrix portion such as undulated surfaces (sunk or rased from the matrix surface), magnetizing direction, and crystallization state (crystallized or amorphous) can be used. It is also possible to repeatedly add the track address information to these signals, and hereinafter this embodiment is described with reference to the case with such repeatedly added track address information. Note that according to this embodiment, the optical disks having a single and two calibration data track areas 23, as best shown in FIGS. 1A and 1B, respectively are used.

Figure 31:
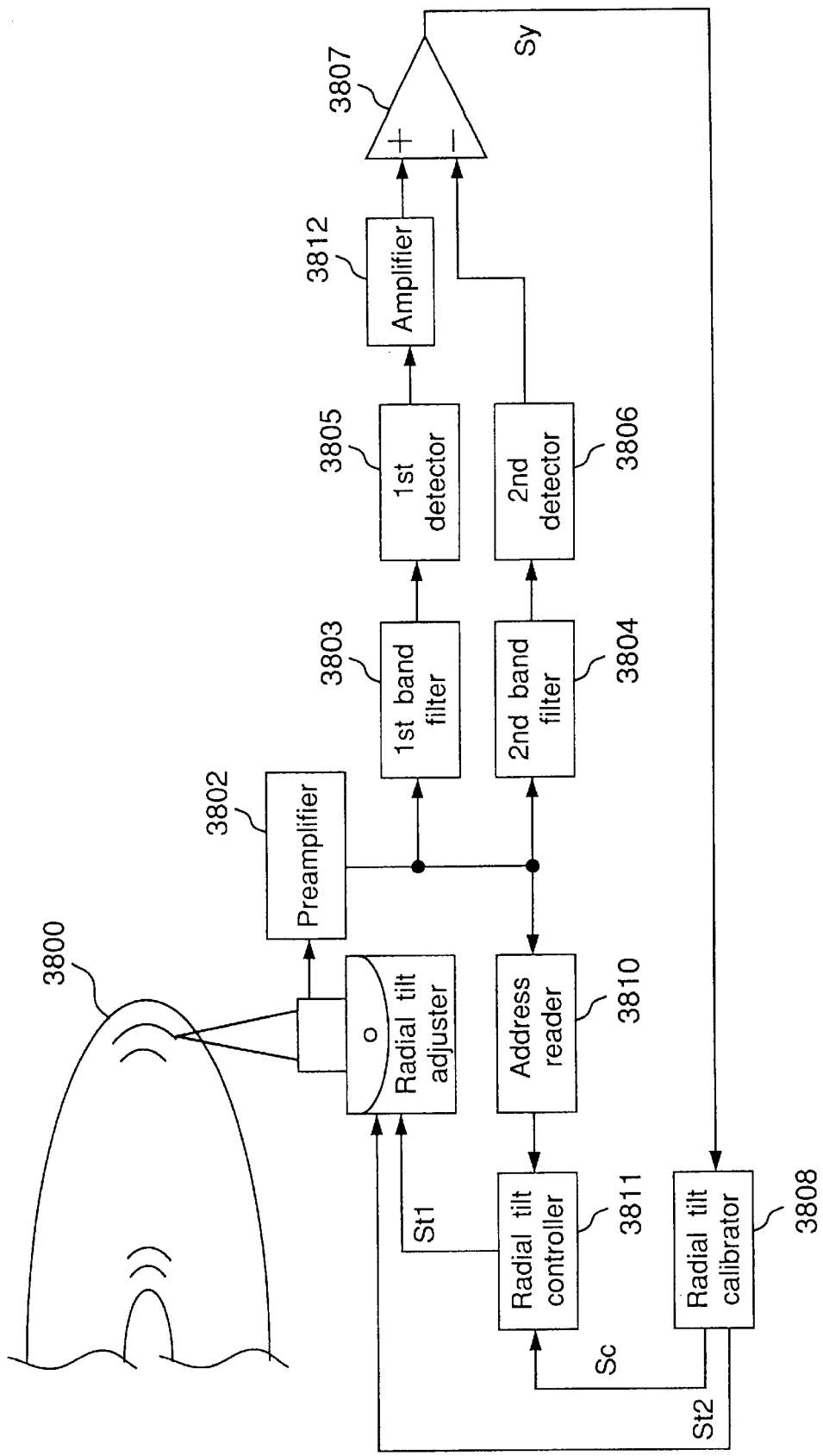
FIG. 31 is a block diagram showing an optical disk apparatus according to a fifth embodiment of the present invention.

Referring to FIG. 31, an optical disk apparatus according to the fifth embodiment of the present invention is shown. The optical disk apparatus P5 includes an optical pickup unit 3801 for impinging a laser beam to an optical disk 3800 used for recording the information and reproducing the information. A radial tilt adjusting unit 3809, corresponding to the radial tilt adjuster 67 and the tilting unit 60 of FIG. 4, is provided for adjusting the tilting position of the optical pickup unit 3801.

A radial tilt controller 3811 is connected to the radial tilt adjusting unit 3809 for transferring the radial tilt adjuster control signal Stl thereto.

A radial tilt calibrator 3808 is connected to the radial tilt controller 3811 for receiving the start command signal Sc therefrom, and is further connected to the radial tilt adjusting unit 3809 for transferring the radial tilt compensation signal St2 thereto.

A preamplifier 3802 is connected to the optical pickup unit 3801 for increasing the amplitude of the signal reproduced from the optical disk 3800, and for producing a reproduction signal. This reproduction signal varies according to the lengths of pits formed in the recording track of the optical disk 3800.

A first band filter 3803 having a frequency of f1 is connected to the preamplifier 3802 for receiving the reproduction signal therefrom. When the first band filter 3803 is set to have a let-through frequency of $f1=1/22$ Tw, the crosstalk component from the first track 3702 is passed through the filter along with the main component of the signal reproduced from the second track 3701.

A first detector 3805 is connected to the band filter 3803 for receiving the reproduced signal passed through the first band filter 3803 and for converting it into a first voltage.

An amplifier 3812 is connected to the first detector 3805 for receiving and amplifying the first voltage. The amplifier 3812 can be replaced by an attenuator. When it is expected that the difference of mark length in the third and fourth pit patterns 3704 and 3705 may causes a difference in amplitude between these two reproduction signals, reproduced from the tracks 3702 and 3703, respectively, the amplifier (attenuator) 3812 is used to compensate such amplitude differences.

A second band filter 3804 having a frequency of f2 is connected to the preamplifier 3802 for receiving the reproduction signal therefrom. When the second band filter 3804 is set to have a let-through frequency of f2=1/20 Tw, the crosstalk component from the second track 3703 is passed through the filter along with the main component of the signal reproduced from the second track 3701

A second detector 3806 is connected to the second band filter 3804 for receiving the reproduced signal passed through the second band filter 3804 and for converting it into a second voltage.

A comparator 3807 is provided which has two input terminals. One terminal is connected to the amplifier 3812 and the other is connected to the second detector 3806 for receiving the amplified first voltage and the second voltage, respectively, therefrom. The comparator 3807 detects a difference between these two voltages and produces a difference signal Sy. Note that this difference signal Sy represents the difference between two crosstalk components from the first and third tracks 3702 and 3703.

Therefore, when the difference signal Sy has a positive value, the crosstalk from the first track 3702 is greater than that from the third track 3703. This indicates that the radial tilt is biased to a direction in which a portion of the optical pickup unit 3801 is located on the inner circumference side closest to the disk 3800. Hereinafter, this direction is referred to as a "negative tilting direction".

On the other hand, when the difference signal Sy has a negative value, the crosstalk from the first track 3702 is smaller than that from the third track 3703. This indicates that the radial tilt is biased to a direction in which a portion of the optical pickup unit 3801 is located on the outer circumference side closest to the disk 3800. Hereinafter, this direction is referred to as a "positive tilting direction".

Furthermore, when the difference signal Sy has a zero value, this indicates that the crosstalks to the second track 3701 from both of the neighboring tracks 3702 and 3703 are the same. It is to be noted that this position is an optimum position at which the radial tilt is minimal.

For practical purposes, when the difference signal Sy is within an allowable range, it is determined that the current position is the optimum radial tilt position.

However, the gain of the crosstalk component is defined by the frequency of the pit pattern formed in the track. Therefore, the crosstalk components from the tracks 3702 and 3703 have different gains, thereby causing improper comparisons to be made by the comparator 3807. For compensating such gain differences between these two crosstalk components, the amplifier 3812 is provided prior to the comparator 3807, as described above. The amplification factor of the amplifier 3812 can be determined based on the pit pattern frequencies.

The radial tilt calibrator 3808 is connected to the comparator 3807 for receiving the difference signal Sy therefrom to produce the radial tilt compensation signal St2 based on the signal Sy.

An address reader 3810 is connected to the preamplifier 3802 for receiving the reproduction signal therefrom to produce an address signal indicative of the address at which the radial tilt is currently evaluated. The address reader 3810 is further connected to the radial tilt controller 3811 for transferring the address signal thereto.

Figure 32:
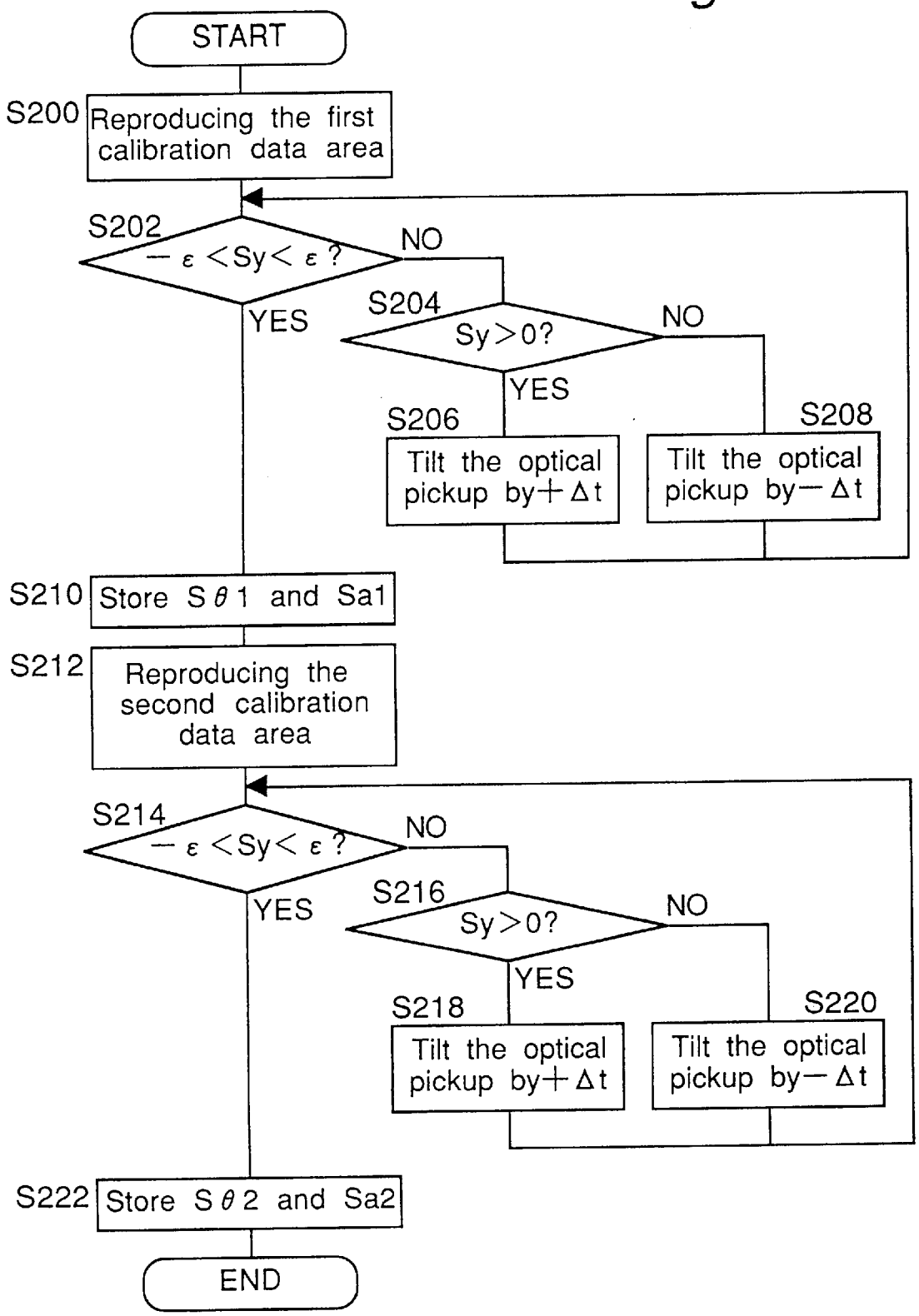
FIG. 32 is a flow chart showing a radial tilt adjusting operation performed by the optical disk apparatus of FIG. 31.

Referring to FIG. 32, the operation for calibrating the radial tilt, which is performed by the optical disk apparatus of FIG. 31, is shown. Hereinafter, the operation of the optical disk apparatus with the optical disk 3800 having two calibration data areas, as shown in FIG. 1B, is described. The operation with the optical disk having a single calibration data area is simple, and very similar to those of FIG. 27A, and is thus omitted for the sake of brevity.

When the optical disk 3800 of FIG. 31 is set in the optical disk apparatus of FIG. 31, the radial tilt calibration routine starts as described next.

At step S200, the optical pickup 3801 reads the second calibration data track 3701 of the first calibration data track area 23, formed in the inner circumference of the disk 3800, to reproduce a signal therefrom. Then, the procedure advances to step S202.

At step S202, it is judged whether the difference signal Sy is within a range from $-\epsilon$ to $\epsilon$. The symbol "$\theta$" defines a predetermined value of an allowable range for the optimum radial tilt position, and is preferably 2 Db. When "NO" is judged, meaning that the current radial tilt is over the allowable range, the procedure advances to step S204.

At step S204, it is judged whether the difference signal Sy has a positive value. When "YES" is judged, meaning that the radial tilt is currently biased to the negative direction, the procedure advances to step S206.

At step S206, the optical pickup unit 3801 is tilted by a predetermined amount $\Delta t$, and the procedure returns to step S202.

However, when "NO" is judged at step S204, meaning that the radial tilt is currently biased to the positive direction, the procedure advances to step S208.

At step S208, the optical pickup unit 3801 is tilted by a predetermined amount $-\Delta t$, and then the procedure returns to step S202. This loop of steps S202, S204, S206, and S208 is repeated until it is judged that the current radial tilt is within the allowable range at step S202.

When "YES" is judged at step S202, the procedure advances to step S210.

At step S210, the current tilting angle and the address are stored as a first tilting angle signal S$\theta$1 and a first address signal Sa1. Then, the procedure advances to step S212.

At step S212, the optical pickup 3801 reads the second calibration data track 3701 of the second calibration data track area 23 formed in the outer circumference of the disk 3800 to reproduce a signal therefrom. Then, the procedure advances to step S214.

At step S214, it is judged whether the difference signal Sy is within a range from $-\epsilon$ to $\epsilon$, or not. When "No" is judged, the procedure advances to step S216.

At step S216, it is judged whether the difference signal Sy has a positive value. When "YES" is judged, the procedure advances to step S218 and the optical pickup unit 3801 is tilted by a predetermined amount $\Delta t$, and then the procedure returns to step S214.

However, when "NO" is judged at step S216, the procedure advances to step S220 and the optical pickup unit 3801 is tilted by a predetermined amount $-\Delta t$, and then the procedure returns to step S214.

When "YES" is judged at step S214, the procedure advances to step S222 and the current tilting angle and the address are stored asshown. a second tilting angle signal S$\theta$2 and a second address signal Sa2. Then, the procedure terminates.

Figure 33:
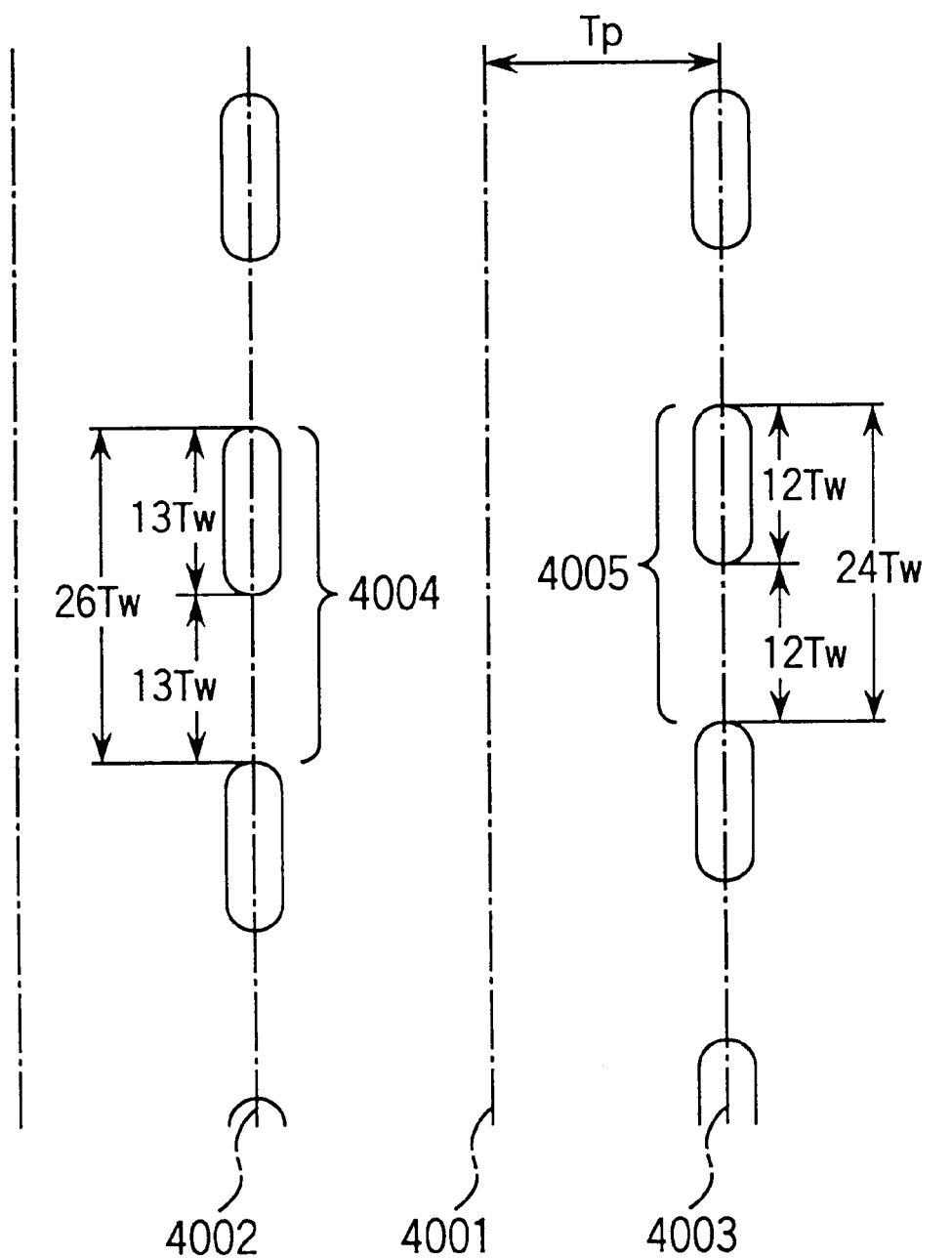
FIG. 33 is a graph showing a second example of the calibration data area of an optical disk used with the optical disk apparatus of FIG. 31.

Referring to FIG. 33, an alternative of the calibration data track area 23 of FIG. 30 is shown. In this example, a second track 4001 does not have a pit mark recorded. A first track 4002 is recorded with a first periodical signal represented by a fifth pit pattern 4004. The fifth pit pattern 4004 is recorded to the track 4002 by repeatedly forming a pair of pit marks and pit spaces therein at a 26 Tw period. A third track 4003 is recorded with a sixth periodical signal represented by a fourth pit pattern 4005. The sixth pit pattern 4005 is recorded to the track 4003 by repeatedly a pair of pit mark and pit space therein at a 24 Tw period.

In other words, the track 4002 is recorded with a pit pattern having a pair of pit marks and pit spaces repeated at a period of t1=1/26 Tw. The track 4003 is recorded with a pit pattern having a pair of pit marks and pit spaces repeated at a period of t2=1/24 Tw. Therefore, the band filters 3803 and 3804 are set to have let-through frequencies of f1=1/26 Tw and f2=1/24 Tw, respectively.

Figure 34:
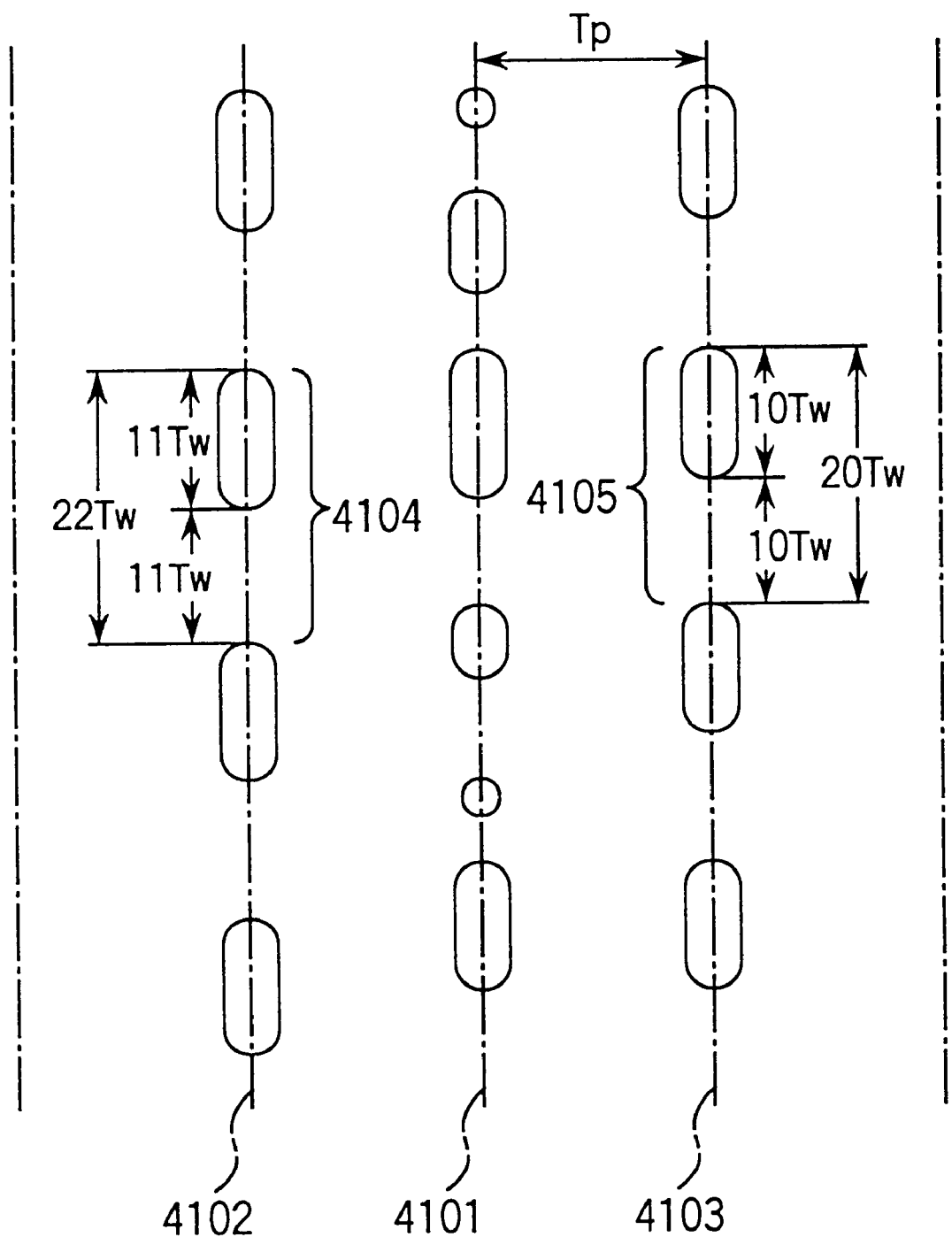
FIG. 34 is a graph showing a third example of the calibration data area of an optical disk used with the optical disk apparatus of FIG. 31.

Referring to FIG. 34, another alternative of the calibration data track area 23 of FIG. 30 is shown. In this example, first and third tracks 4102 and 4103 are the same as those 3702 and 3703 of FIG. 30, respectively. However, a second track 4101 is recorded with a random signal which is represented by a pit pattern, as indicated in FIG. 34.

According to this example, the second track 4101 is recorded with pit pattern in addition to the first and third tracks 4102 and 4103. Therefore, the present invention can even be applied to a tracking servo system utilizing a phase difference method which requires pits on the second track (4101) for reproducing a signal therefrom as being properly tracked.

Figure 35:
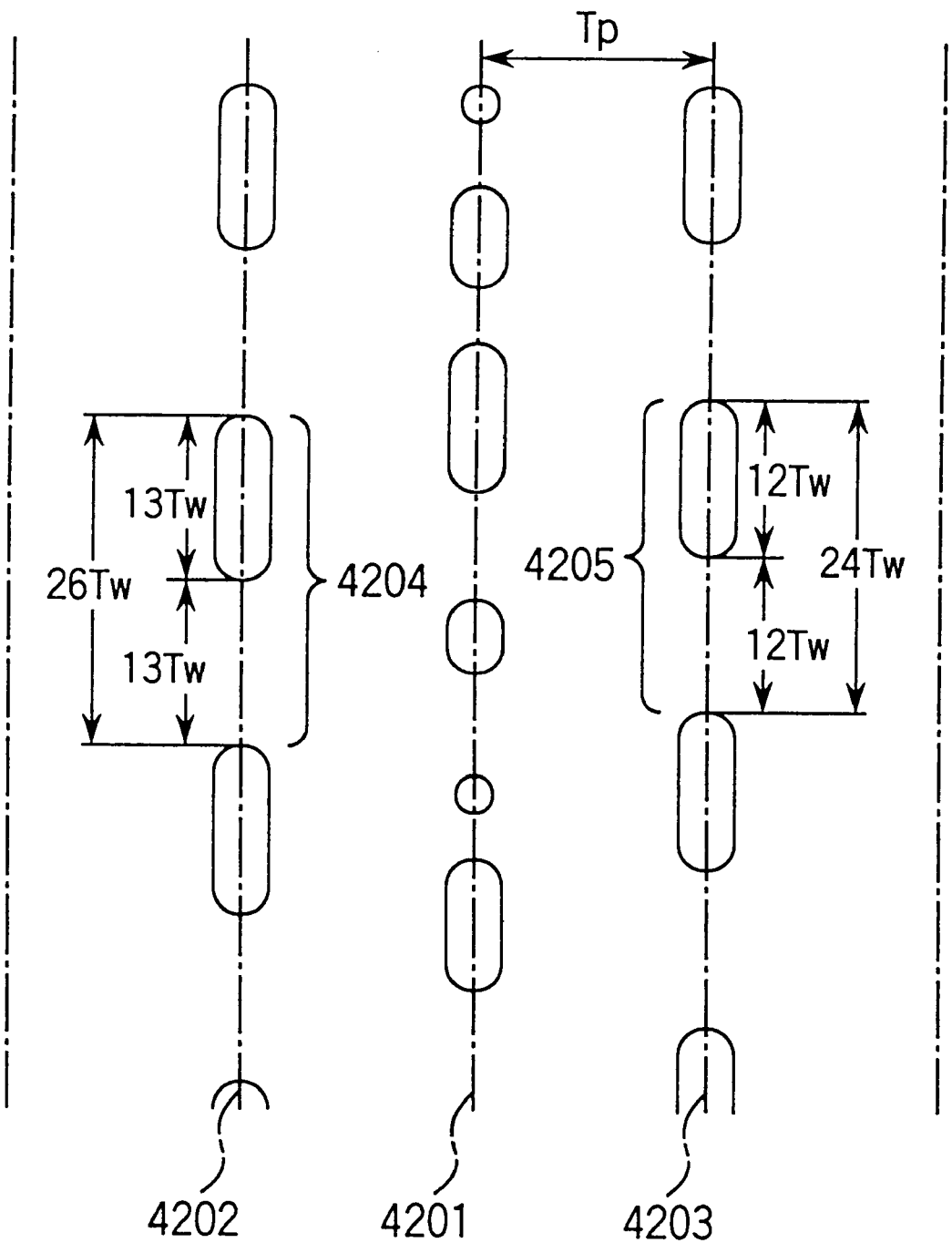
FIG. 35 is a graph showing a fourth example of the calibration data area of an optical disk used with the optical disk apparatus of FIG. 31.

Referring to FIG. 35 another alternative of the calibration data track area 23 of FIG. 33 is shown. In this example, first and third tracks 4202 and 4203 are the same as those 4002 and 4003 of FIG. 33, respectively. However, a second track 4201 is the same as the second track 4101 of FIG. 34. Therefore, this example is also effective with a phase difference method.

Figure 36:
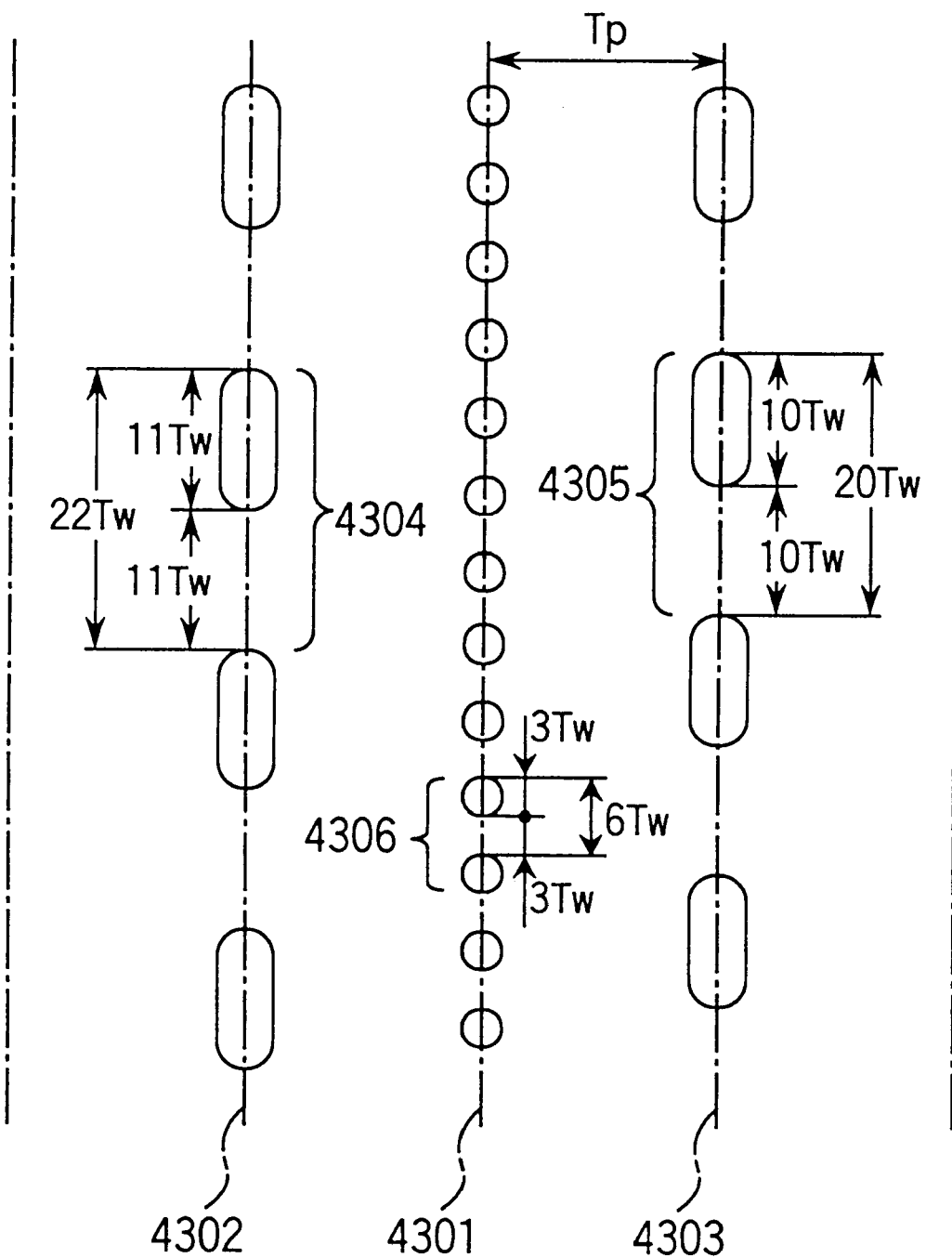
FIG. 36 is a graph showing a fifth example of the calibration data area of an optical disk used with the optical disk apparatus of FIG. 31.

Referring to FIG. 36, another alternative of the calibration data track area 23 of FIG. 34 is shown. In this example, first and third tracks 4302 and 4203 are the same as those 4102 and 4103 of FIG. 34, respectively. However, a second track 4301 is recorded with a seventh periodical signal represented by a pit pattern 4306. This pit pattern 4306 is recorded to the track 4301 by repeatedly forming a pair of pit marks and pit spaces therein at a 6Tw period, as typically shown in FIG. 36. In other words, the second track 4301 is recorded with the pit pattern 4306 having a pair of pit marks and pit spaces repeated at a period of t0=6 Tw. Note that t0≠1, t0≠2, t0≠n·t1, t0≠m·t2, t2≠t1, t2≠k·t1, and t2≠t1/l, wherein "n", "m", "k", "l" are positive integers.

Figure 37:
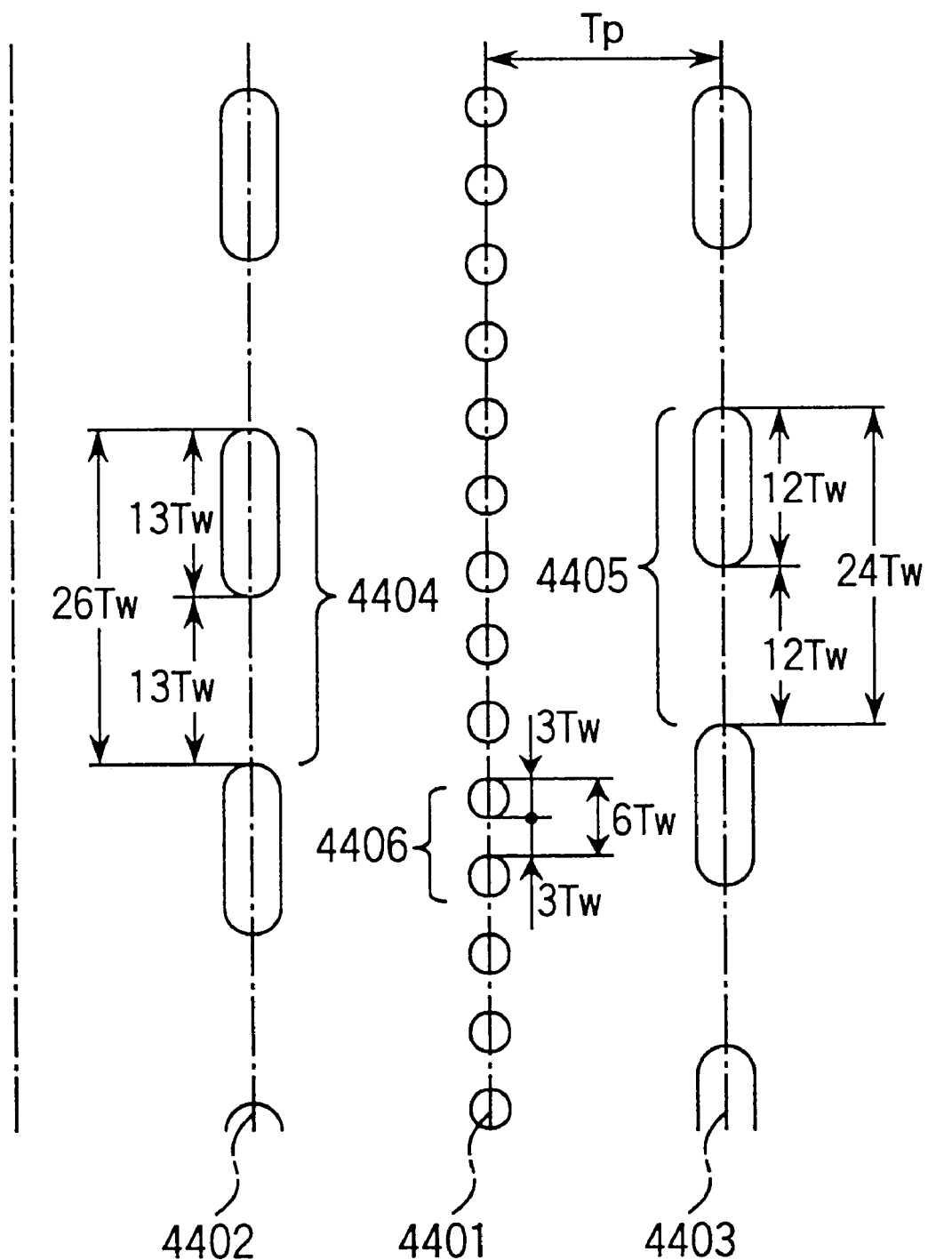
FIG. 37 is a graph showing a sixth example of the calibration data area of an optical disk used with the optical disk apparatus of FIG. 31.

Referring to FIG. 37, another alternative of the calibration data track area 23 of FIG. 33 is shown. In this example, first and third tracks 4402 and 4403 are the same as those 4202 and 4203 of FIG. 35, respectively. However, a second track 4401 is recorded with the seventh periodical signal having the pit pattern 4406 which is the same as the pit pattern 4301 of FIG. 36.

Figure 38:
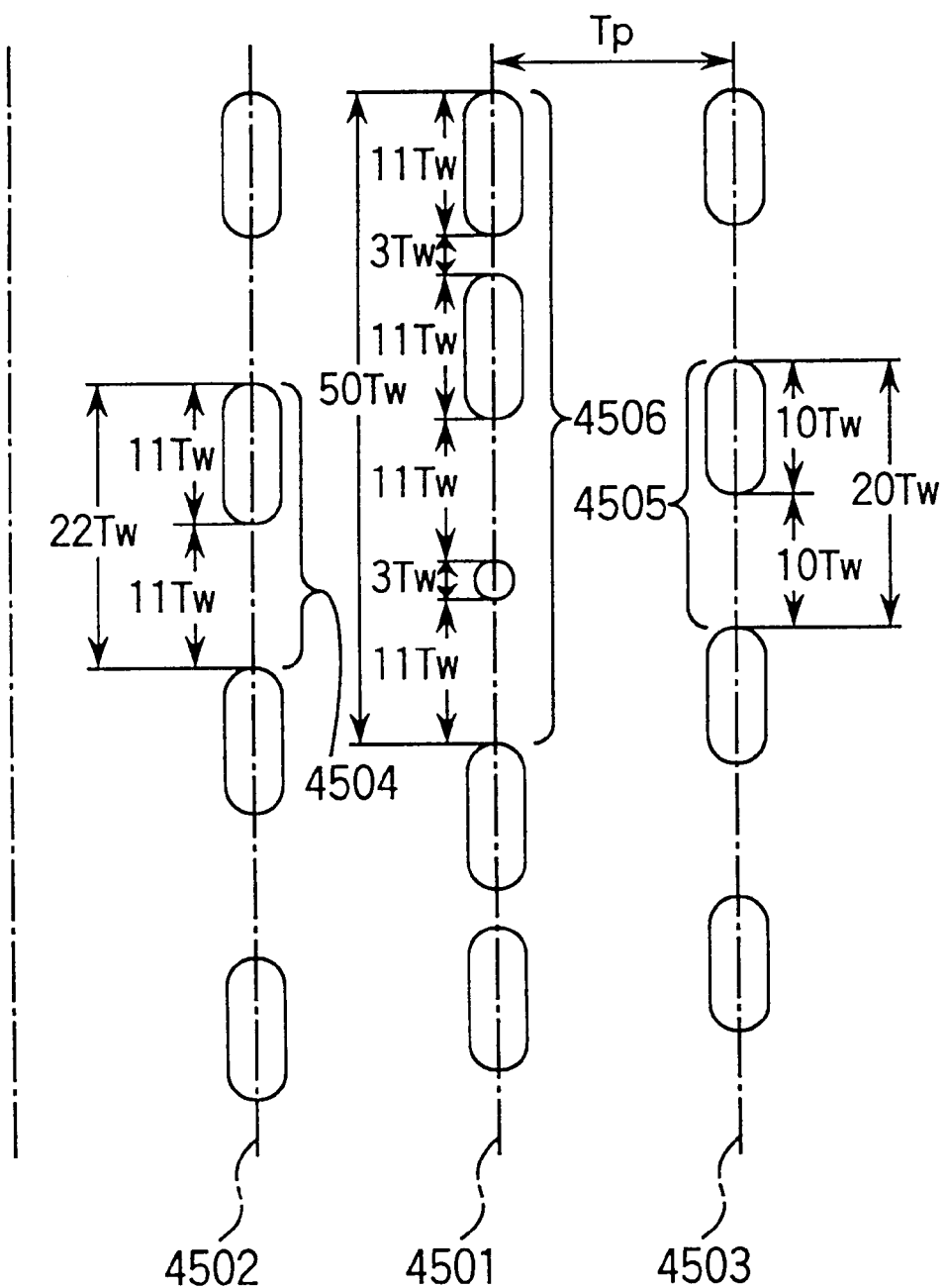
FIG. 38 is a graph showing a seventh example of the calibration data area of an optical disk used with the optical disk apparatus of FIG. 31.

Referring to FIG. 38, another alternative of the calibration data track area 23 of FIG. 30, similar to FIG. 36, is shown. In this example, first and third tracks 4502 and 4503 are the same as those 4302 and 4303 of FIG. 36, respectively. However, a second track 4501 is recorded with an eighth periodical signal represented by a pit pattern 4506. This pit pattern 4506 is repeatedly recorded to the track 4501 by a pair of pit marks and pit spaces therein at a 50 Tw period, as typically shown in FIG. 38. In other words, the second track 4501 is recorded with the pit pattern 4506 having a pair of pit marks and pit spaces repeated at a period of t0=50 Tw.

Figure 39:
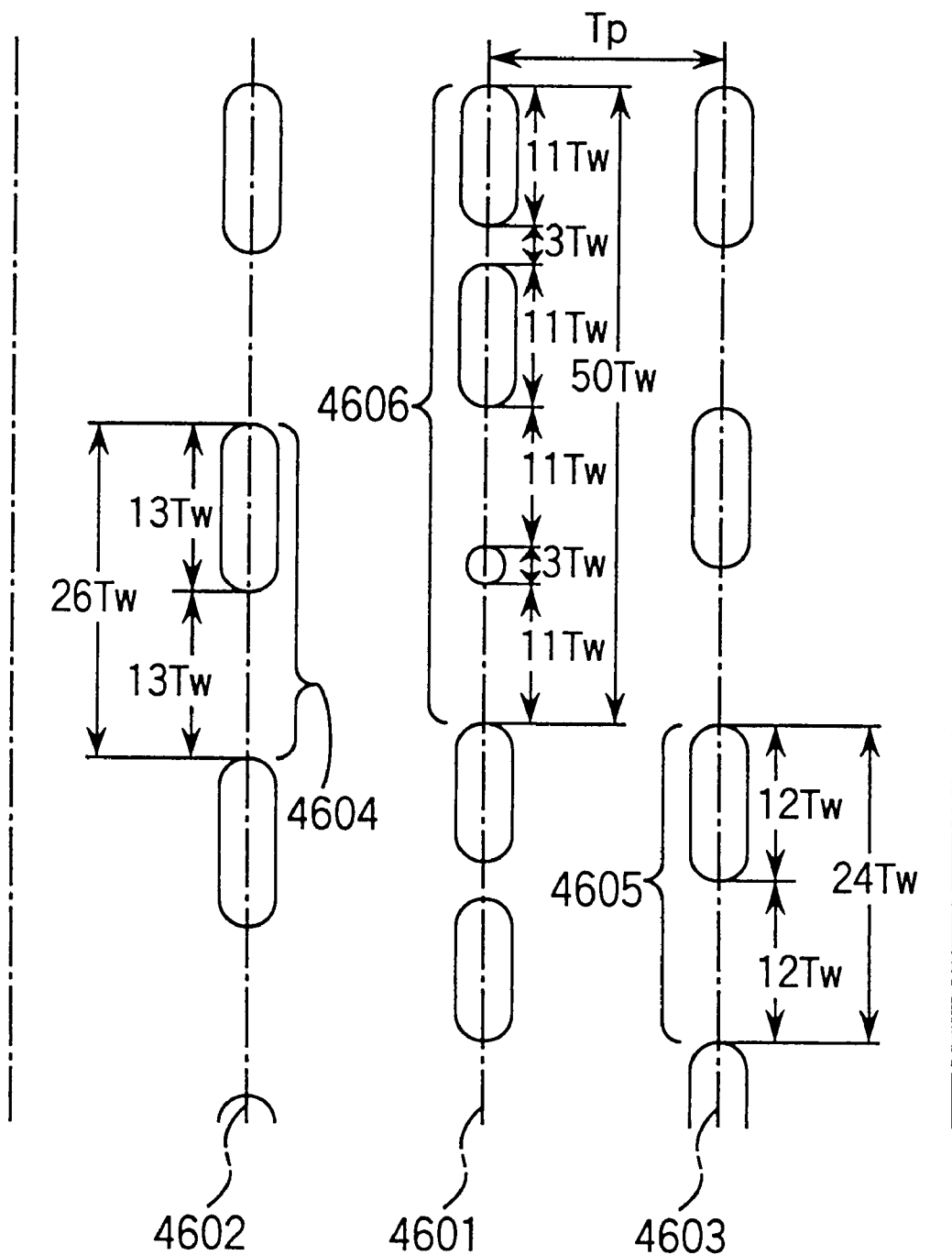
FIG. 39 is a graph showing an eighth example of the calibration data area of an optical disk used with the optical disk apparatus of FIG. 31.

Referring to FIG. 39, another alternative of the calibration data track area 23 of FIG. 33, similar to FIG. 37, is shown. In this example, first and third tracks 4602 and 4603 are the same as those 4402 and 4403 of FIG. 37, respectively. However, a second track 4601 is recorded with the eight periodical signal having a pit pattern 4606 which is the same as the second track 4501 of FIG. 38.

Figure 40:
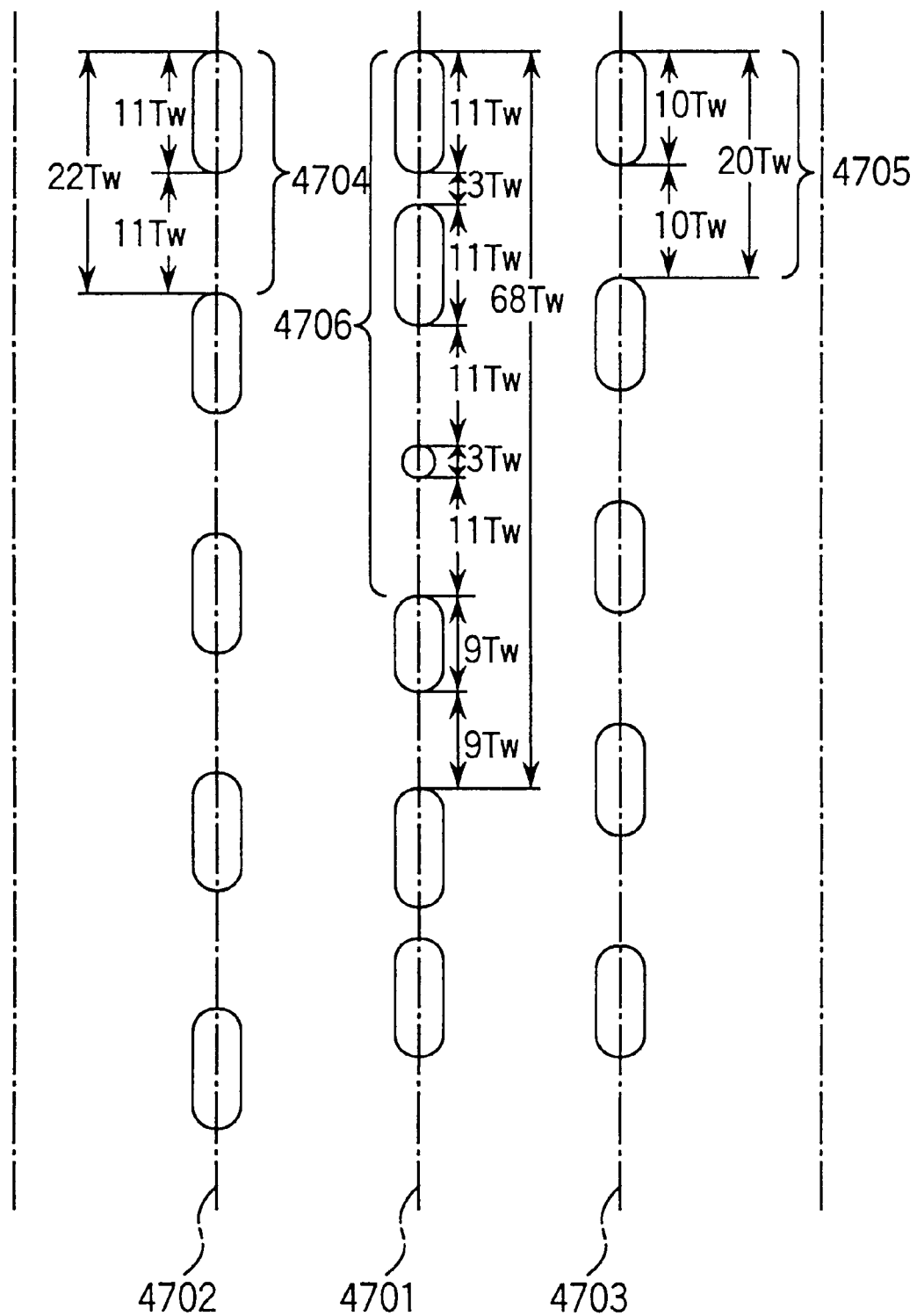
FIG. 40 is a graph showing a ninth example of the calibration data area of an optical disk used with the optical disk apparatus of FIG. 31.

Referring to FIG. 40, another alternative of the calibration data track area 23 of FIG. 30, similar to FIG. 38, is shown. In this example, first and third tracks 4702 and 4603 are the same as those of 4502 and 4503 of FIG. 38, respectively. However, a second track 4701 is recorded with a ninth periodical signal represented by a pit pattern 4701. This pit pattern 4701 is recorded to the track 4701 by repeatedly forming a pair of pit marks and pit spaces therein at a 68 Tw period, as typically shown in FIG. 40. In other words, the second track 4701 is recorded with the pit pattern 4706 having a pair of pit marks and pit spaces repeated at a period of t0=68 Tw.

Figure 41:
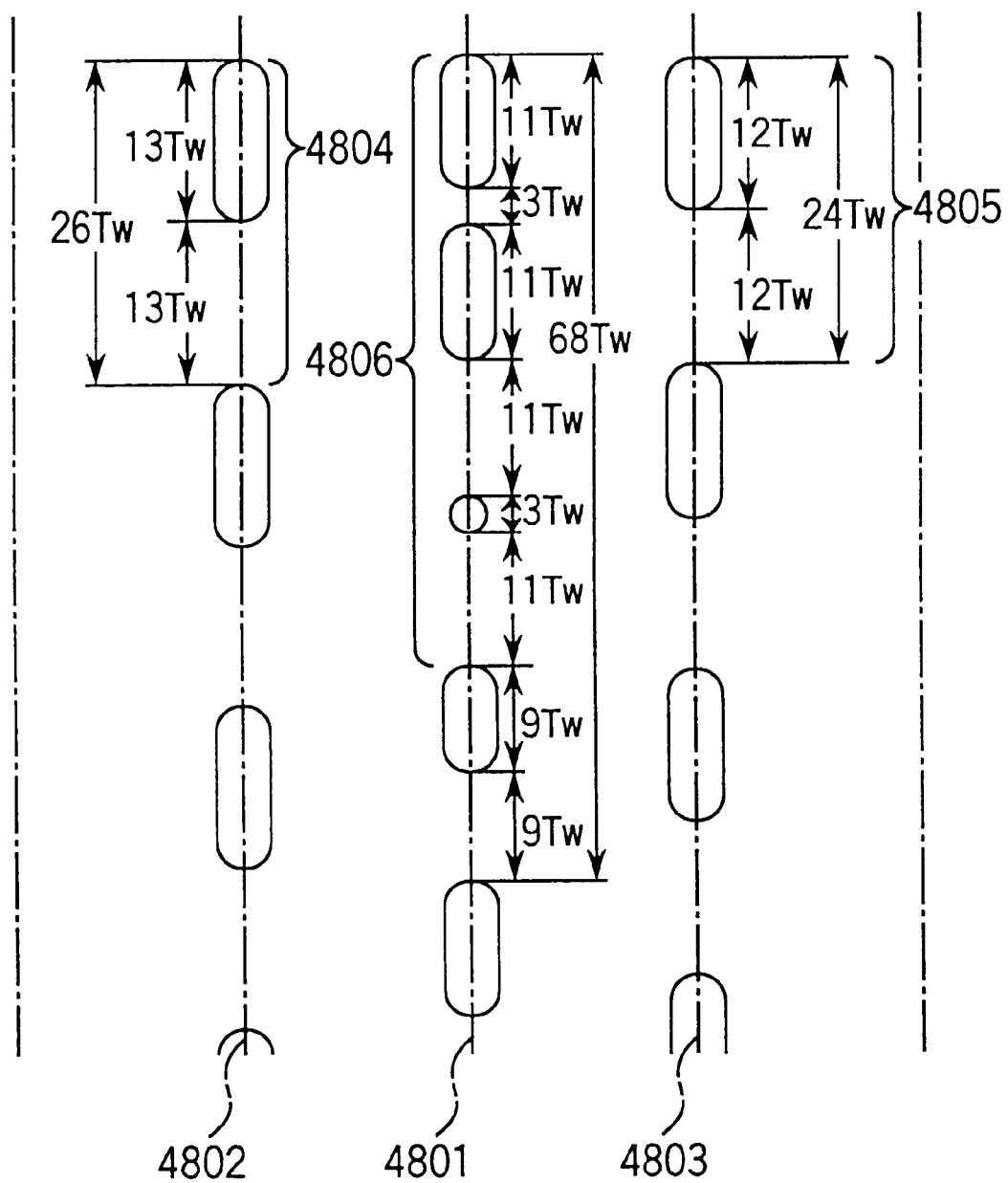
FIG. 41 is a graph showing a tenth example of the calibration data area of an optical disk used with the optical disk apparatus of FIG. 31.

Referring to FIG. 41, another alternative of the calibration data track area 23 of FIG. 33, similar to FIG. 39, is shown. In this example, first and third tracks 4802 and 4803 are the same as those 4602 and 4603 of FIG. 37, respectively. However, a second track 4801 is recorded with the ninth periodical signal having a pit pattern 4806 which is the same as the second track 4701 of FIG. 40.

Figure 42:
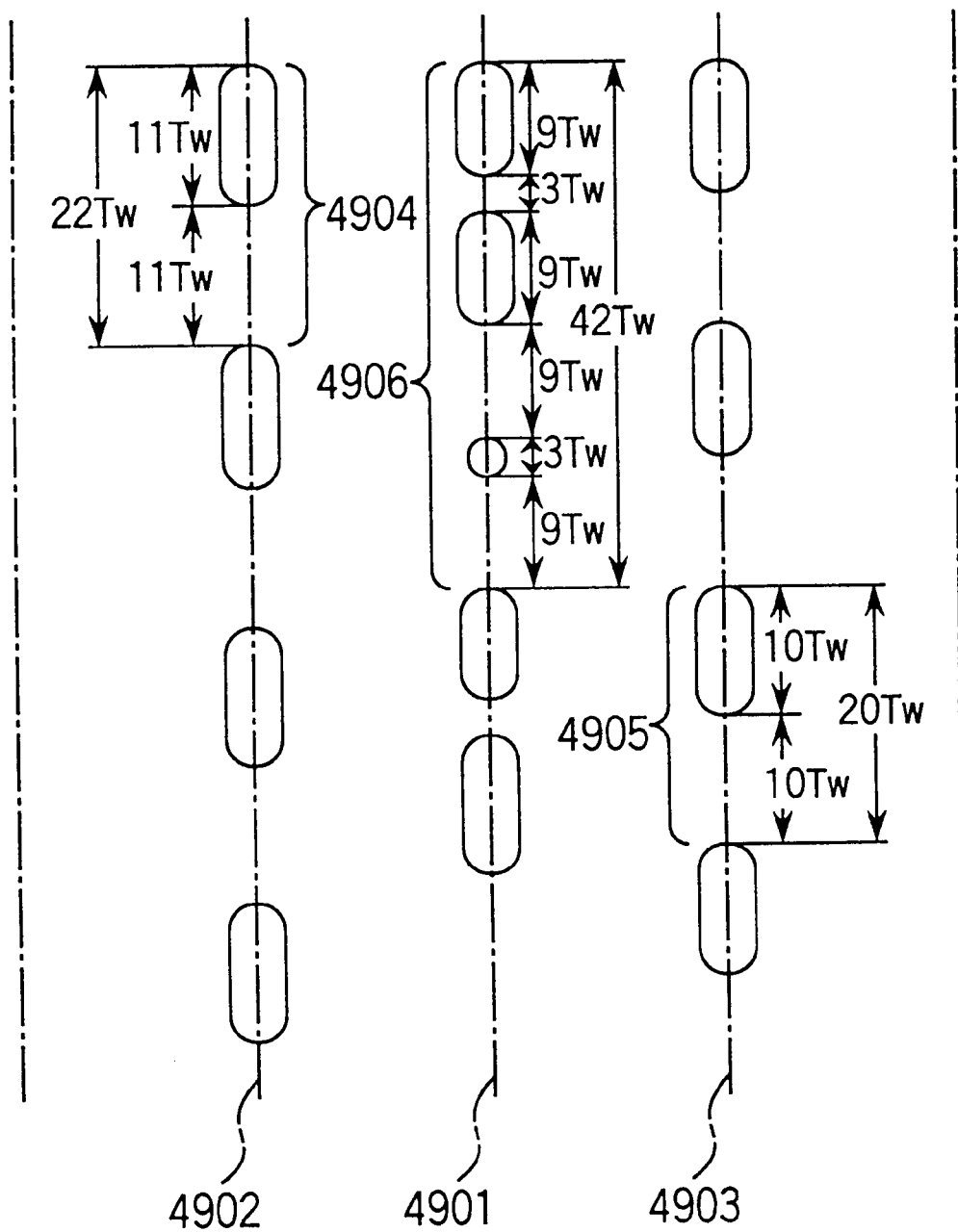
FIG. 42 is a graph showing an eleventh example of the calibration data area of the optical disk used with the optical disk apparatus of FIG. 31.

Referring to FIG. 42, another alternative of the calibration data track area 23 of FIG. 30, similar to FIG. 40, is shown. In this example, first and third tracks 4902 and 4903 are the same as those 4702 and 4603 of FIG. 40, respectively. However, a second track 4901 is recorded with a tenth periodical signal represented by a pit pattern 4906. This pit pattern 4906 is recorded to the track 4901 by repeatedly forming a pair of pit marks and pit spaces therein at a 42 Tw period, as typically shown in FIG. 42. In other words the second track 4901 is recorded with the pit pattern 4906 having a pair of pit marks and pit spaces repeated at a period of t0=42 Tw.

Sixth Embodiment

Figure 43:
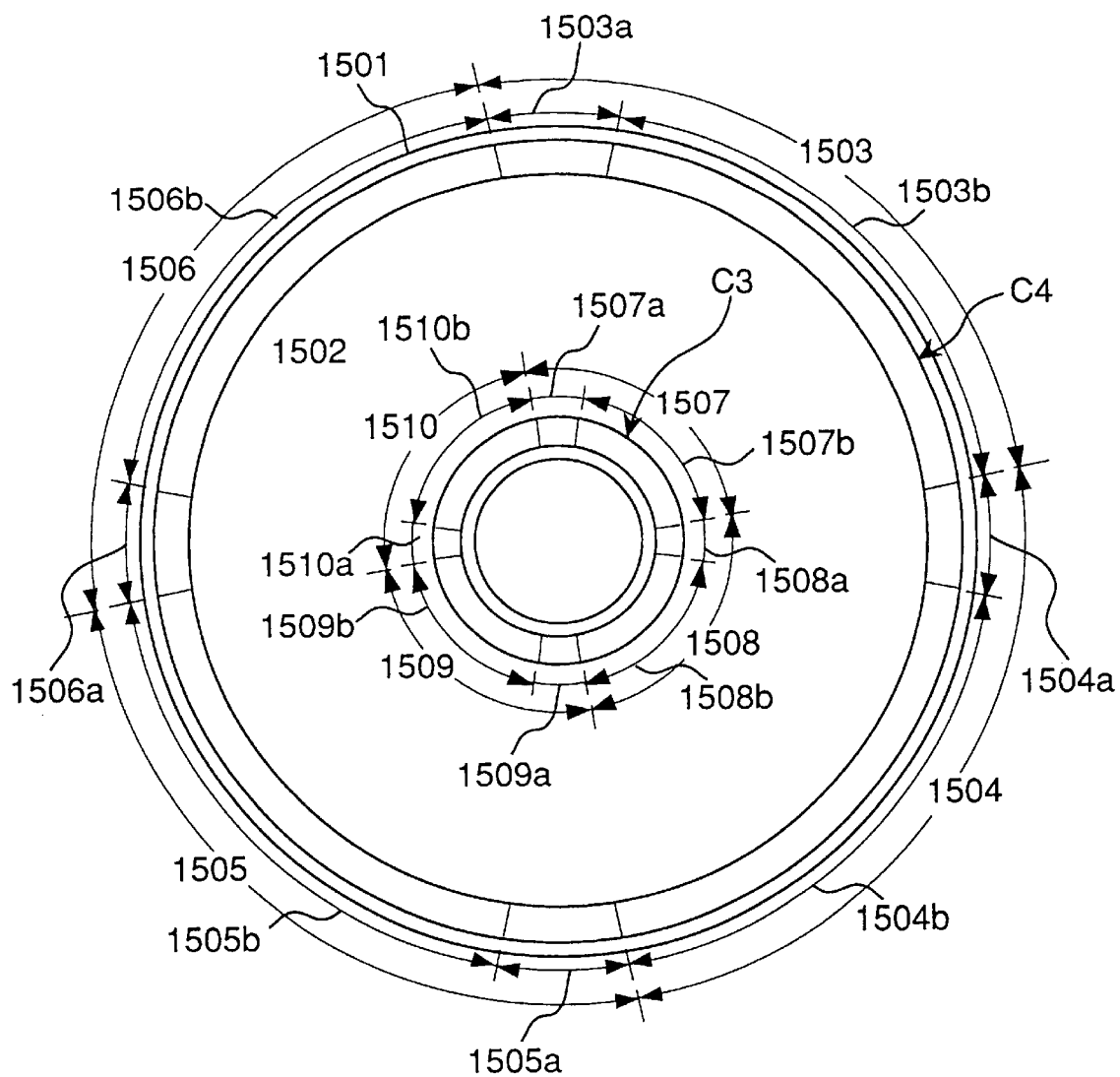
FIG. 43 is a graph showing a modified optical disk according to the present invention.

Referring to FIG. 43, a further example of the optical disk, similar to that of FIG. 1B is shown. The optical disk 1501 has a data recording area 1502, a first calibration data area C3 formed in a lead-in area thereof, and a second calibration data area C4. Note that these areas 1502, C3, and C4 correspond to areas 2, 3, and 4 of FIG. 1B, respectively. Although the optical disk 1501, having two calibration data areas C3 and C4, is described with reference to FIG. 43, the present invention can be applied to an optical disk which has only one calibration data area formed therein.

Each of the first and second calibration data areas C3 and C4 are divided into plural sectors. For example, the first calibration data area C3 is divided into four sectors 1507, 1508, 1509, and 1510 at a suitable division rate. In other words, the calibration data area C3 can be equally or unequally divided into two or more sectors. For easy recognition, the divided sectors 1507, 1508, 1509, and 1510 are defined as first, second, third, and fourth inner calibration sectors, respectively.

Each inner calibration sector is further divided into two portions. The first portion is a data area for recording a calibration data, and the second portion is an address area for recording address information such as a sector address and a track address. Specifically, the inner calibration sectors 1507 include a first inner address area 1507*a* and a first inner data area 1507*b*. The other inner calibration sectors 1508, 1509, and 1510 include a second inner address area 1508*a* and a second inner data area 1508*b*, a third inner address area 1509*a* and a third inner data area 1509*b*, and a fourth inner address area 1510*a* and a fourth inner data area 1510*b*, respectively.

Similarly, the second calibration data area C4 also includes first, second, third, and fourth outer calibration sectors 1503, 1504, 1505, and 1506, respectively. Furthermore, these inner calibration sectors 1503, 1504, 1505, an 1506 include a first outer address area 1503*a* and a first outer data area 1503*b*, a second outer address area 1504*a* and a second outer data area 1504*b*, a third outer address area 1505*a* and a third data area 1505*b*, and a fourth outer address area 1506*a* and a fourth outer data area 1506b, respectively.

It is noted that each of divided sectors of the first calibration data area C3 are shown as being in alignment with corresponding divided sectors of the second calibration data areas C4 with respect to the radial direction. However, each of calibration data areas C3 and C4 can be divided into different number of portions and at any suitable division rate, as described above. Therefore, the sectors are not required to be arranged in a predetermined position relative to the other sectors.

Figure 44A:
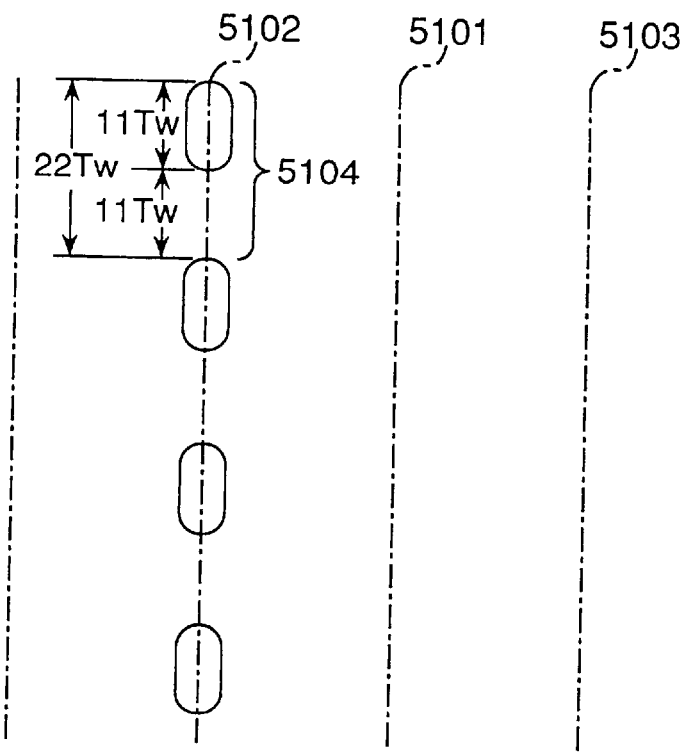
FIGS. 44A and 44B are graphs showing examples of the calibration data areas of the optical disk of FIG. 43.
Figure 44B:
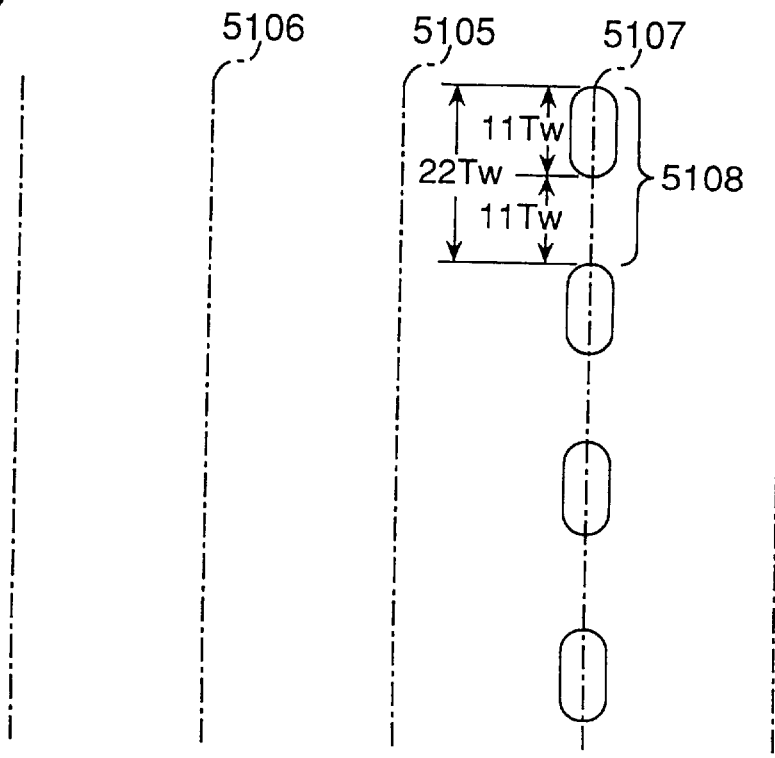

With reference to FIGS. 44A and 44B, the calibration signals recorded to each of the inner data areas 1507*b*, 1508*b*, 1509*b*, and 1510*b* and the outer data areas 1503*b*, 1504*b*, 1505*b*, and 1506*b* are described. Two different calibration signals are recorded to alternate sectors.

In FIG. 44A, one example of the first and third inner data sectors 1507*b* and 1509*b* (1503*b* and 1505*b*), for example, is shown. Tracks 5102, 5101, and 5103 correspond to the first, second, and third data tracks 32, 33, and 34 of FIG. 3. The first track 5102 is recorded with the first periodical signal having a pit pattern 5104 corresponding to the third pit pattern 3704 of FIG. 30. The second and third tracks 5101 and 5103 are not recorded, as shown in FIG. 44A.

In FIG. 44B, one example of the second and fourth inner data sectors 1508*b* and 1510*b* (1504*b* and 1506*b*) is shown. Tracks 5106, 5105, and 5107 correspond to the first, second, and third data tracks 32, 33, and 34 of FIG. 3. The first and second data tracks 5106 and 5105 are not recorded. However, the third track 5107 is recorded with the first periodical signal having a pit pattern 5108 corresponding to the third pit pattern 3704 of FIG. 30.

Figure 45:
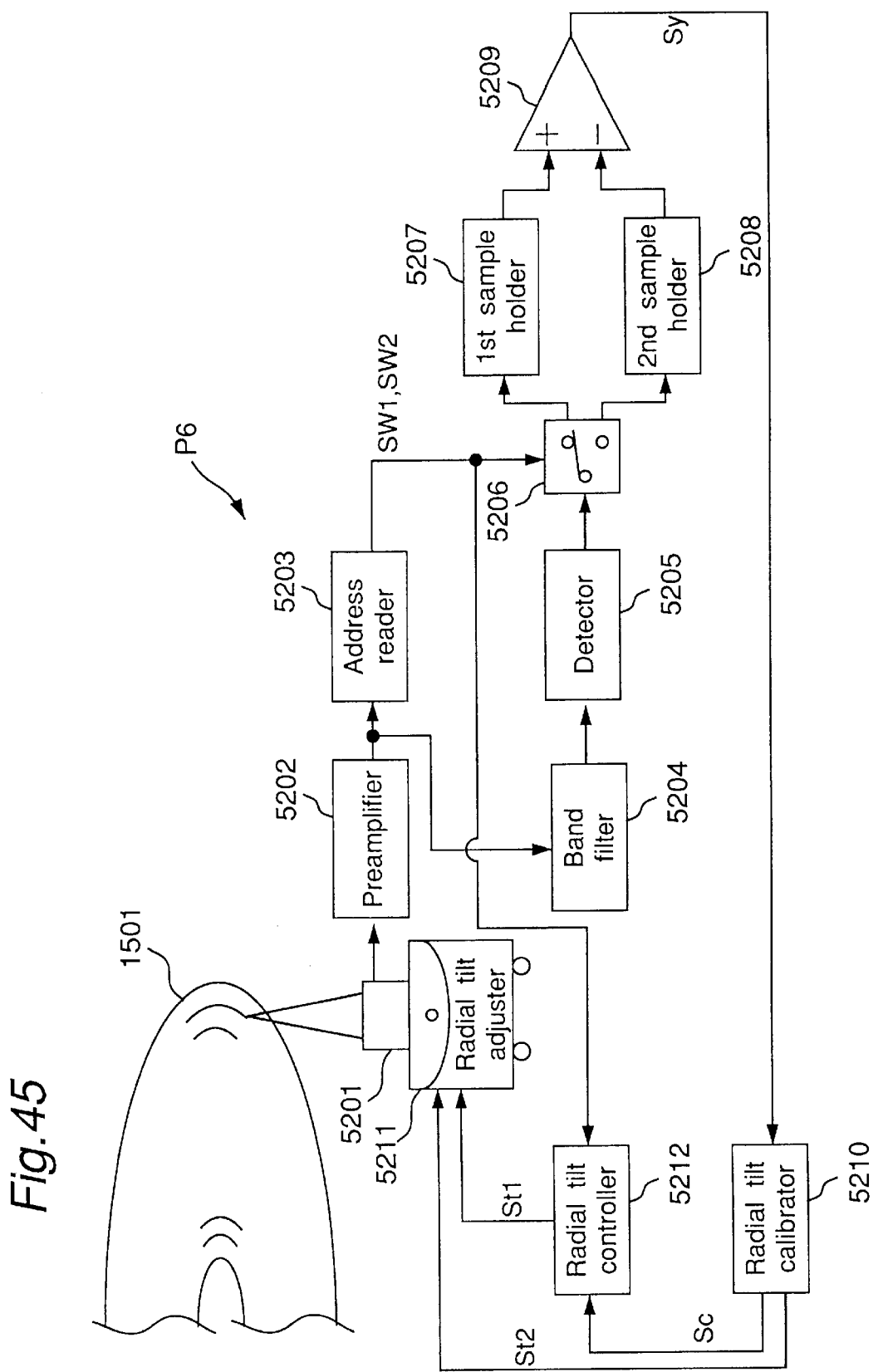
FIG. 45 is a block diagram showing an optical disk apparatus according to a sixth embodiment of the present invention.

Referring to FIG. 45, an optical disk apparatus according to the sixth embodiment of the present invention is shown. The optical disk apparatus P6 includes an optical pickup unit 5201 for impinging a laser beam to an optical disk 1501 for recording information and reproducing information. A radial tilt adjusting unit 5211, corresponding to the radial tilt adjuster 67 and the tilting unit 60 of FIG. 4, is provided for adjusting the tilting position of the optical pickup unit 5201.

A radial tilt controller 5212 is connected to the radial tilt adjusting unit 5211 for transferring the radial tilt adjuster control signal St1 thereto.

A radial tilt evaluator 5210 is connected to the radial tilt controller 5212 for receiving the start command signal Sc therefrom, and is further connected to the radial tilt adjusting unit 5211 for transferring the radial tilt compensation signal St2 thereto.

A preamplifier 5202 is connected to the optical pickup unit 5201 for increasing the amplitude of the signal reproduced from the optical disk 1501, and produces a reproduction signal. This reproduction signal varies according to the lengths of pits formed in the recording track of the optical disk 1501.

A band filter 5204 having a frequency of f1 is connected to the preamplifier 5202 for receiving the reproduction signal therefrom. When the band filter 5202 is set to have a let-through frequency of f1=1/22 Tw the crosstalk component from the first track 5102 (FIG. 44A) of the first and third data sectors 1507*b* and 1509*b* or the third track 5107 (FIG. 44B) of the second and fourth data sectors 1508*b* and 1510*b* is passed through the filter along with the main component of the signal reproduced from the second track 5101(FIG. 44A) or 5105 (FIG. 44B).

A detector 5205 is connected to the band filter 5204 for converting the reproduced signal passed through the band filter 3803 into a voltage.

An address reader 5203 is connected to the preamplifier 5202 for reading the address information from the amplified reproduced signal to thereby produce a switching signal Sw.

The radial tilt controller 5212 is further connected to the address reader 5203 for receiving the switching signal Sw.

A select switch 5206 having one input port and two output ports is provided, and is operated by an control signal to selectively connect either one of the two output ports to the input port. This input port is connected to the detector 5205 for receiving the converted voltage therefrom. One of two output port is connected to a first sample holder 5207, and the other is connected to a second sample holder 5208.

A comparator 5209 is provided which has two input terminals. One terminal is connected to the first sample holder 5207 and the other terminal is connected to the second sample holder 5208 for receiving thus held crosstalk components from the neighboring tracks 5101 and 5107. The comparator 5209 detects a difference between these two voltages and produces the difference signal Sy. Note that this difference signal Sy represents the difference between two crosstalk components from the first or third and second or fourth sectors.

The radial tilt evaluator 5210 is further connected to the comparator 5209 for receiving the difference signal Sy.

Figure 46:
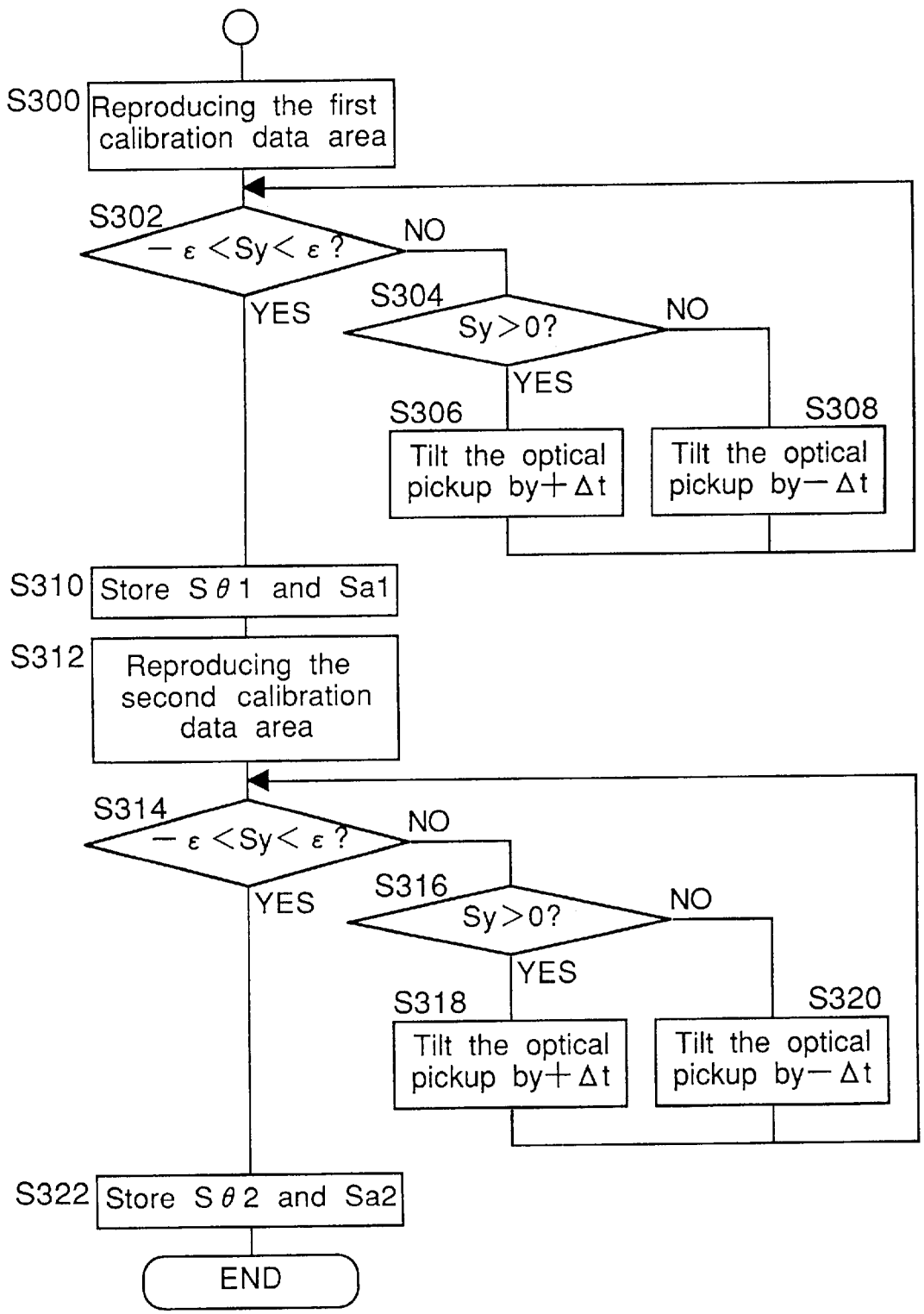
FIG. 46 is a flow chart showing a radial tilt adjusting operation of the optical disk apparatus of FIG. 45.

Although the flow chart for the operation of the above described optical disk apparatus P6 is shown in FIG. 46, a brief description of the operation is set forth below.

In the optical pickup 5201, accessing data from the second track of first sector 1507, for example, to reproduce therefrom is first performed. The preamplifier 5202 amplifies the reproduction signal from the optical pickup 5201 and transfers thus amplified reproduction signal to both the address reader 5203 and the band filter 5204.

The address reader 5203 reads the address information from the address area (1507*a*) of the sector (1507) to which the optical pickup 5301 is currently accessing. Based on the detected current sector address, the address reader 1507 further produces either one of two switching signal Sw1 or Sw2. Specifically, when the odd numbered sector is detected, indicating that the first sector 1707 or the third sector 1709 is currently accessed, the first switching signal Sw1 is produced. When the even numbered sector is detected, indicating that the second sector 1708 or the fourth sector 1710 is currently accessed, the second switching signal Sw2 is produced.

The band filter 5204 is set to have a let-through frequency of f1=1/22 Tw, so that the crosstalk components, from the first track 5102 of the first and third sectors 1507 and 1509 and from the third track 5107 of the second and fourth sectors 1508 and 1510, pass through to the detector 5205. The detector 5205 converts these crosstalk components into voltages, respectively.

On receipt of the first signal Sw1, the selector switch connects the detector 5205 to the first sample holder 5207 so that the crosstalk voltages from the odd numbered (first and third) sectors (1507 and 1509) are transferred to the first sample holder 5207. On receipt of the second signal Sw2, the selector switch connects the detector 5205 to the sample holder 5208 so that crosstalk voltages from the even numbered (second and fourth) sectors (1508 and 1510) are transferred to the second sample holder 5210.

As a result, the first sample holder 5207 holds the crosstalk component only from the inner circumferential tracks corresponding to the first calibration data track 32 of FIG. 3. The second sample holder 5208 holds the crosstalk component only from the outer circumferential tracks corresponding to the third calibration data track 33 of FIG. 3.

Therefore, the comparator 5209 compares the crosstalk components from the first and third calibration data tracks 32 and 34, and produces the difference signal Sy. Hereafter, the operation is similar to those performed by the optical disk apparatus P5 described with reference to FIGS. 31 and 32, and is omitted for the sake of brevity.

Figure 47A:
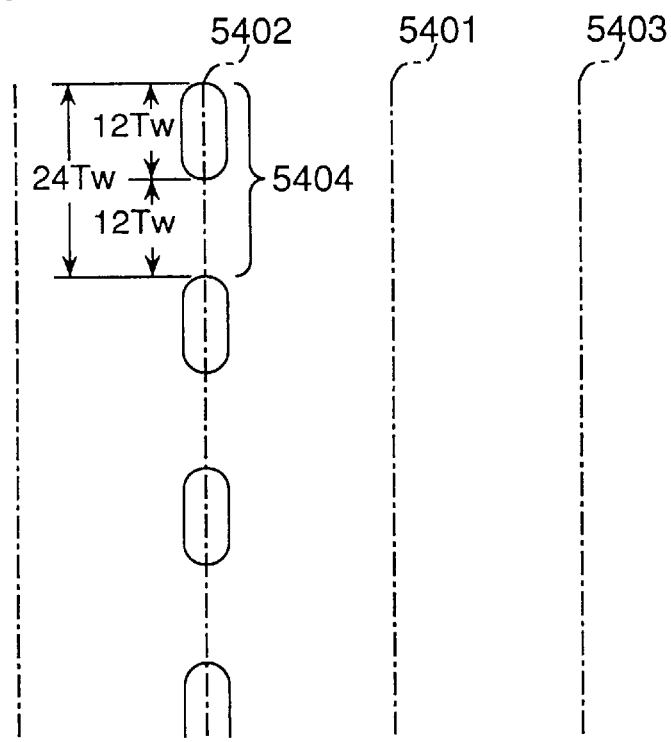
FIGS. 47A and 47B are graphs showing a first example of the calibration data areas of the optical disk of FIG. 43.
Figure 47B:
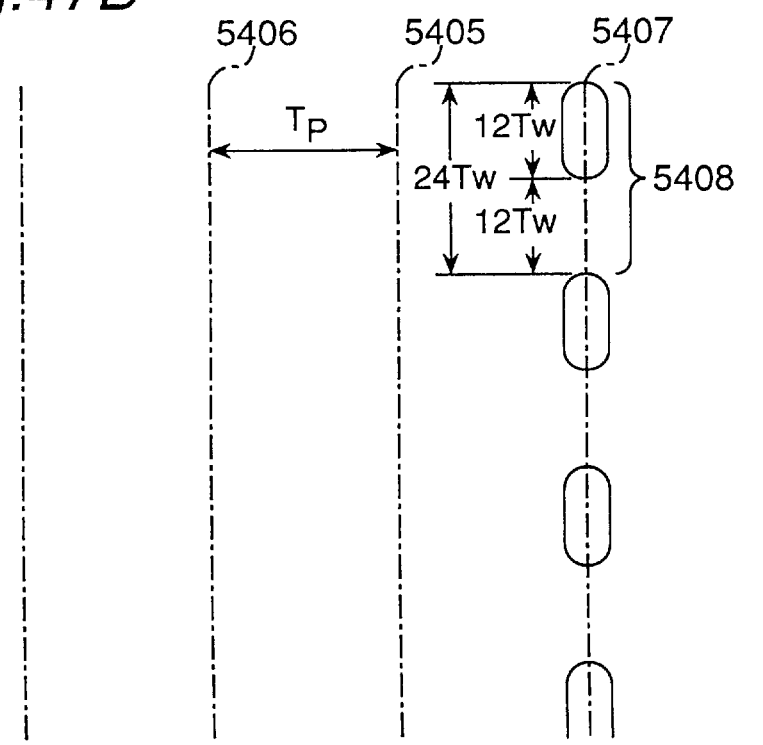

Referring to FIGS. 47A and 47B, other examples of calibration signals recorded to each of the calibration data areas 3C and 4C are shown.

In FIG. 47A, the first and third inner data sectors 1507*b* and 1509*b* similar to those in FIG. 44A are shown. Tracks 5401 and 5403 are the same as the second and third data tracks 5101 and 5103 of FIG. 44A. However, a first track 5102 is recorded with the second periodical signal having the fourth pit pattern 5404 corresponding to the fourth pit pattern 3705 of FIG. 30.

In FIG. 47B, the second and fourth data sectors 1508*b* and 1510 similar to those in FIG. 44B are shown. Tracks 5406 and 5405 are the same as the third and second data tracks 5106 and 5105 of FIG. 44B. However, a third track 5407 is recorded with the same second periodical signal as the first track 5402 of FIG. 47A.

Figure 48A:
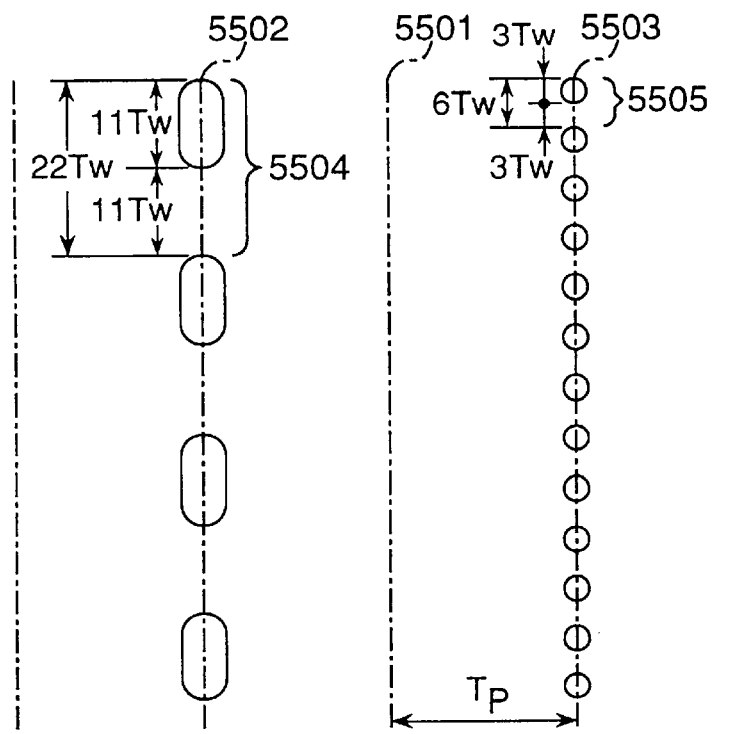
FIGS. 48A and 48B are graphs showing a second example of the calibration data areas of the optical disk of FIG. 43.
Figure 48B:
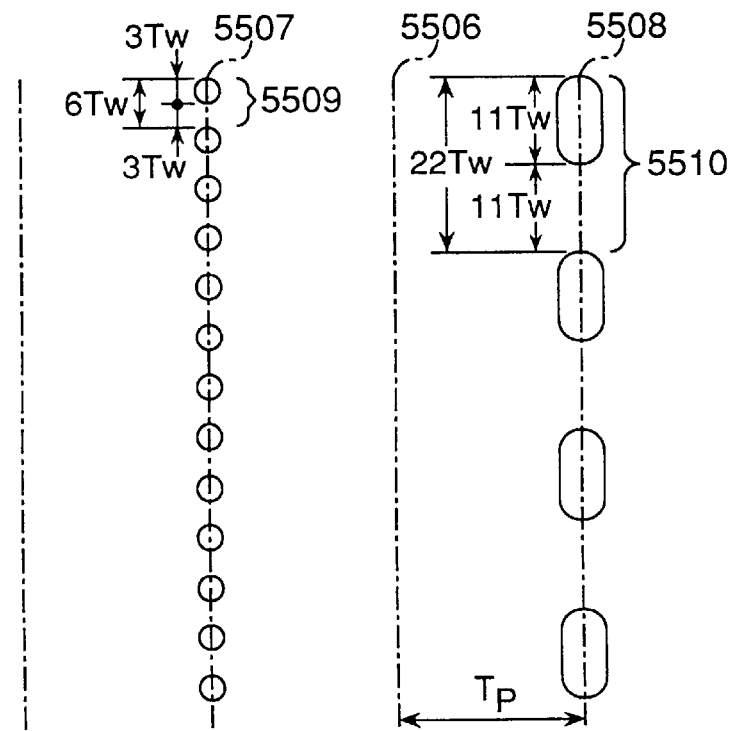

Referring to FIGS. 48A and 48B, other examples of calibration signals recorded to each of the calibration data areas 3C and 4C are shown.

In FIG. 48A, the first and third inner data sectors 1507*b* and 1509*b* (1503*b* and 1505*b*) similar to those in FIG. 44A are shown. Tracks 5502 and 5501 are the same as the first and second tracks 5102 and 5101 of FIG. 44A. However, a third track 5503 is recorded with the seventh periodical signal having a pit pattern 5503 corresponding to the pit pattern 4306 of FIG. 36.

In FIG. 48B, the second and fourth data sectors 1508*b* and 1510*b* (1504*b* and 1506*b*) similar to those in FIG. 44B shown. Tracks 5506 and 5508 are the same as the second and third tracks 5105 and 5106 of FIG. 44B. However, a first track 5507 is recorded with the same seventh periodical signal as the third track 5503 of FIG. 48A.

Figure 49A:
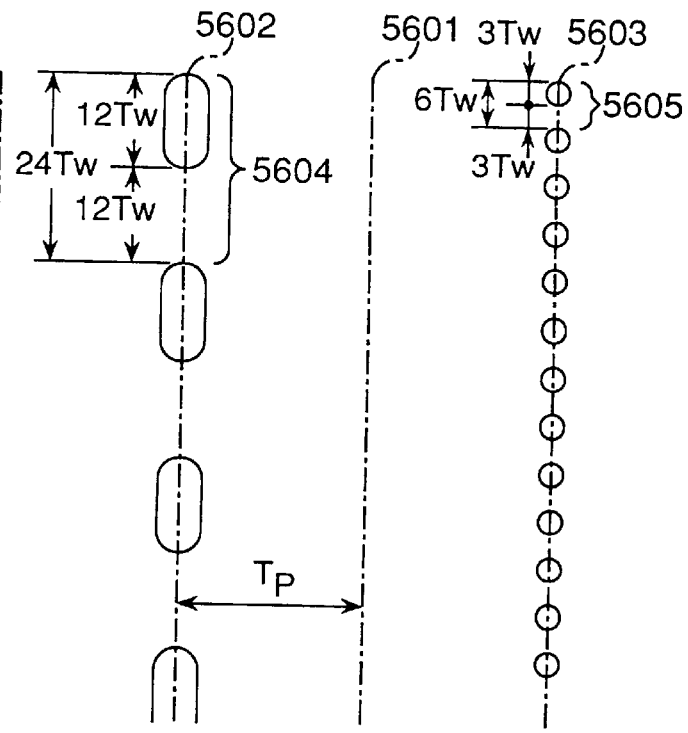
FIGS. 49A and 49B are graphs showing a third example of the calibration data areas of the optical disk of FIG. 43.
Figure 49B:
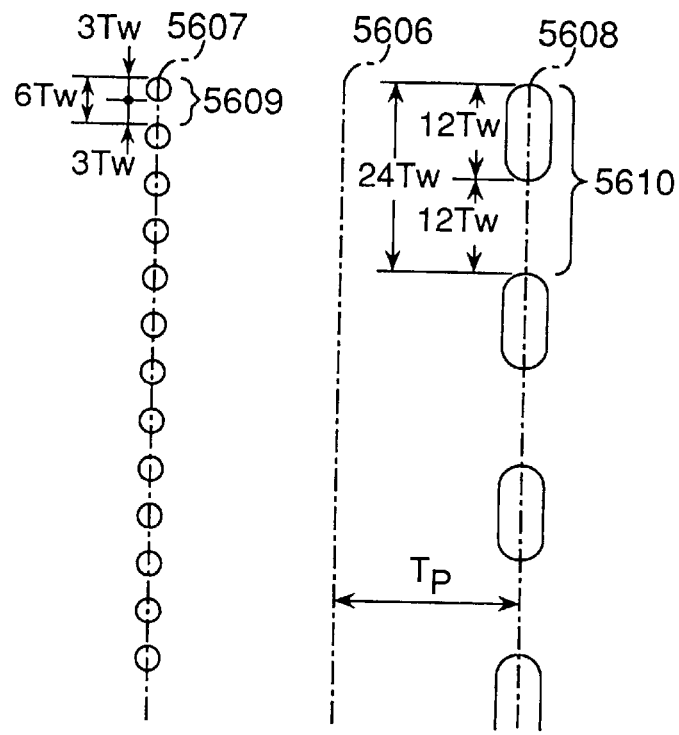

Referring to FIGS. 49A and 49B, other examples of calibration signals recorded to each of the calibration data areas 3C and 4C are shown.

In FIG. 49A, the first and third inner data sectors 1507*b* and 1509*b* (1503*b* and 1505*b*) similar to those in FIG. 47A are shown. Tracks 5602 and 5601 are the same as the first and second 5402 and 5401 of FIG. 47A. However, a third track 5603 is recorded with the seventh periodical signal having a pit pattern 5605 corresponding to the pit pattern 4306 of FIG. 36.

In FIG. 49B, the second and fourth data sectors 1508*b* and 1510*b* (1504*b* and 1506*b*) similar to those in FIG. 47B are shown. Tracks 5606 and 5608 are the same as the second and third tracks 5405 and 5406 of FIG. 4B. However, a first track 5607 is recorded with the same seventh periodical signal as the third track 5603 of FIG. 49A.

Figure 50A:
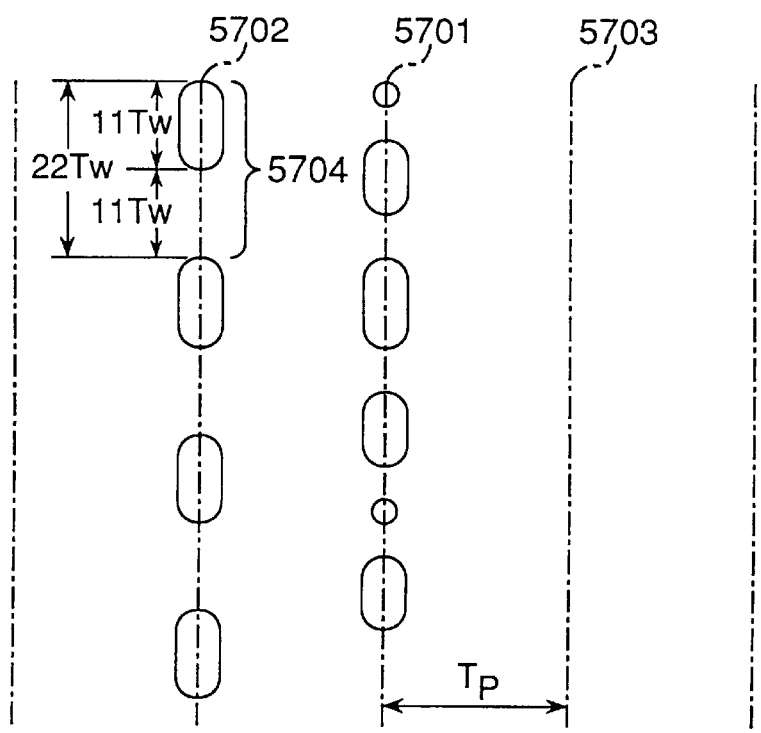
FIGS. 50A and 50B are graphs showing a fourth example of the calibration data areas of the optical disk of FIG. 43.
Figure 50B:
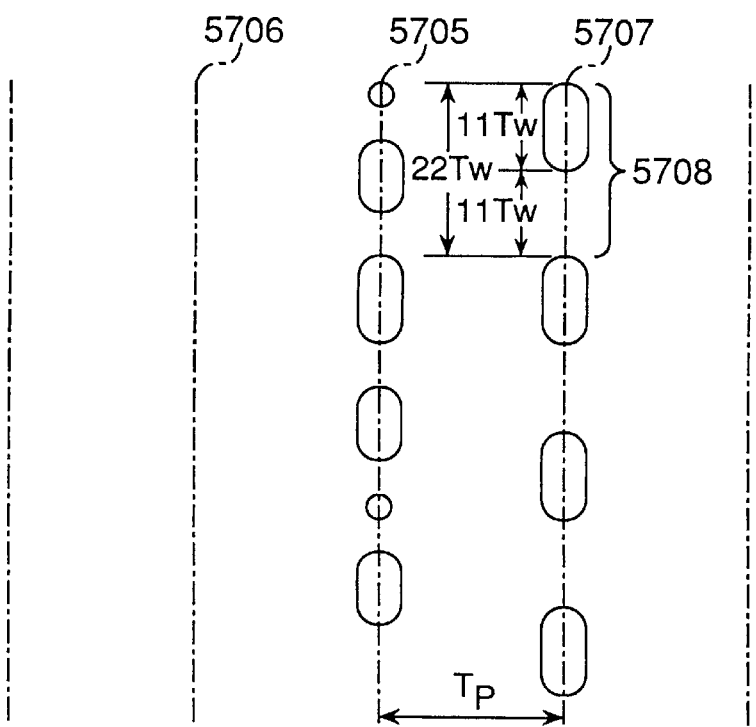

Referring to FIGS. 50A and 50B, other examples of calibration signals recorded to each of the calibration data areas 3C and 4C are shown.

In FIG. 50A, the first and third inner data sectors 1507*b* and 1509*b* (1503*b* and 1505*b*) similar to those in FIG. 44A are shown. Tracks 5702 and 5703 are the same as the first and third tracks 5102 and 5101 of FIG. 44A. However, a second track 5701 is recorded with the random signal recorded to the second track 4101 of FIG. 34.

In FIG. 50B, the second and fourth data sectors 1508*b* and 1510*b* (1504*b* and 1506*b*) similar to those in FIG. 44B are shown. Tracks 5706 and 5708 are the same as the first and third tracks 5106 and 5107 of FIG. 44B. However, a second track 5705 is recorded with the random signal as the second track 5701 of FIG. 50A.

Figure 51A:
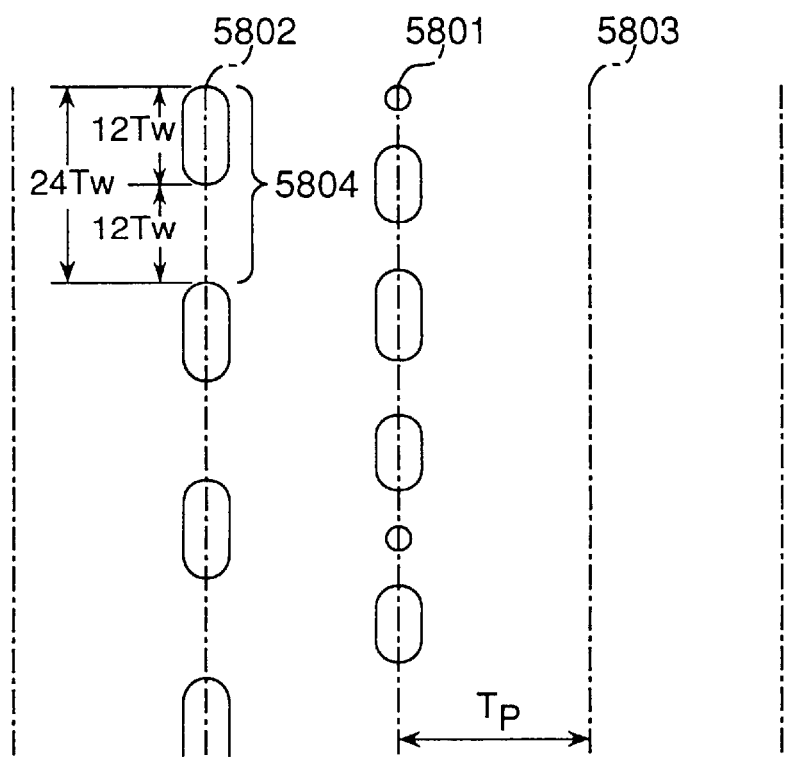
FIGS. 51A and 51B are graphs showing a fifth example of the calibration data areas of the optical disk of FIG. 43.
Figure 51B:
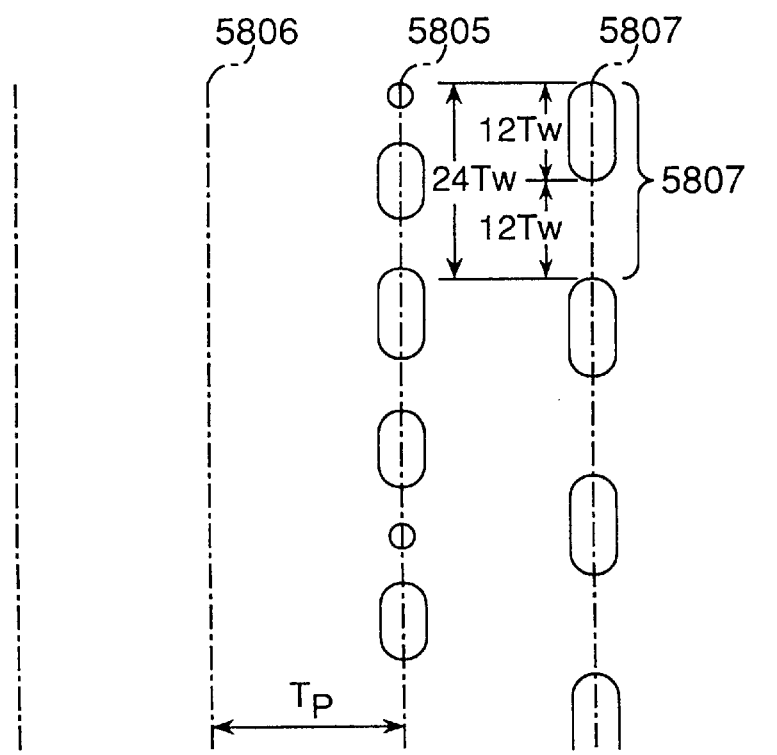

Referring to FIGS. 51A and 51B, other examples of calibration signals recorded to each of the calibration data areas 3C and 4C are shown.

In FIG. 51A, the first and third inner data sectors 1507*b* and 1509*b* (1503*b* and 1505*b*) similar to those in FIG. 47A are shown. Tracks 5802 and 5803 are the same as the first and third tracks 5402 and 5403 of FIG. 47A. However, a second track 5801 is recorded with the random signal recorded to the second track 4101 of FIG. 34.

In FIG. 51B, the second and fourth data sectors 1508*b* and 1510*b* (1504*b* and 1506*b*) similar to those in FIG. 47B are shown. Tracks 5706 and 5707 are the same as the first and third tracks 5406 and 5407 of FIG. 47B. However, a second track 5805 is recorded with the random signal the same as the second track 5801 of FIG. 51A.

Figure 52A:
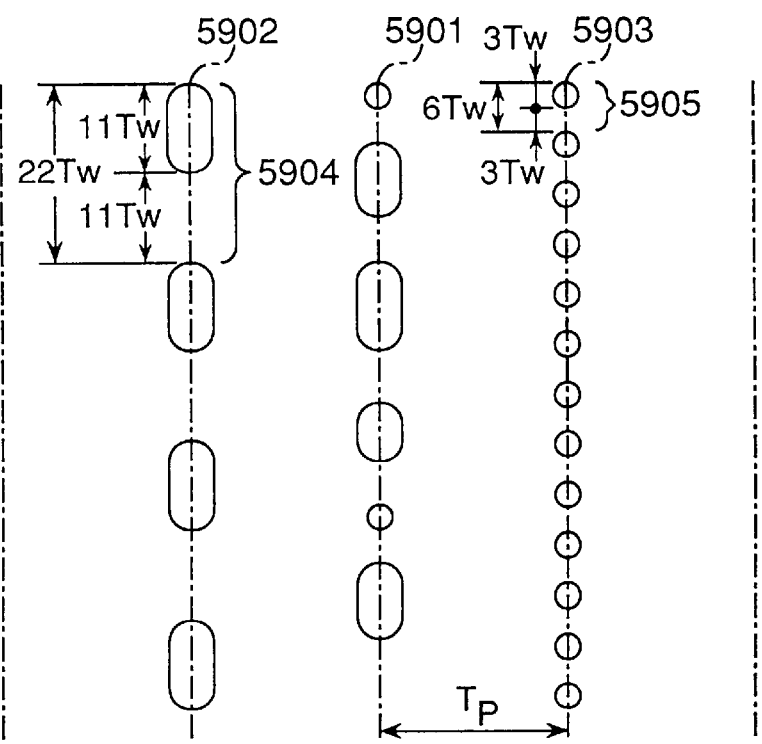
FIGS. 52A and 52B are graphs showing a sixth example of the calibration data areas of the optical disk of FIG. 43.
Figure 52B:
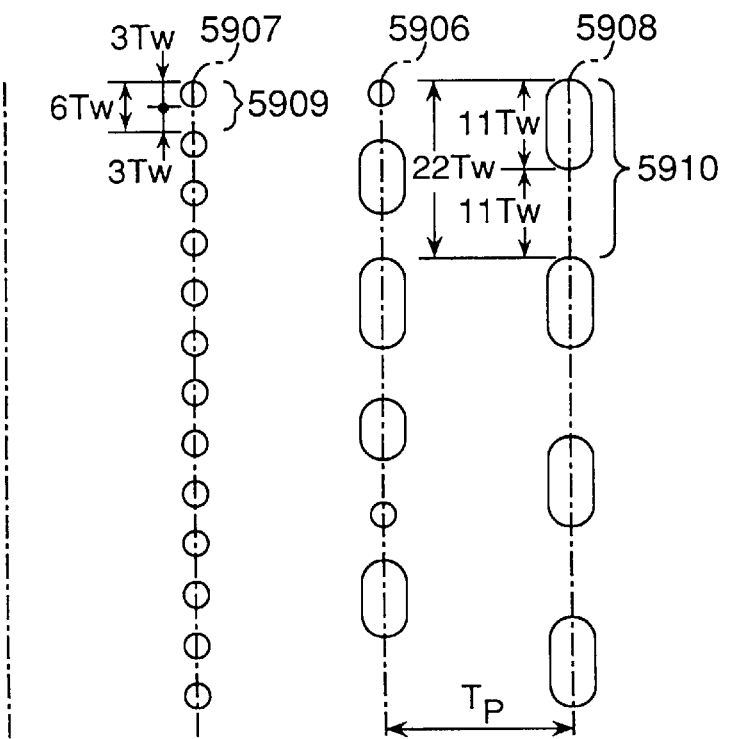

Referring to FIGS. 52A and 52B, other examples of calibration signals recorded to each of the calibration data areas 3C and 4C are shown.

In FIG. 52A, the first and third inner data sectors 1507*b* and 1509*b* (1503*b* and 1505*b*) similar to those in FIG. 50A are shown. Tracks 5902 and 5901 are the same as the first and second tracks 5702 and 5701 of FIG. 50A. However, a third track 5903 is recorded with the seventh periodical signal recorded to the third track 5503 of FIG. 48A.

In FIG. 52B, the second and fourth data sectors 1508*b* and 1510*b* (1504*b* and 1506*b*) similar to those in FIG. 50B are shown. Tracks 5906 and 5908 are the same as the first and third tracks 5106 and 5107 of FIG. 44B. However, a second track 5705 is recorded with the random signal as the second track 5701 of FIG.

Figure 53A:
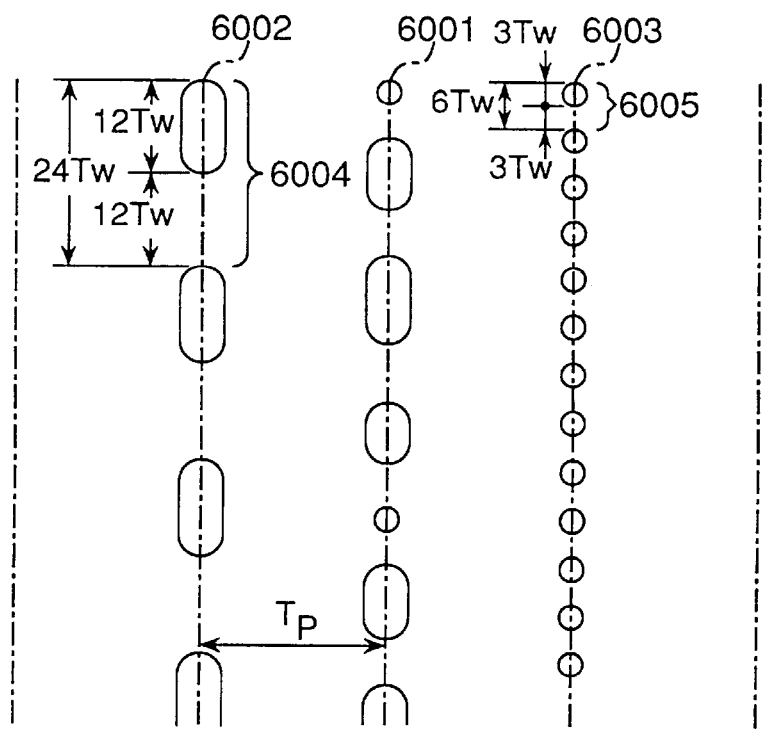
FIGS. 53A and 53B are graphs showing a seventh example of the calibration data areas of the optical disk of FIG. 43.
Figure 53B:
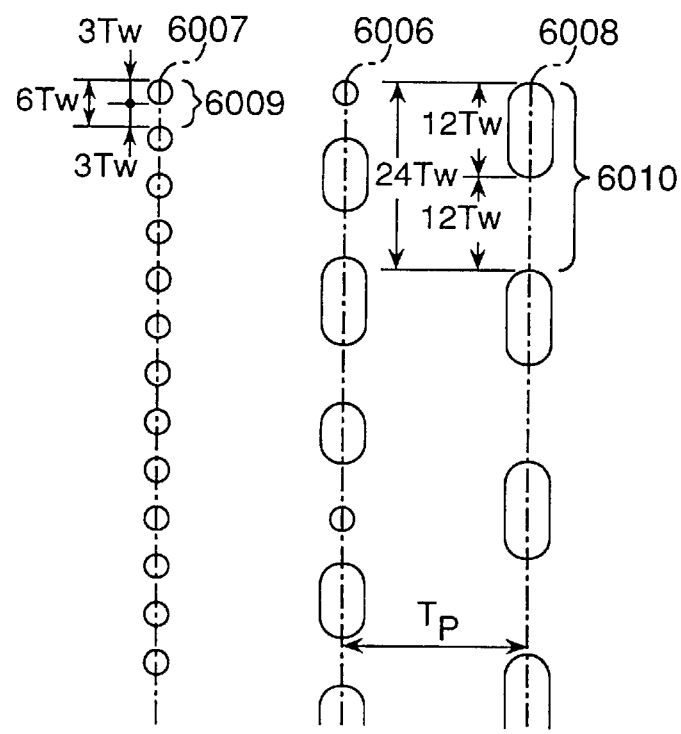

Referring to FIGS. 53A and 53B, other examples of calibration signals recorded to each of the calibration data areas 3C and 4C are shown.

In FIG. 53A, the first and third inner data sectors 1507*b* and 1509*b* (1503*b* and 1505*b*) similar to those in FIG. 51A are shown. Tracks 6002 and 6001 are the same as the first and second tracks 5802 and 5803 of FIG. 51A. However, a third track 6003 is recorded with the same seventh periodical signal as the third track 5603 of FIG. 49A.

In FIG. 53B, the second and fourth data sectors 1508*b* and 1510*b* (1504*b* and 1506*b*) similar to those in FIG. 51B are shown. Tracks 6006 and 6008 are the same as the second and third tracks 5805 and 5807 of FIG. 51B. However, a first track 6007 is recorded with the same seventh periodical signal as the third track 6003 of FIG. 53A.

Figure 54A:
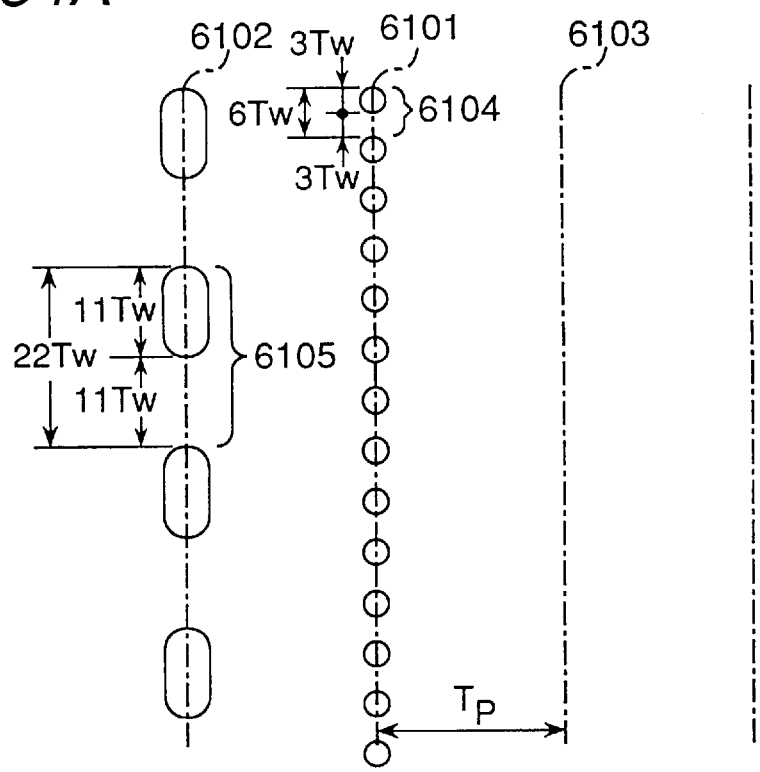
FIGS. 54A and 54B are graphs showing a seventh example of the calibration data areas of the optical disk of FIG. 43.
Figure 54B:
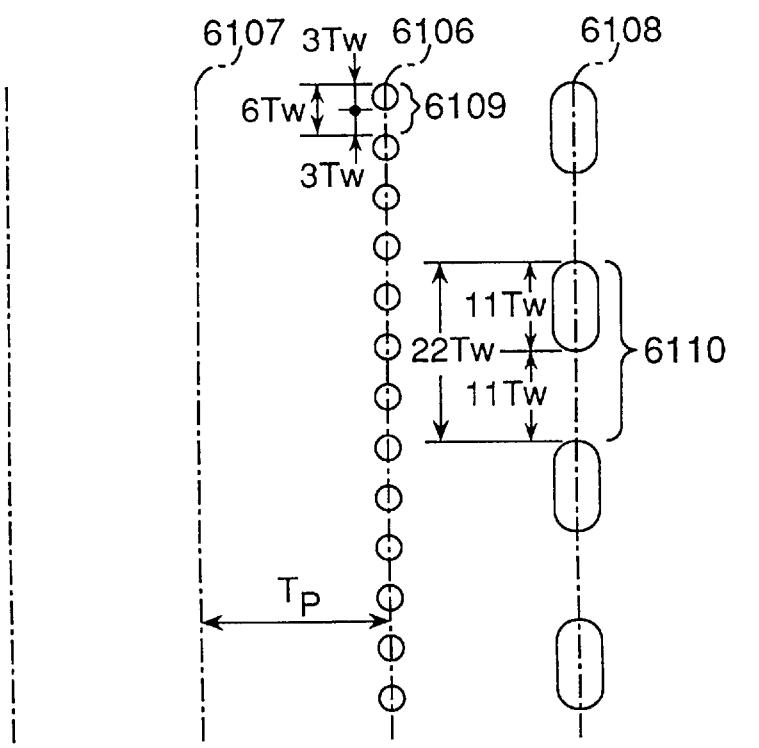

Referring to FIGS. 54A and 54B, other examples of calibration signals recorded to each of the calibration data areas 3C and 4C are shown.

In FIG. 54A, the first and third inner data sectors 1507*b* and 1509*b* (1503*b* and 1505*b*) similar to those in FIG. 50A are shown. Tracks 6102 and 6103 are the same as the first and third tracks 5702 and 5703 of FIG. 50A. However a second track 6101 is recorded with the same seventh periodical signal as the third track 5903 of FIG. 52A.

In FIG. 54B, the second and fourth data sectors 1508*b* and 1510*b* (1504*b* and 1506*b*) similar to those in FIG. 51B are shown. Tracks 6107 and 6108 are the same as the first and third tracks 5706 and 5707 of FIG. 50B. However, a second track 6106 is recorded with the same seventh periodical signal as the second track 6101 of FIG. 54A.

Figure 55A:
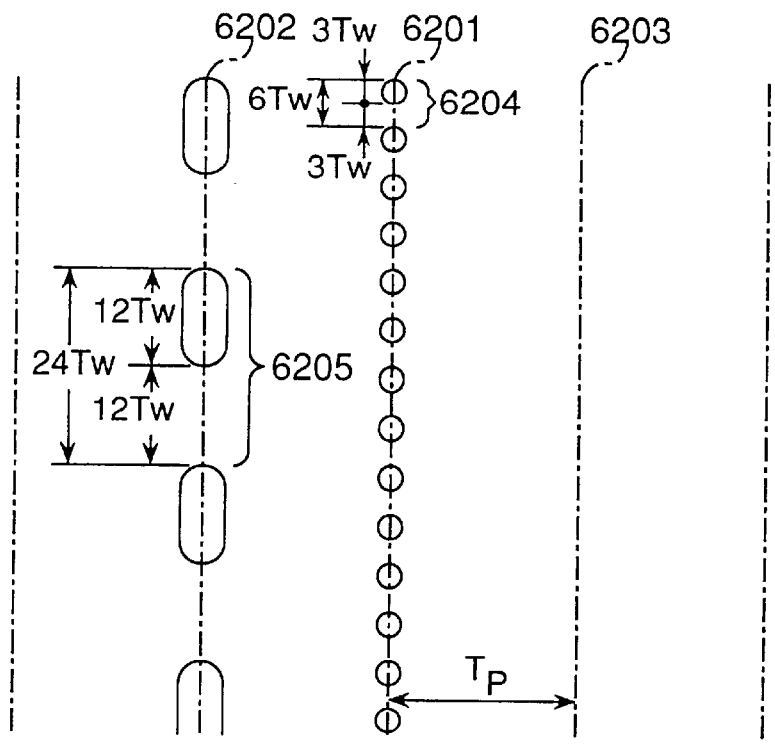
FIGS. 55A and 55B are graphs showing an eighth example of the calibration data areas of the optical disk of FIG. 43.
Figure 55B:
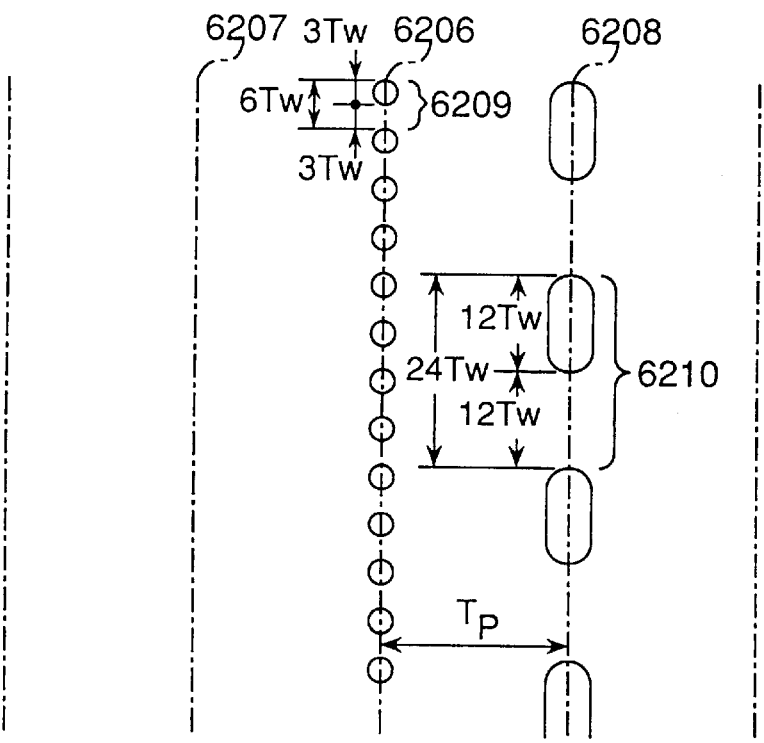

Referring to FIGS. 55A and 55B, other examples of calibration signals recorded to each of the calibration data areas 3C and 4C are shown.

In FIG. 55A, the first and third inner data sectors 1507*b* and 1509*b* (1503*b* and 1505*b*) similar to those in FIG. 51A are shown. Tracks 6202 and 6203 are the same as the first and third tracks 5802 and 5803 of FIG. 51A. However, a second track 6201 is recorded with the same seventh periodical signal as the third track 5603 of FIG. 49A.

In FIG. 55B, the second and fourth data sectors 1508*b* and 1510*b* (1504*b* and 1506*b*) similar to those in FIG. 51B are shown. Tracks 6207 and 6208 are the same as the first and third tracks 5806 and 5807 of FIG. 51B. However, a second track 6206 is recorded with the same seventh periodical signal as the second track 6201 of FIG. 55A.

Figure 56A:
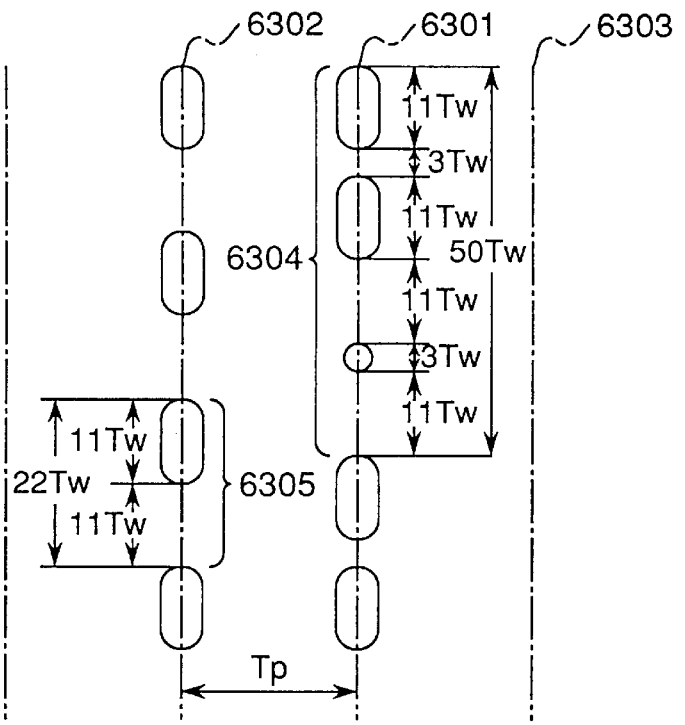
FIGS. 56A and 56B are graphs showing a ninth example of the calibration data areas of the optical disk of FIG. 43.
Figure 56B:
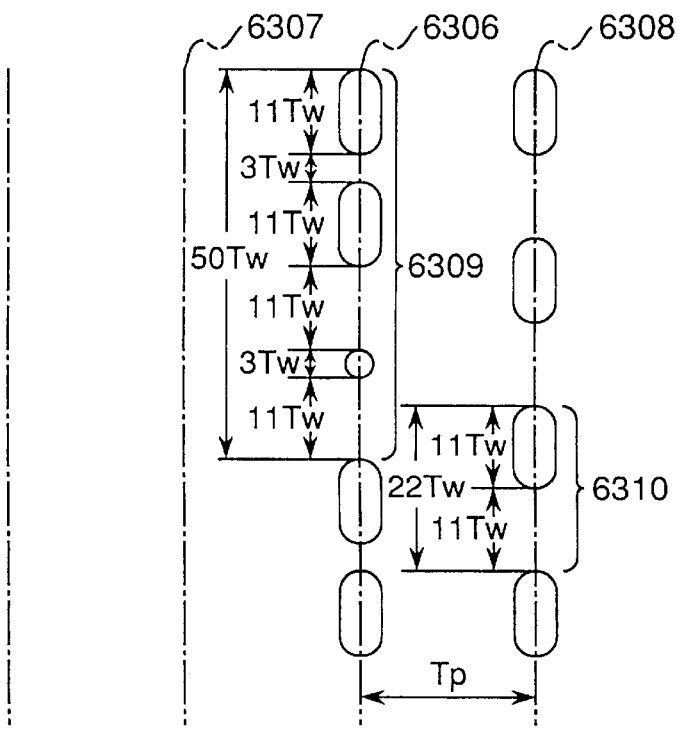

Referring to FIGS. 56A and 56B, other examples of calibration signals recorded to each of the calibration data areas 3C and 4C are shown.

In FIG. 56A, the first and third inner data sectors 1507*b* and 1509*b* (1503*b* and 1505*b*) similar to those in FIG. 50A are shown. Tracks 6302 and 6303 are the same as the first and third tracks 5702 and 5703 of FIG. 50A. However, a second track 6301 is recorded with the eighth periodical signal represented by a pit pattern 6304 corresponding to the pit pattern 4506 of FIG. 38.

In FIG. 56B, the second and fourth data sectors 1508*b* and 1510*b* (1504*b* and 1506*b*) similar to those in FIG. 50B are shown. Tracks 6307 and 6308 are the same as the first and third tracks 5706 and 5707 of FIG. 56B. However, a second track 6306 is recorded with the same eight periodical signal as the second track 6301 of FIG. 56A.

Figure 57A:
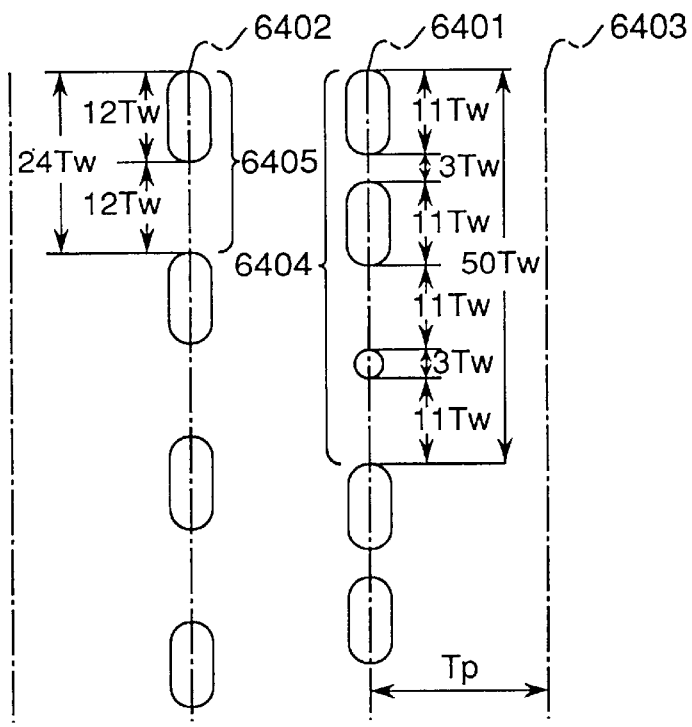
FIGS. 57A and 57B are graphs showing a tenth example of the calibration data areas of the optical disk of FIG. 43.
Figure 57B:
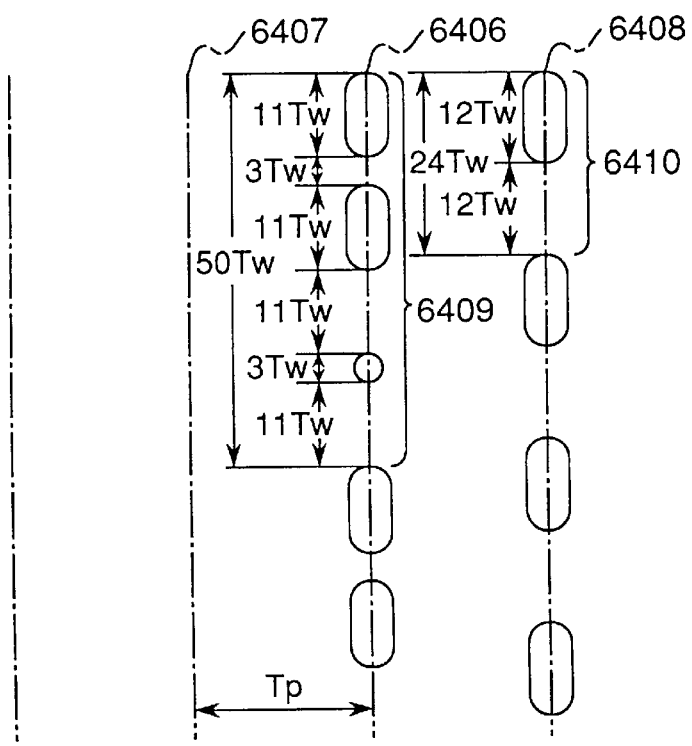

Referring to FIGS. 57A and 57B, other examples of calibration signals recorded to each of the calibration data areas 3C and 4C are shown.

In FIG. 57A, the first and third inner data sectors 1507*b* and 1509*b* (1503*b* and 1505*b*) similar to those in FIG. 51A is shown. Tracks 6402 and 6403 are the same as the first and third tracks 5802 and 5803 of FIG. 51A. However, a second track 6401 is recorded with the eighth periodical signal represented by a pit pattern 6404 corresponding to the pit pattern 4506 of FIG. 38.

In FIG. 57B, the second and fourth data sectors 1508*b* and 1510*b* (1504*b* and 1506*b*) similar to those in FIG. 51B are shown. Tracks 6407 and 6408 are the same as the first and third tracks 5806 and 5807 of FIG. 51B. However, a second track 6406 is recorded with the same eighth periodical signal as the second track 6401 of FIG. 57A.

Figure 58A:
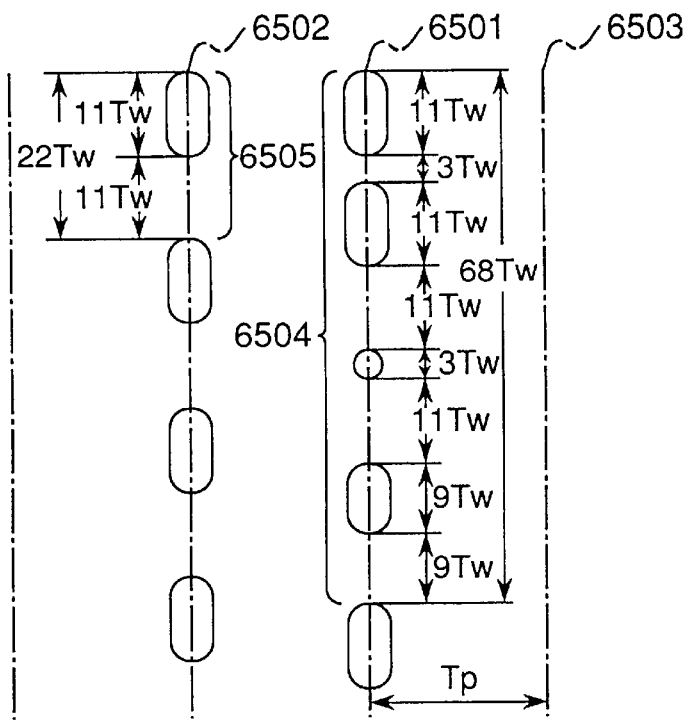
FIGS. 58A and 58B are graphs showing an eleventh example of the calibration data areas of the optical disk of FIG. 43.
Figure 58B:
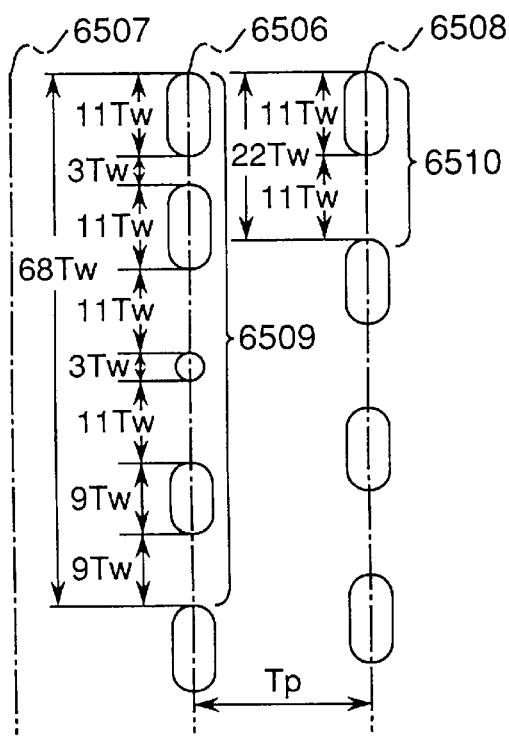

Referring to FIGS. 58A and 58B, other examples of calibration signals recorded to each of the calibration data areas 3C and 4C are shown.

In FIG. 58A the first and third inner data sectors 1507*b* and 1509*b* (1503*b* and 1505*b*) similar to those in FIG. 56A are shown. Tracks 6502 and 6503 are the same as the first and third tracks 6302 and 6303 of FIG. 56A. However, a second track 6501 is recorded with the ninth periodical signal represented by a pit pattern 6504 corresponding to the pit pattern 4701 of FIG. 40.

In FIG. 58B, the second and fourth data sectors 1508*b* and 1510*b* (1504*b* and 1506*b*) similar to those in FIG. 50B are shown. Tracks 6507 and 6508 are the same as the first and third tracks 6307 and 6308 of FIG. 56B. However, a second track 6306 is recorded with the same ninth periodical signal as the second track 6501 of FIG. 58A.

Figure 59A:
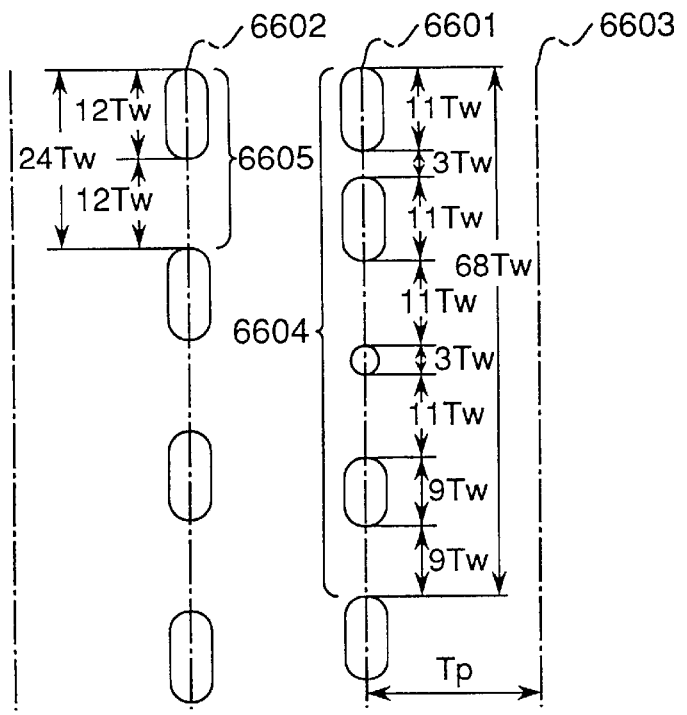
FIGS. 59A and 59B are graphs showing a twelfth example of the calibration data areas of the optical disk of FIG. 43.
Figure 59B:
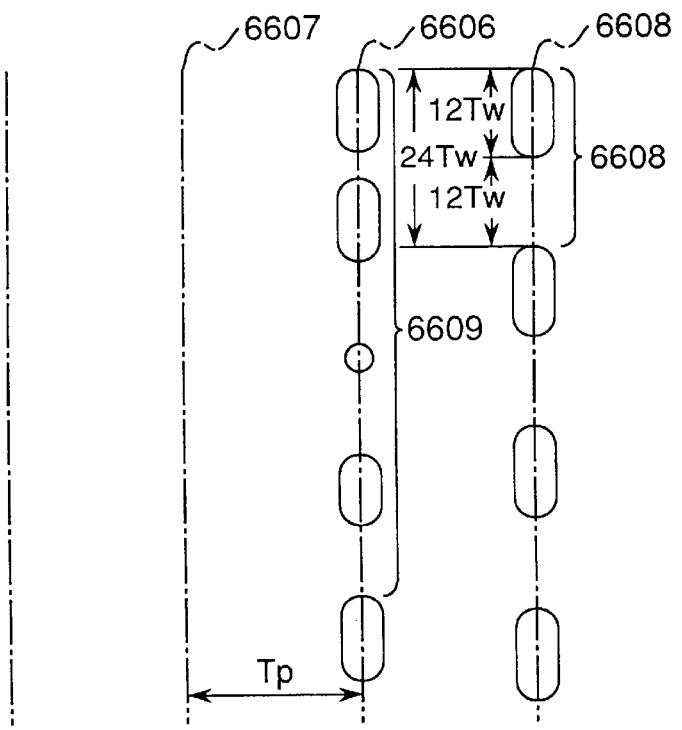

Referring to FIGS. 59A and 59B, other examples of calibration signals recorded to each of the calibration data areas 3C and 4C are shown.

In FIG. 59A, the first and third inner data sectors 1507*b* and 1509*b* (1503*b* and 1505*b*) similar to those in FIG. 57A are shown. Tracks 6602 and 6603 are the same as the first and third tracks 6402 and 6403 of FIG. 57A. However, a second track 6601 is recorded with the ninth periodical signal represented by a pit pattern 6604 corresponding to the pit pattern 4701 of FIG. 40.

In FIG. 59B, the second and fourth data sectors 1508*b* and 1510*b* (1504*b* and 1506*b*) similar to those in FIG. 51B are shown. Tracks 6607 and 6608 are the same as the first and third tracks 6407 and 6408 of FIG. 57B. However, a second track 6606 is recorded with the same ninth periodical signal as the second track 6601 of FIG. 59A.

Figure 60A:
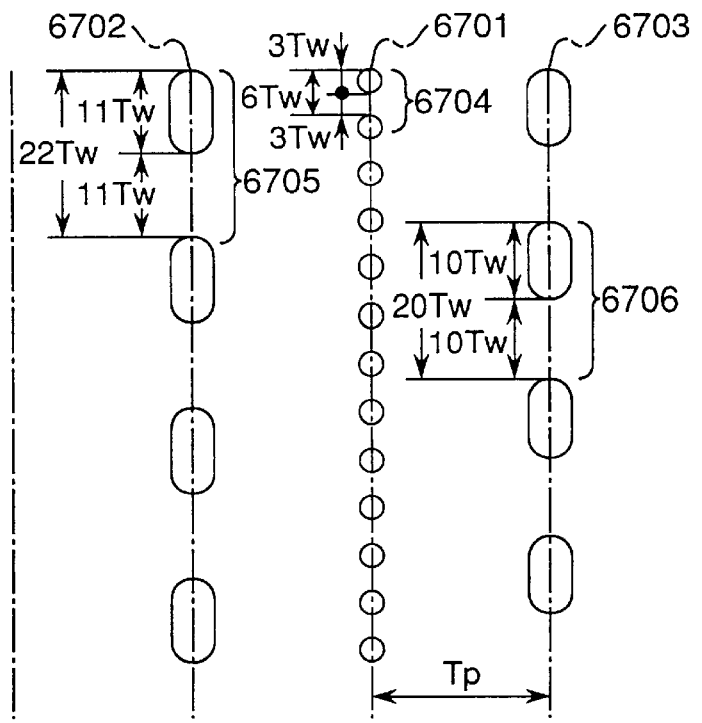
FIGS. 60A and 60B are graphs showing a thirteenth example of the calibration data areas of the optical disk of FIG. 43.
Figure 60B:
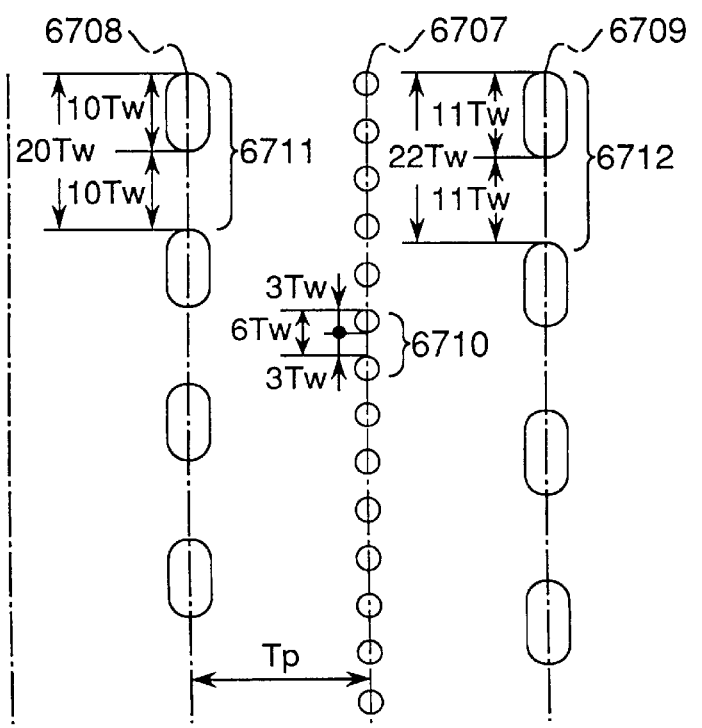

Referring to FIGS. 60A and 60B, other examples of calibration signals recorded to each of the calibration data areas 3C and 4C are shown.

In FIG. 60A the first and third inner data sectors 1507*b* and 1509*b* (1503*b* and 1505*b*) similar to those in FIG. 54A are shown. Tracks 6702 and 6701 are the same as the first and second tracks 6102 and 6101 of FIG. 54A. However, a third track 6703 is recorded with the second periodical signal represented by a pit pattern 6706 corresponding to the fourth pit pattern 3705 of FIG. 30.

In FIG. 60B, the second and fourth data sectors 1508*b* and 1510*b* (1504*b* and 1506*b*) similar to those in FIG. 54B are shown. Tracks 6707 and 6709 are the same as the second and third tracks 6106 and 6108 of FIG. 54B. However, a first track 6708 is recorded with the same second periodical signal as the third track 6703 of FIG. 60A.

Figure 61A:
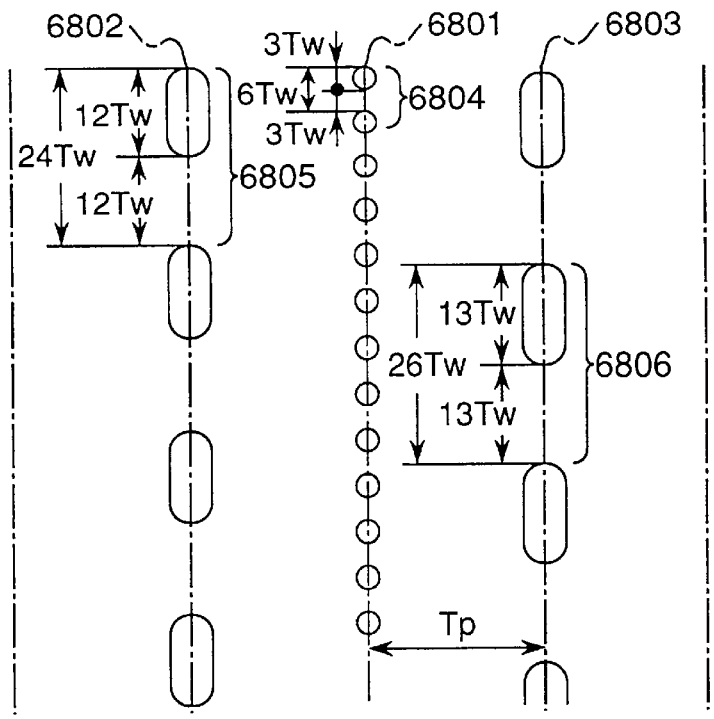
FIGS. 61A and 61B are graphs showing a fourteenth example of the calibration data areas of the optical disk of FIG. 43.
Figure 61B:
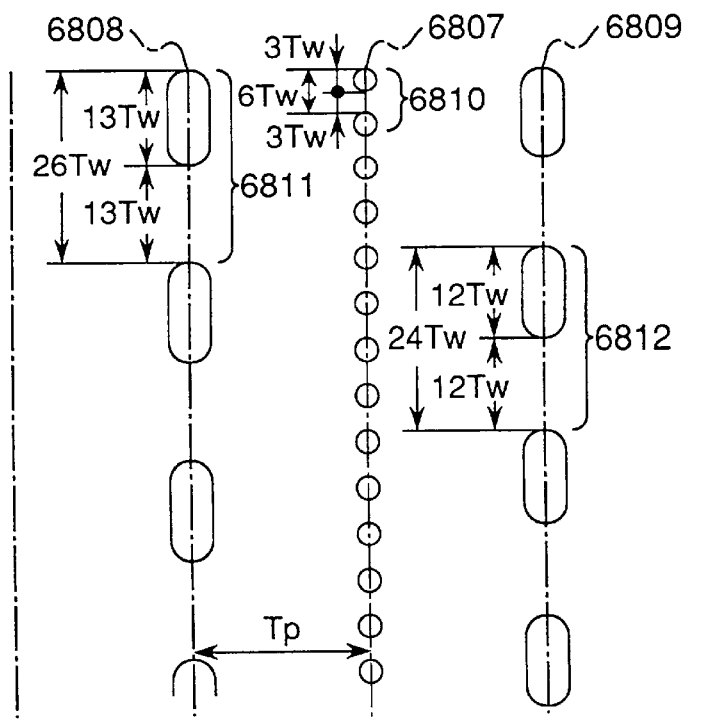

Referring to FIGS. 61A and 61B, other examples of calibration signals recorded to each of the calibration data areas 3C and 4C are shown.

In FIG. 61A, the first and third inner data sectors 1507*b* and 1509*b* (1503*b* and 1505*b*) similar to those in FIG. 55A are shown. Tracks 6802 and 6801 are the same as the first and second tracks 6202 and 6201 of FIG. 54A. However, a third track 6803 is recorded with the first periodical signal represented by a pit pattern 6806 corresponding to the fifth pit pattern 4004 of FIG. 33.

In FIG. 61B, the second and fourth data sectors 1508*b* and 1510*b* (1504*b* and 1506*b*) similar to those in FIG. 51B are shown. Tracks 6807 and 6809 are the same as the second and third tracks 6207 and 6208 of FIG. 55B. However, a first track 6808 is recorded with the same first periodical signal recorded to the third track 6803 of FIG. 61A.

Figure 62A:
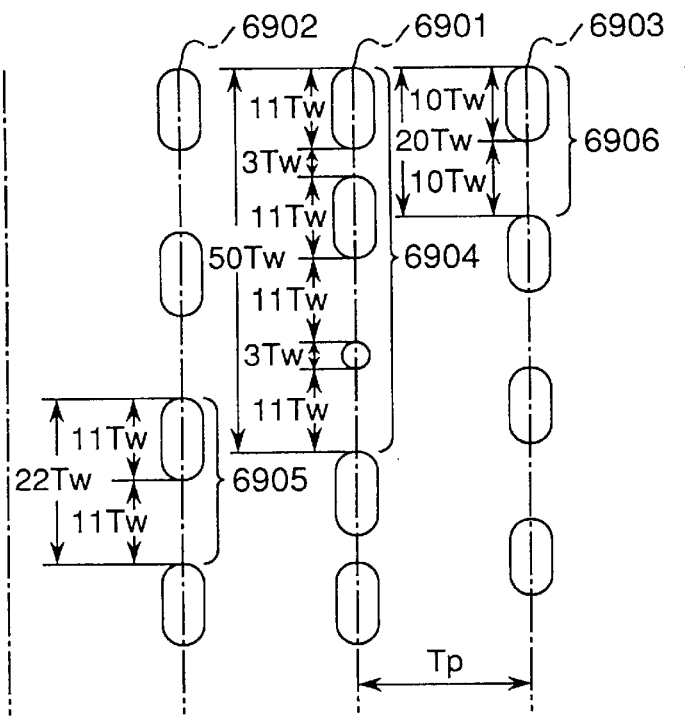
FIGS. 62A and 62B are graphs showing a fifteenth example of the calibration data areas of the optical disk of FIG. 43.
Figure 62B:
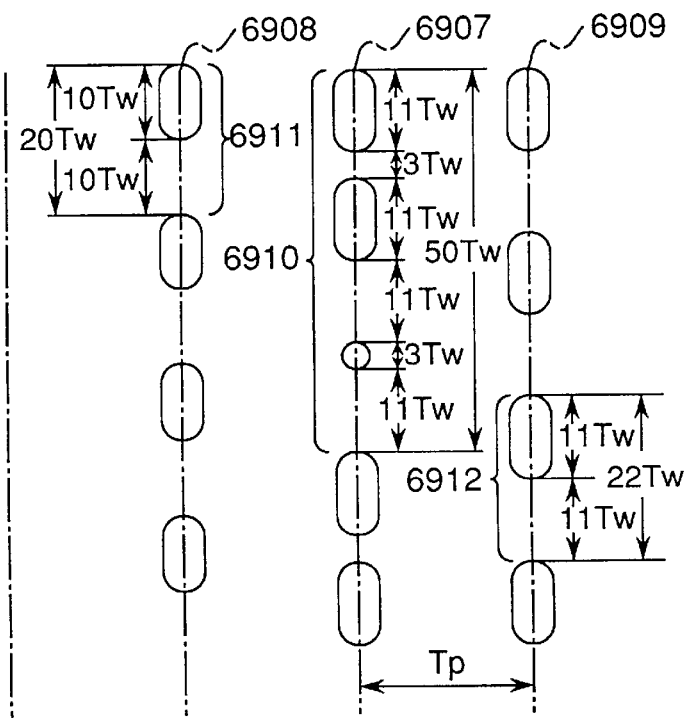

Referring to FIGS. 62A and 62B, other examples of calibration signals recorded to each of the calibration data areas 3C and 4C are shown.

In FIG. 62A, the first and third inner data sectors 1507b and 1509b (1503b and 1505b) similar to those in FIG. 60A are shown. Tracks 6902 and 6903 are the same as the first and third tracks 6702 and 6703 of FIG. 60A. However, a second track 6901 is recorded with the eighth periodical signal represented by a pit pattern 6904 corresponding to the pit pattern 4506 of FIG. 38.

In FIG. 62B, the second and fourth data sectors 1508b and 1510b (1504b and 1506b) similar to those in FIG. 60B are shown. Tracks 6908 and 6909 are the same as the first and third tracks 6708 and 6709 of FIG. 60B. However, a second track 6907 is recorded with the same eighth periodical signal as the second track 6901 of FIG. 62A.

Figure 63A:
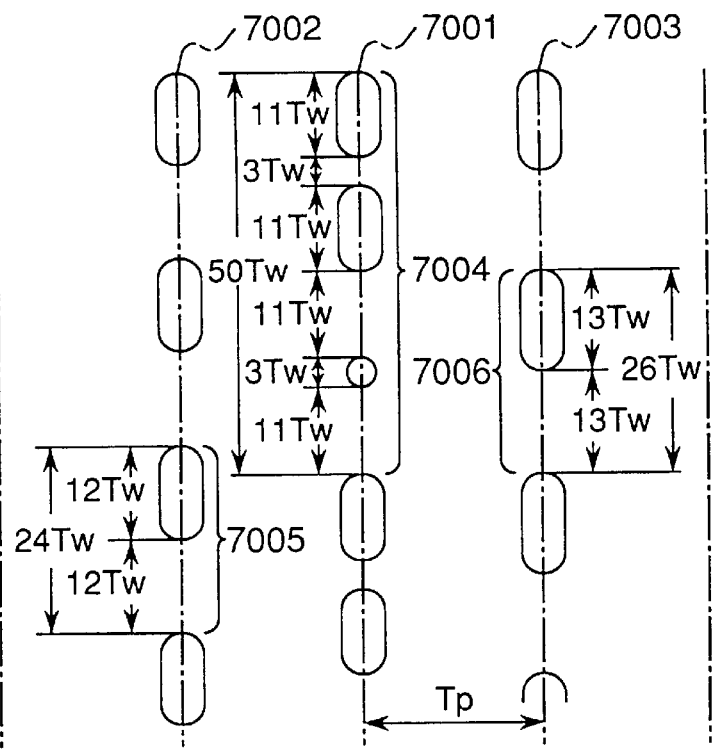
FIGS. 63A and 63B are graphs showing a sixteenth example of the calibration data areas of the optical disk of FIG. 43.
Figure 63B:
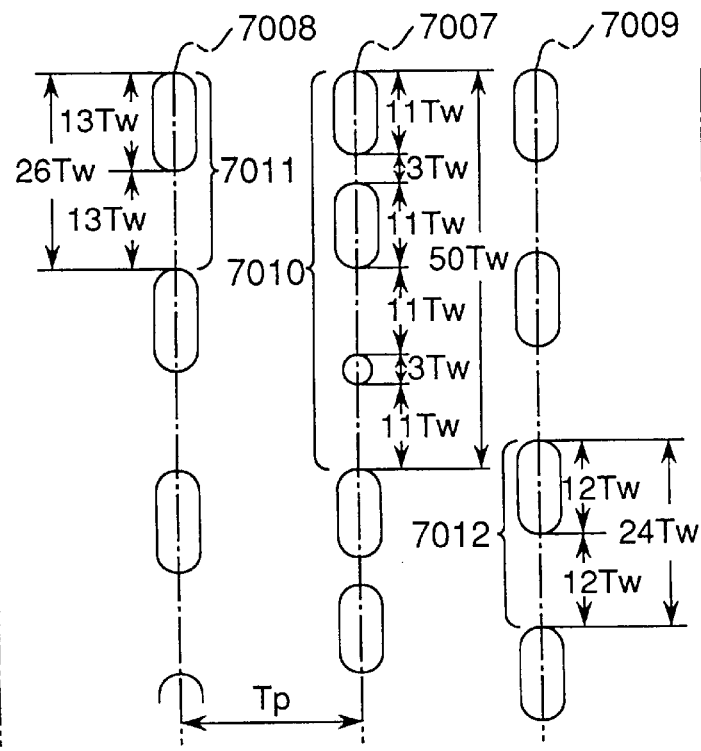

Referring to FIGS. 63A and 63B, other examples of calibration signals recorded to each of the calibration data areas 3C and 4C are shown.

In FIG. 63A, the first and third inner data sectors 1507b and 1509b (1503b and 1505b) similar to those in FIG. 61A are shown. Tracks 7002 and 7003 are the same as the first and third tracks 6802 and 6803 of FIG. 61A. However, a second 7001 is recorded with the eighth periodical signal represented by a pit pattern 6904 corresponding to the pit pattern 4506 of FIG. 38.

In FIG. 63B, the second and fourth data sectors 1508b and 1510b (1504b and 1506b) similar to those in FIG. 61B are shown. Tracks 7008 and 7009 are the same as the first and third tracks 6808 and 6809 of FIG. 61B. However, a second track 6807 is recorded with the same eighth periodical signal as the second track 7001 of FIG. 63A.

Figure 64A:
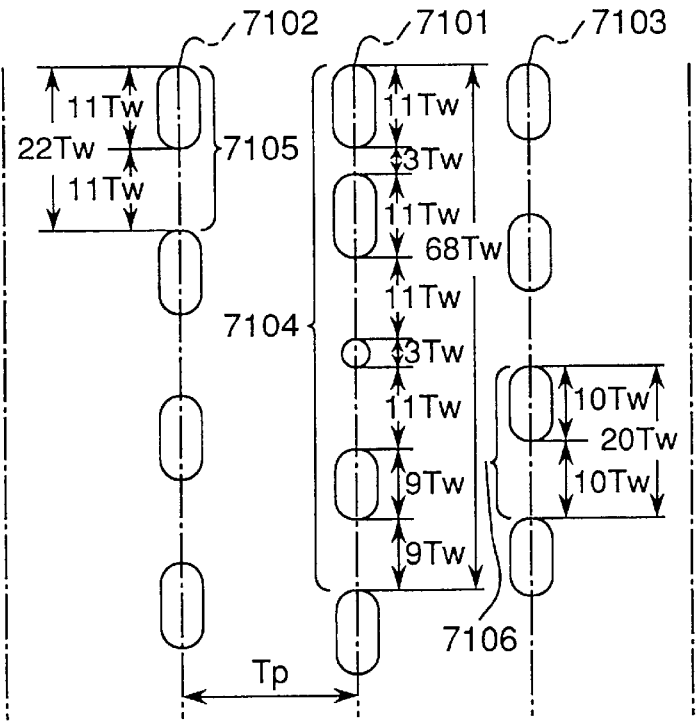
FIGS. 64A and 64B are graphs showing a seventeenth example of the calibration data areas of the optical disk of FIG. 43.
Figure 64B:
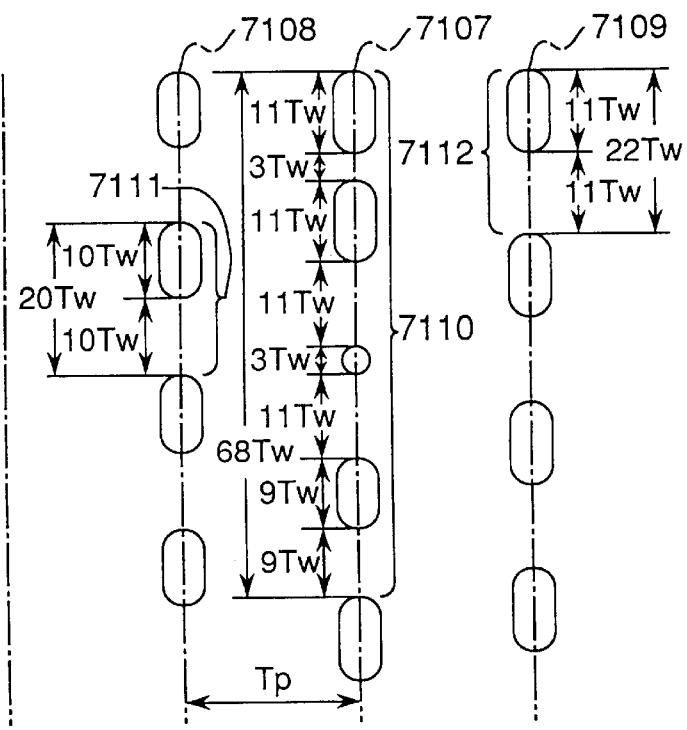

Referring to FIGS. 64A and 64B, other examples of calibration signals recorded to each of the calibration data areas 3C and 4C are shown.

In FIG. 64A, the first and third inner data sectors 1507b and 1509b (1503b and 1505b) similar to those in FIG. 62A are shown. Tracks 7102 and 7103 are the same as the first and third tracks 6902 and 6903 of FIG. 62A. However, a second track 7101 is recorded with the ninth periodical signal represented by a pit pattern 7104 corresponding to the pit pattern 4701 of FIG. 40.

In FIG. 64B, the second and fourth data sectors 1508b and 1510b (1504b and 1506b) similar to those in FIG. 62B are shown. Tracks 7108 and 7109 are the same as the first and third tracks 6908 and 6909 of FIG. 62B. However, a second track 7107 is recorded with the same ninth periodical signal as the second track 7101 of FIG. 64A.

Figure 65A:
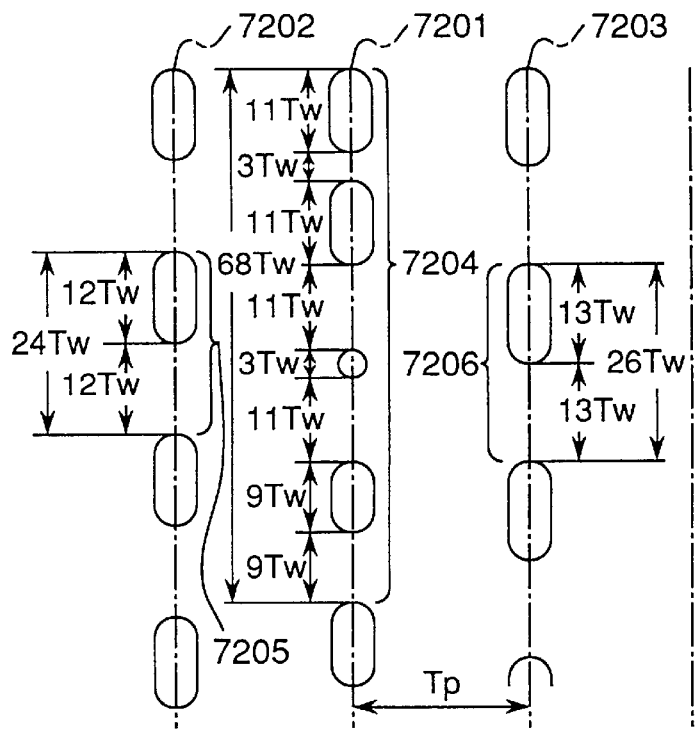
FIGS. 65A and 65B are graphs showing a eighteenth example of the calibration data areas of the optical disk of FIG. 43.
Figure 65B:
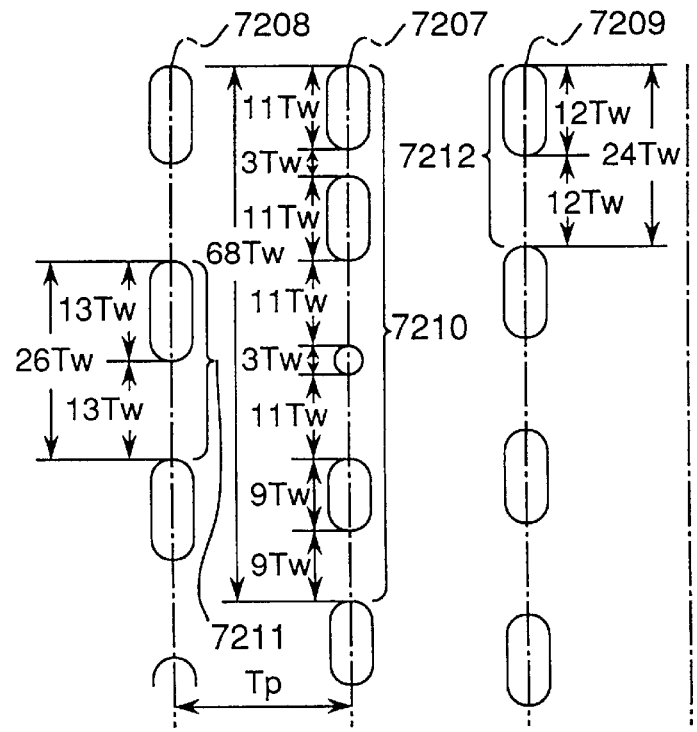

Referring to FIGS. 65A and 65B, other examples of calibration signals recorded to each of the calibration data areas 3C and 4C are shown.

In FIG. 65A, the first and third inner data sectors 1507b and 1509b (1503b and 1505b) similar to those in FIG. 61A are shown. Tracks 7202 and 7203 are the same as the first and third tracks 6802 and 6803 of FIG. 61A. However, a second track 7201 is recorded with the ninth periodical signal represented by a pit pattern 7104 corresponding to the pit pattern 4701 of FIG. 40.

In FIG. 65B, the second and fourth data sectors 1508b and 1510b (1504b and 1506b) similar to those in FIG. 61B are shown. Tracks 7208 and 7209 are the same as the first and third tracks 6808 and 6809 of FIG. 61B. However, a second track 7207 is recorded with the same ninth periodical signal recorded to the second track 7201 of FIG. 65A.

As described above, since both the first and third tracks 32 and 34 are recorded with the pit patterns, the calibration data can be reproduced from the second track 33 according to the three-beam tracking method.

Furthermore, the second track 34 is recorded with the calibration data signal having a frequency t0, and the first and third tracks 32 and 34 are recorded with the calibration data signal having a frequency t2, wherein $t0 \neq 1$ and $t0 \neq n \cdot t1$ ("n" is an integer). As a result, the crosstalk components from the first and third tracks (32) and (34) can be clearly detected free from the influence of the signal reproduced from the second track (33).

Additionally, since the signal having a predetermined frequency corresponding to a byte-unit in the data system is recorded to the second track (32), the calibration data area (23) can be formed with a simple format. It is to be noted that 68 Tw corresponds to 4 bytes of a data system with an EFM process.

Seventh Embodiment

Figure 67:
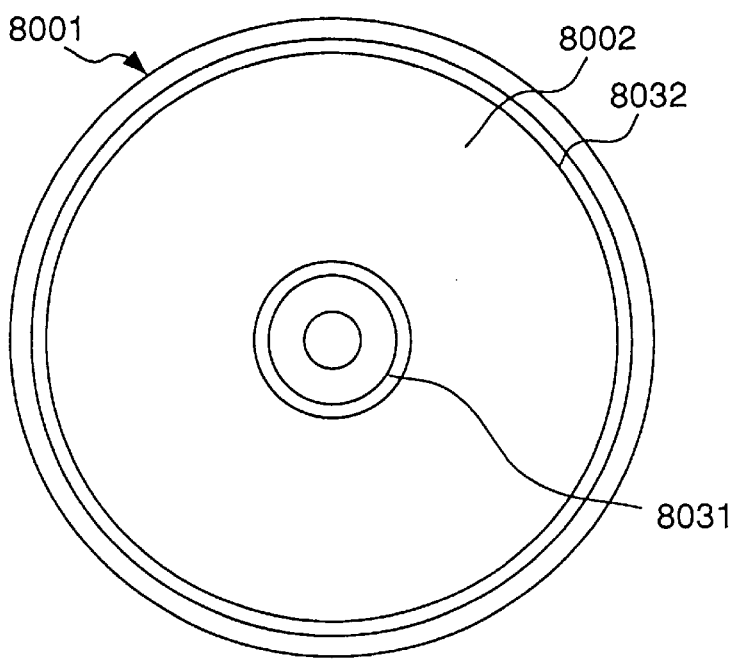
FIG. 67 is a plan view showing another alternative of the optical disk having two calibration data areas.

Referring to FIG. 67, another example of the optical disk, similar to that of FIG. 1B is shown. Similarly, the optical disk 8001 has a data recording area 8002, a first calibration data area 8031 formed in a lead-in area thereof, and a second calibration data area 8032. Note that the areas 8002, 8031, and 8032 correspond to areas 2, 3, and 4 of FIG. 1B, respectively.

Figure 68:
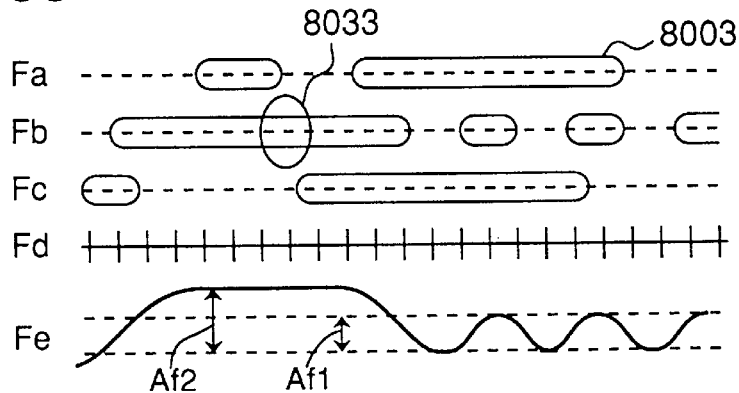
FIG. 68 is a graph showing various patterns observed with respect to the optical disk of FIG. 67.
Figure 69:
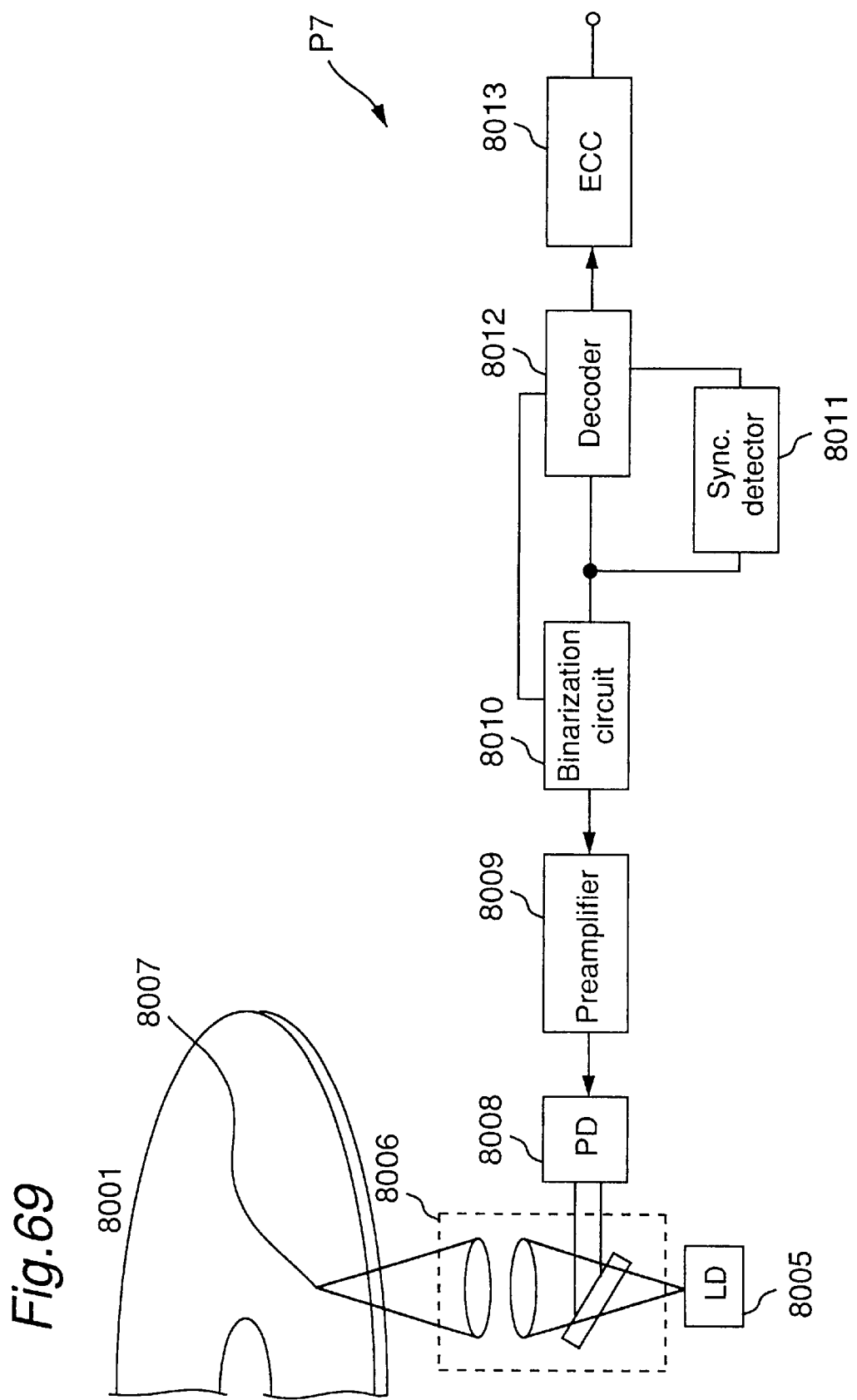
FIG. 69 is block diagram showing an optical disk apparatus according to the seventh embodiment of the present invention.

Referring to FIG. 68, various patterns observed with respect to the optical disk 8001 of FIG. 67 are shown. Referring to FIG. 69 an optical disk apparatus according to the seventh embodiment of the present invention is shown. The optical disk apparatus includes a laser diode 8005 for impinging a laser beam. An optical system is provided for focusing a spot 8007 of the laser beam on the optical disk 8001 and leading the reflected laser beam from the optical disk 8007 in a preferable direction. A photo diode 8008 is provided for receiving the lead reflected laser beam to produce a reproduction signal. A preamplifier 8009 amplifies the reproduction signal. A binarization circuit 8010 digitize the amplified reproduction signal. A synchronization detector 8011 and decoder 8012 are connected to the binarization circuit 8010 for receiving the digitized reproduction signal so as to decode it into the information signal. An error correction circuit 8013 applies an error correction to the decoded information signal.

Figure 70:
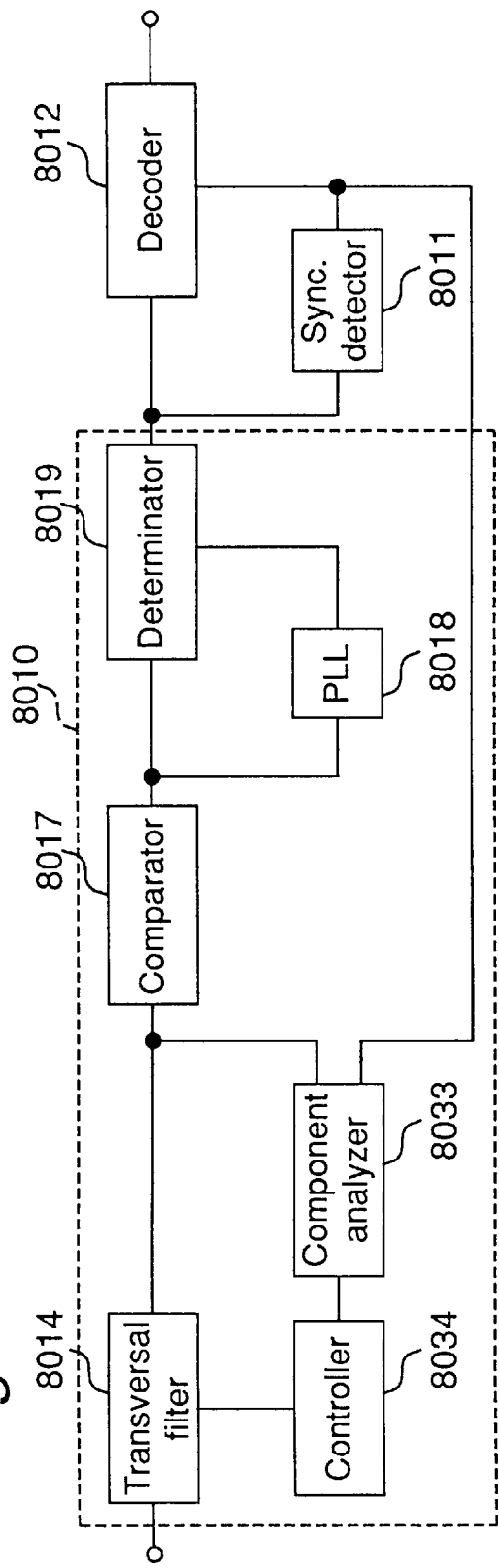
FIG. 70 is a block diagram showing the binarization circuit of the optical disk apparatus of FIG. 69.

Referring to FIG. 70, the binarization circuit 8010 of FIG. 69 is shown. The binarization circuit 8010 includes a transversal filter 8014 connected to the preamplifier 8009, a comparator 8017, a phase lock loop unit 8018, a judging unit 8019, a controller 8034, and a component analyzer 8033 which are connected as shown in FIG. 70.

Figure 71:
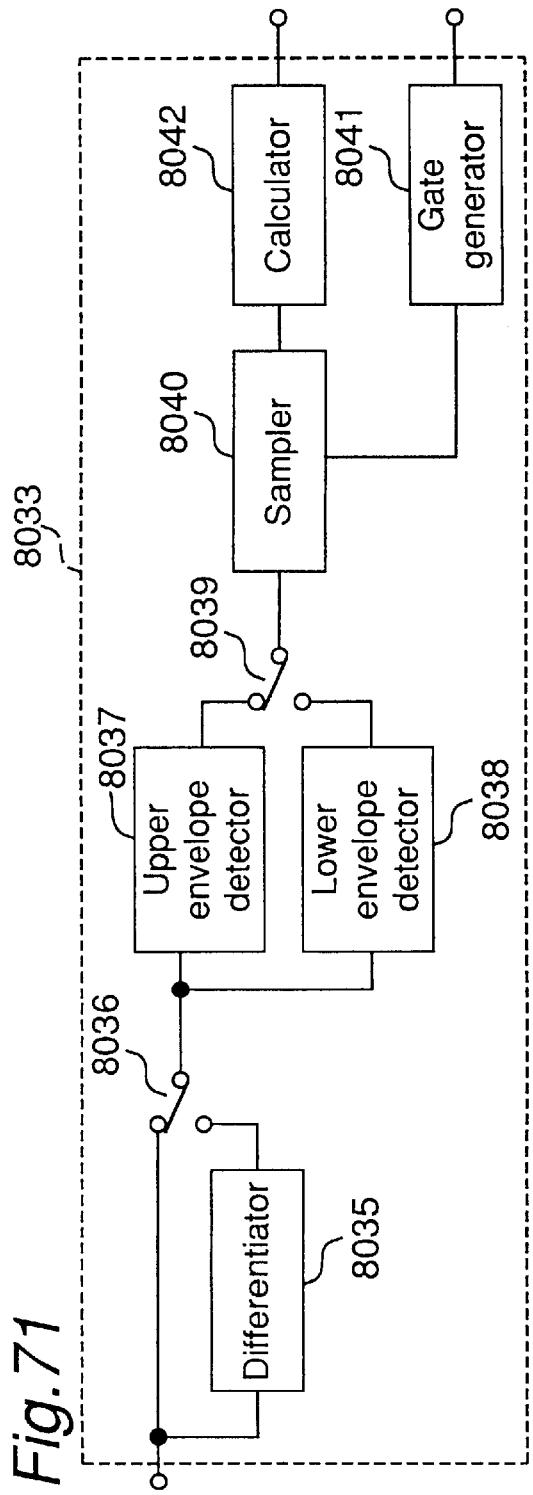
FIG. 71 is a block diagram showing the component analyzer of the binarization circuit of FIG. 70.

Referring to FIG. 71, the component analyzer 8033 (FIG. 70), which analyses a frequency component of a signal, is shown. The component analyzer 8033 includes a differentiator 8035, a first selector switch 8036, an upper envelope detector 8037, a lower envelop detector 8038, a second selector switch 8039, a sampling unit 8040 a gate generator 8041, and a calculator 8042 which are connected as shown in FIG. 71.

Figure 72:
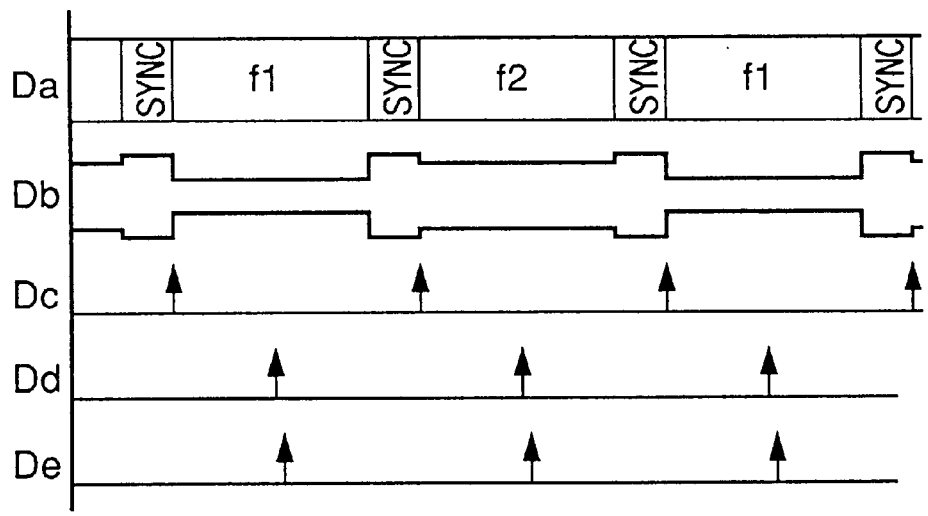
FIG. 72 is a graph showing various signals observed in the optical disk apparatus of FIG. 69 with respect to the reproduction from the first calibration data area.

Referring to FIG. 72, various signals observed in the optical disk apparatus of FIG. 69 with respect to the reproduction from the first calibration data area 8031 are shown.

Figure 73:
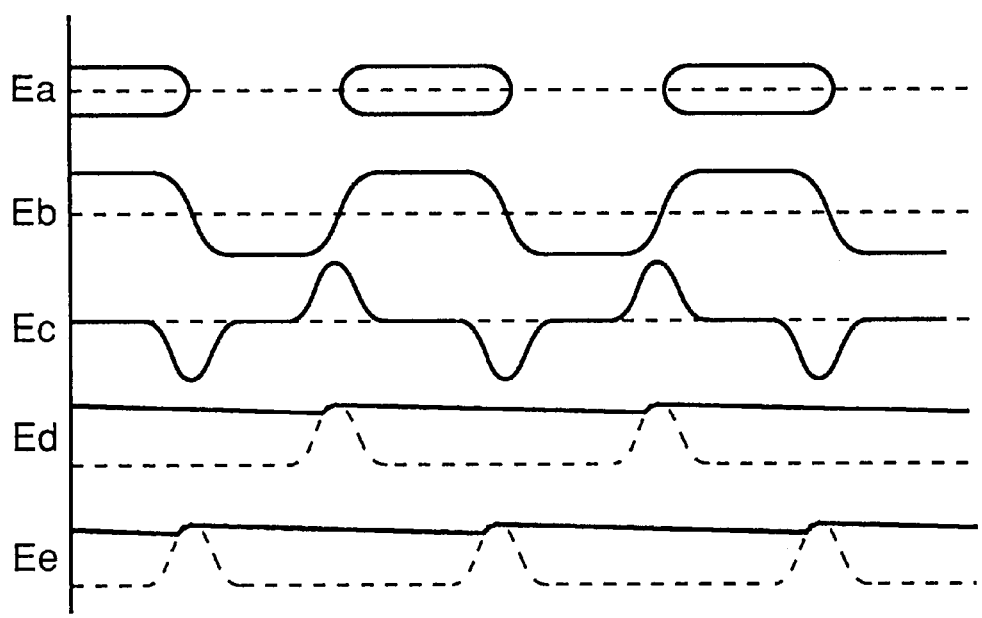
FIG. 73 is a graph showing various signals observed in the optical disk apparatus of FIG. 69 with respect to the reproduction from the second calibration data area.
Figure 74:
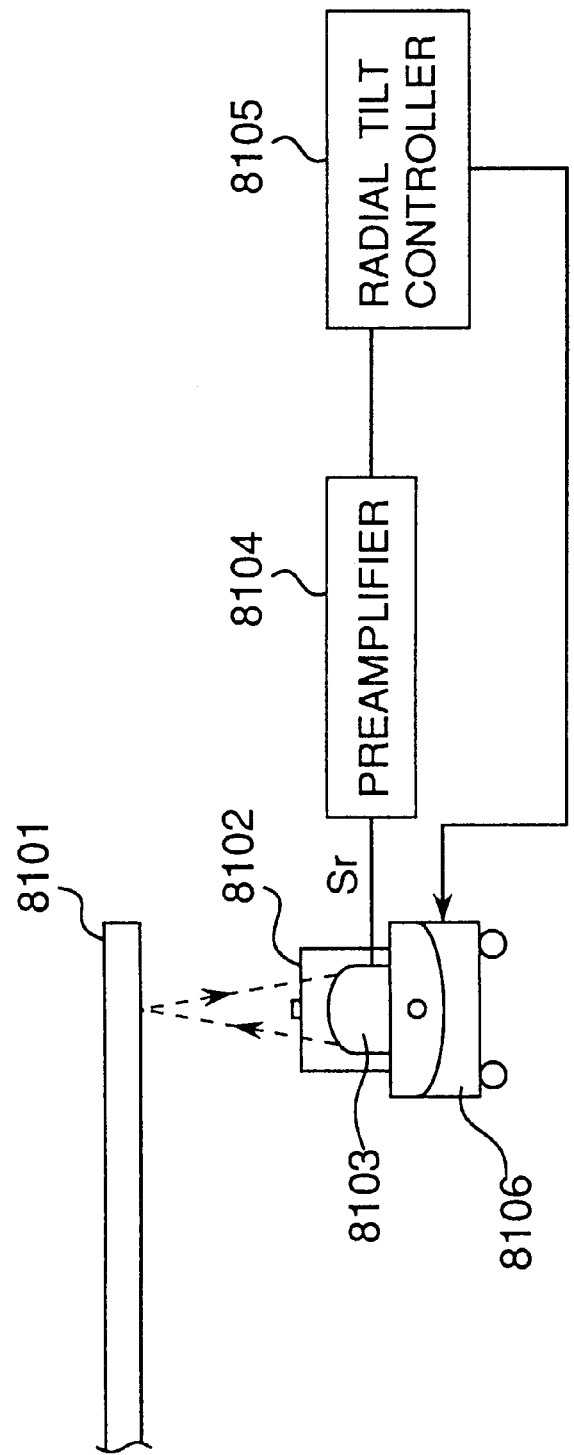
FIG. 74 is a block diagram showing a conventional optical disk apparatus.

Referring to FIG. 73, various signals observed in the optical disk apparatus of FIG. 69 with respect to the reproduction from the second calibration data area 8032 are shown. In operation, when the optical disk 8001 is set in the optical disk apparatus P6, the optical pickup reproduces the first calibration area 8031. Based on the calibration data reproduced from the first calibration area 8031, it is possible to determine a compensation factor for accurately adjusting the optical pickup for the various fluctuations caused by physical distortion of the optical disk and the optical pickup and propensities of the electric circuit. Finally, the optical apparatus is adjusted in accordance with thus determined compensation factor.

The optical disk 8001 is provided with the synchronization (SYNC) signal in every frame for the synchronized decoding over the entire area thereof. A period of frame is comprised of 42 bytes of data, as shown by the line Da in FIG. 72. Note that one sector comprises sixty frames.

At the reproduction operation, the synchronization detector 8011 detects this SYNC signal, and then the synchronization is achieved. This SYNC signal is also recorded in a predetermined track of the calibration data areas, such that two signals having different frequencies f1 and f2 are alternately recorded in every sector, as represented by the line Da of FIG. 72.

Note that "f1" is a frequency when the minimum pit and space to be reproduced continues. Also, "f2" is a frequency when a pit mark and pit space longer than a diameter of laser spot continue. When the reproduction signal is longer than the spot diameter as specifically indicated by a line Fe of FIG. 68, the signal can be reproduced in a correct level from that pit. However, the reproduction signal level is reduced by the inter-pit interference, and is remarkably especially in the high density recording and reproducing. The calibration data is recorded as indicated by a line Da of FIG. 72. In this case, the reproduction signal has an envelop as indicated by a line Db of FIG. 79, as a result of the difference in the pit length.

With reference to FIG. 71, the operation of binarization circuit 8010 shown in FIG. 69 is described. When the component analyzer 8033 is set, as shown in FIG. 71, the first selector switch 8036 connects the output of the controller directly to both of the envelope detectors 8037 and 8038, thereby bypassing the differentiator 8035. The upper and lower envelope detectors 8037 and 8038 output the upper and lower envelopes, respectively.

The gate generator 8041 receives the result of SYNC detection which is indicated by a line Dc of FIG. 72, and produces a first sampling timing signal indicated by a line Dd of FIG. 72, which is delayed by a predetermined time, a second sampling timing signal indicated by a line De of FIG. 72, and a switching signal for the second selector switch 8039.

The sampling unit 8040 samples the produced upper envelope and lower envelope. The calculator 8042 subtracts them from the sampling result to obtain an envelope of the reproduction signal. By repeating this operation every frame, a small amount corresponding to a frequency component f1 and a great amount corresponding to a frequency component f2 are alternately obtained. However, the component analyzer 8033 obtains a ratio of amplitudes Af1 and Af2 to output a frequency resolution signal to the controller 8034. The controller 8034 controls the high frequency characteristics of the transversal filter 8014 so that the component analyzer outputs a signal having a predetermined level. Note that the transversal filter is controlled such that the corresponding elements become the same with resect to the central element, so that only level characteristics varies, but not phase characteristics, even when the coefficient changes. In other words, the filter is controlled that the impulse response of the transversal filter has a symmetric wave form.

As described above, the filter is controlled such that the fluctuation of reproduction characteristics, which is represented by the level component of f1 and f2, has a predetermined frequency resolution by the output from the equalizer.

Furthermore, according to FIG. 70, the component analyzer 8033 receives the output from the equalizer to adjust the equalization characteristics so the received output is the predetermined resolution. It is also possible to provide predetermined equalization characteristics based on the frequency resolution.

Although the control is described with reference to the frequency resolutions f1 and f2, it is also possible to control based on the level of the third frequency components f3 other than f1 and f2. According to the equalization using a transversal filter having a greater tap numbers, a frequency sensitive to a specific change of the coefficient vector can be determined to some degree. Therefore, the control based on the frequency components is effective for a transversal filter having a greater tap number.

With reference to FIG. 73, the operation for compensating the asymmetry of the reproduction characteristics caused by fluctuations such as shape of pit ends or tangential tilt is described. In this case, it is necessary to adjust the phase characteristics of the transversal filter 5314.

A line Ea indicates the case where the of f2 are successive. A line Eb indicates its reproduction signal. The leading and trailing edges of signal Eb is asymmetric when the reproduction characteristics is asymmetric. In operation, the component analyzer 8033 controls the first select switch 8036 to the envelope detectors 8037 and 8038 to the differentiator 8035, so that the reproduction signal is differentiated to produce a signal Ec By detecting the upper and lower peaks of this signal Ec, an upper envelope signal Ed and a lower envelope signal Ed are obtained, respectively. These upper and lower peak envelopes are sampled in a manner as shown in FIG. 70. The obtained ratio is output therefrom as a phase resolution signal. The controller 8034 controls the coefficient of the transversal filter so that this phase resolution signal has a predetermined value. In this case, the filter is controlled such that the coefficient vectors of the transversal filter should be asymmetric with respect to the center coefficients. This is performed by changing the coefficients on both sides of the center coefficient in the reversed phase direction.

In the above, the operation to adjust the level characteristics of the equalizer and the operation to adjust the phase characteristics of the equalizer are described with reference to FIG. 72 and 73, respectively. However, it is apparent that both operations can be performed at the same time. For the control of level characteristics, it is only necessary to change the asymmetric components of coefficient vector by the same rate. For the control of the phase characteristics, it is only necessary to change the symmetric components in a reversed phase direction.

As described above, since the calibration data pattern is predetermined, the calibration of equalizer can be performed accurately. Further, equalization characters thus obtained are fixed so as to reproduce the signal with a high quality.

Eighth Embodiment

Figure 79:
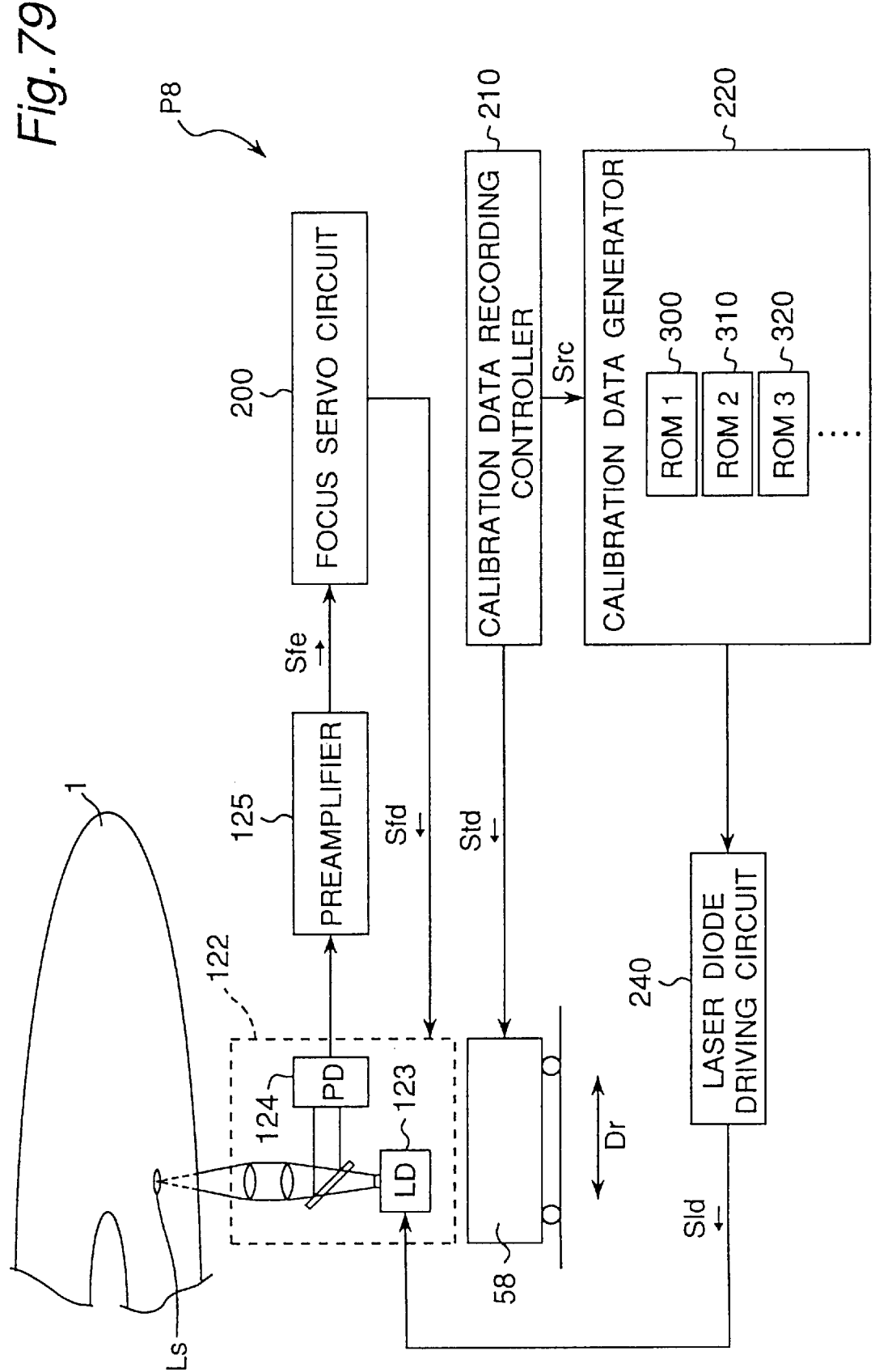
FIG. 79 is a block diagram showing an optical disk apparatus according to the eighth embodiment of the present invention.

Referring to FIG. 79, an optical disk apparatus according to the eighth embodiment of the present invention, used for forming the calibration data track area 23 on the optical disk 1, is shown. The optical disk apparatus P8 according to this embodiment has a construction similar to those of FIGS. 4, 7, 9, and 10, but is different in the following points relating to recording with predetermined calibration data to each of data track of the calibration data track area 23. Only the portion essential to forming the calibration data track area 23 is described below, and the other portions similar or common with those of FIGS. 4, 7, 9, and 10 are omitted in FIG. 79 for the sake of brevity.

The optical disk apparatus P8 includes the optical pickup unit 122 and including the laser diode 123 and the pin photo diode 1241 for recording and reproducing the information to and from the optical disk 1. The transporter 58 is provided for moving the optical pickup unit 122 and for scanning the recording tracks formed on the optical disk 1. Thus, the optical pickup unit 122 and the transport 58 construct an optical pickup system Os. From the preamplifier 125 connected to the optical pickup unit 122, the focus error signal Sfe is transferred to a focus servo circuit 200. The focus servo circuit 200 produces a focus driving signal Sfd for driving a focus controlling system (not shown) incorporated in the optical pickup unit Os. Note that the focus servo circuit 200 corresponds to the focus servo circuit 100 of FIG. 9.

A calibration data recording controller 210 produces a transporter driving signal Std for controlling of the movement of the optical pickup unit, and is connected to the transport 58 for transferring the signal Std thereto. The calibration data recording controller 210 further produces a calibration data selection signal Src indicative of the calibration data to be recorded in the calibration data track area 23.

A calibration data generator 220 has a plurality of storage devices such as ROMs for storing pit pattern data corresponding to each of calibration data which are previously described with reference to accompanying figures. Note that only three ROMs 300, 310, and 320, are shown in FIG. 29 for the sake of brevity, but the present invention is not limited by only three.

The calibration data generator 220 is connected to the calibration data recording controller 210 for receiving the calibration data signal Src. Based on the calibration data signal Src, the calibration data generator 220 selects specific ROMs for storing the pit pattern data indicated by the signal Src from ROMs 300, 320, 320, and so on. From these specifically selected ROMs, the corresponding pit pattern data are read out in a predetermined order and time for writing to the corresponding data tracks 32, 33, and 34 of the area 223 based on the calibration signal Src.

A laser diode driving circuit 240 is connected to the calibration data generator 220 for receiving the pit pattern data thus readout from each of corresponding ROMS and for producing a laser diode driving signal Sld for controlling the laser diode 123 of the optical pickup unit Os (122). The laser diode driving circuit 240 is further connected to the laser diode 123 for transferring the laser diode driving signal Sld thereto.

Thus, based on the signals Std and Src, the optical pickup unit Os is controlled to record each of recording tracks 32, 33, and 34 of the calibration data area 223 with the predetermined calibration data represented by the predetermined pit patterns.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention.

What is claimed is:

1. An optical disk apparatus for recording marks on a recording track of an optical disk and for reproducing a signal, from the recording track of the optical disk, by focusing a light spot on the recording track, said apparatus comprising:

a pattern generating means for generating a predetermined mark pattern which, when written to the recording track, causes a signal reproduced therefrom to jitter, and which, when written to the recording track, comprises a combination of two first marks having a length that is larger than a diameter of the light spot and a second mark having a length that is smaller than the diameter of the light spot, wherein said two first marks are separated from each other by a first predetermined distance which is smaller than the diameter of the light spot, and wherein said second mark is separated from said two first marks by a second predetermined distance which is larger than the diameter of the light spot; and a writing means for writing said predetermined mark pattern to the recording track of the optical disk.

2. An optical disk apparatus as claimed in claim 1, further comprising:

an optical pickup means for reproducing the signal by impinging the light spot onto the recording track;

a tilting mechanism for tilting said optical pickup means at predetermined angles;

a jitter amount measuring means for measuring an amount of jittering existing in the signal reproduced by said optical pickup means;

a jitter angle detection means for detecting an angle of said tilting mechanism at which the amount of jittering existing in the signal is a minimum; and a tilting control means for controlling said tilting mechanism so as to tilt said optical pickup means at the angle detected by said jitter angle detection means.

3. An optical disk for use in an optical disk apparatus which reproduces signals, from a plurality of recording tracks formed on said optical disk, by focusing a light spot on the plurality of recording tracks, said optical disk comprising:

a first recording track; and a second recording track for recording a predetermined mark pattern;

wherein said predetermined mark pattern is arranged such that a signal reproduced from said second recording track is caused to jitter; and wherein said predetermined mark pattern comprises a combination of two first marks having a length that is larger than a diameter of the light spot and a second mark having a length that is smaller than the diameter of the light spot, wherein said two first marks are separated from each other by a first predetermined distance which is smaller than the diameter of the light spot, and wherein said second mark is separated from said two first marks by a second predetermined distance which is larger than the diameter of the light spot.

* * * * *